US011035965B2

(12) United States Patent
Inglis et al.

(10) Patent No.: US 11,035,965 B2
(45) Date of Patent: *Jun. 15, 2021

(54) ADVANCED FISSILE NEUTRON DETECTION SYSTEM AND METHOD

(71) Applicant: Silverside Detectors Inc., Cambridge, MA (US)

(72) Inventors: Andrew Inglis, Brookline, MA (US); Alison Forsyth, Somerville, MA (US); Zachary S. Hartwig, Roslindale, MA (US); Philip C. Taber, Arlington, MA (US); Timothy Teal, Brighton, MA (US); Hidefumi Tomita, Pittsburgh, PA (US)

(73) Assignee: Silverside Detectors Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,059

(22) Filed: Apr. 23, 2019

(65) Prior Publication Data
US 2020/0309971 A1  Oct. 1, 2020

Related U.S. Application Data

(63) Continuation of application No. 15/488,382, filed on Apr. 14, 2017, now Pat. No. 10,317,541.

(51) Int. Cl.
*G01T 3/00* (2006.01)
*H01J 47/12* (2006.01)
*G21K 1/00* (2006.01)

(52) U.S. Cl.
CPC ............... *G01T 3/00* (2013.01); *G01T 3/008* (2013.01); *G21K 1/00* (2013.01); *H01J 47/1233* (2013.01)

(58) Field of Classification Search
CPC .......... G01T 3/008; G01T 1/185; G01T 3/00; G01T 1/22; G01T 3/06; G01T 3/08;
(Continued)

(56) References Cited

U.S. PATENT DOCUMENTS 2,440,167 A   4/1948  Broxon et al.
4,365,159 A   12/1982 Young
(Continued)

FOREIGN PATENT DOCUMENTS

GB    956555 A    4/1964
GB    2490513 B   11/2015
(Continued)

OTHER PUBLICATIONS

N. Colonna, et al., Simulations of Neutron Transport at Low Energy: A Comparison Between Geant and MCNP, Health Phys. 82(6):840-846, 2002. (Note: Year of publication is sufficiently earlier that the effective date of the present application).
(Continued)

*Primary Examiner* — Irakli Kiknadze
(74) *Attorney, Agent, or Firm* — Pritzkau Patent Group LLC

(57) ABSTRACT

A fissile neutron detection system includes an ionizing thermal neutron detector arrangement including an inner peripheral shape that at least substantially surrounds a moderator region for detecting thermal neutrons that exit the moderator region but is at least generally transparent to the incident fissile neutrons. A moderator is disposed within the moderator region having lateral extents such that any given dimension that bisects the lateral extents includes a length that is greater than any thickness of the moderator arrangement transverse to the lateral extents. The moderator can include major widthwise and major lengthwise lateral extents such that any given dimension across the lengthwise
(Continued)

and widthwise lateral extents includes a length that is greater than any thickness of the moderator arrangement transverse to the lateral extents.

9 Claims, 33 Drawing Sheets

(58) Field of Classification Search
CPC ....... G01T 1/02; G01T 1/2928; G01T 1/2985; G01T 1/29; G01T 1/18; G01T 1/28; G01T 1/2935; G01T 1/167; G01T 1/2008; G01T 1/201; G01T 1/2018; H01J 47/02; H01J 47/1211; H01J 47/1233; H01J 47/12; H01J 47/1205; G21K 1/00; G21K 1/043; G21K 1/02; G21K 1/093; G21K 1/10; G21K 5/04; G21K 5/10; G01V 5/0041; G01V 5/0016; G01V 5/0033; G01V 5/0091; G01V 5/0066; G01V 5/0025; G01V 5/005; G01V 5/0008; G01V 5/0069; H05G 2/00; H05G 1/52; H05H 15/00; H05H 3/06; H05H 5/00; H05H 5/02; H05H 9/00; H05H 7/12; A61K 2300/00; A61K 35/62; A61K 35/63; A61K 36/232; A61K 36/236; A61K 36/258; A61K 36/28; A61K 36/282; A61K 36/284; A61K 36/286; A61K 36/36; A61K 36/41; A61K 36/47; A61K 36/481; A61K 36/484; C22C 19/05; G01N 23/222; G01N 2033/0093; G01N 2223/074; G01N 2223/0745; G01N 2223/5055; G01N 2223/625; G01N 33/00; G21G 4/02; G21B 1/00; H01L 31/0321; H01L 31/109; H01L 31/115
USPC .................................................. 250/390.01
See application file for complete search history.

(56) References Cited

U.S. PATENT DOCUMENTS

| | | | |
|---|---|---|---|
| 4,447,727 A | 5/1984 | Friesenhahn | |
| 4,543,483 A | 9/1985 | Genrich | |
| 4,560,864 A | 12/1985 | Kinoshita et al. | |
| 4,785,186 A | 11/1988 | Street et al. | |
| 5,192,490 A | 3/1993 | Burel | |
| 5,796,110 A | 8/1998 | An et al. | |
| 7,078,705 B1 | 7/2006 | Ianakiev et al. | |
| 7,157,719 B2 | 1/2007 | Martoff et al. | |
| 8,519,350 B2 | 8/2013 | McGregor et al. | |
| 8,569,710 B2 | 10/2013 | Lacy | |
| 8,907,293 B2 | 12/2014 | Lacy | |
| 9,018,594 B2 | 4/2015 | Ahlen et al. | |
| 9,817,138 B2 | 11/2017 | McGregor et al. | |
| 9,847,215 B2 | 12/2017 | Degtiarenko et al. | |
| 2002/0139935 A1 | 10/2002 | Klein et al. | |
| 2003/0213917 A1 | 11/2003 | Menlove et al. | |
| 2005/0220246 A1 | 10/2005 | Masterov et al. | |
| 2006/0138340 A1 | 6/2006 | Ianakiev et al. | |
| 2006/0267054 A1 | 11/2006 | Martin et al. | |
| 2007/0018110 A1 | 1/2007 | Mcgregor et al. | |
| 2007/0122948 A1 | 5/2007 | Wei et al. | |
| 2008/0128628 A1 | 6/2008 | Moses et al. | |
| 2008/0296506 A1 | 12/2008 | Clarke et al. | |
| 2008/0315109 A1 | 12/2008 | Stephan et al. | |
| 2009/0014662 A1* | 1/2009 | Suhami | G01T 3/06 250/390.11 |
| 2010/0019164 A1 | 1/2010 | Stephan et al. | |
| 2010/0301226 A1 | 12/2010 | Lacy | |
| 2011/0102620 A1 | 5/2011 | Sakano et al. | |
| 2011/0108738 A1 | 5/2011 | Doty et al. | |
| 2011/0204243 A1 | 8/2011 | Bendahan et al. | |
| 2011/0266643 A1* | 11/2011 | Engelmann | G01T 3/08 257/429 |
| 2012/0217406 A1 | 8/2012 | McGregor et al. | |
| 2013/0020492 A1 | 1/2013 | Derzon et al. | |
| 2013/0068941 A1 | 3/2013 | Nikitin | |
| 2013/0068957 A1 | 3/2013 | Stephan et al. | |
| 2013/0228696 A1 | 9/2013 | McGregor et al. | |
| 2013/0341519 A1* | 12/2013 | Li | G01T 3/06 250/368 |
| 2014/0042330 A1 | 2/2014 | Gozani et al. | |
| 2014/0077091 A1 | 3/2014 | Ahlen et al. | |
| 2014/0097351 A1 | 4/2014 | Lacy | |
| 2014/0117246 A1 | 5/2014 | Zhou et al. | |
| 2014/0197321 A1 | 7/2014 | Bendahan et al. | |
| 2014/0252520 A1 | 9/2014 | Dahal et al. | |
| 2014/0321588 A1* | 10/2014 | Gozani | G01T 3/00 376/154 |
| 2015/0355345 A1 | 12/2015 | Neyland | |
| 2016/0018538 A1 | 1/2016 | Bendahan et al. | |
| 2017/0023684 A1* | 1/2017 | Inglis | G01T 3/008 |
| 2017/0176632 A1 | 6/2017 | Manclossi et al. | |
| 2017/0276810 A1* | 9/2017 | Clarke | G01T 3/08 |

FOREIGN PATENT DOCUMENTS

| | | |
|---|---|---|
| JP | 2015075393 A | 4/2015 |
| WO | 2011025853 A1 | 3/2011 |
| WO | 2016022232 A | 2/2016 |
| WO | 2016061553 A1 | 4/2016 |
| WO | 2016022232 A3 | 5/2016 |

OTHER PUBLICATIONS

Prosecution History of Co-Pending U.S. Appl. No. 15/039,842, filed Nov. 19, 2018.
Prosecution History of Co-Pending U.S. Appl. No. 15/488,382, filed Dec. 7, 2018.
The International Search Report and the Written Opinion of the International Searching Authority for International Application. No. PCT/US2015/056093 which is associated with U.S. Appl. No. 15/039,842, dated Mar. 17, 2016, Alexandria, VA.
The International Search Report and the Written Opinion of the International Searching Authority for International Application No. PCT/US2018/027592 which is associated with U.S. Appl. No. 15/488,382, dated Sep. 20, 2018, Jerusalem, Israel.
Updated Prosecution History of previously cited Co-Pending U.S. Appl. No. 15/039,842, filed Dec. 7, 2018.
W.J. Nellis, Slowing Down Distance and Times of 0.1-to 14-MeV Neutrons in Hydrogenous Materials, American Journal of Physics No. 5, May 5, 1977.
The Extended European Search Report for European Application No. 18835326.2, which is related to PCT/US2018/027658 which is related to U.S. Appl. No. 15/952,610, dated Nov. 2, 2020.

* cited by examiner

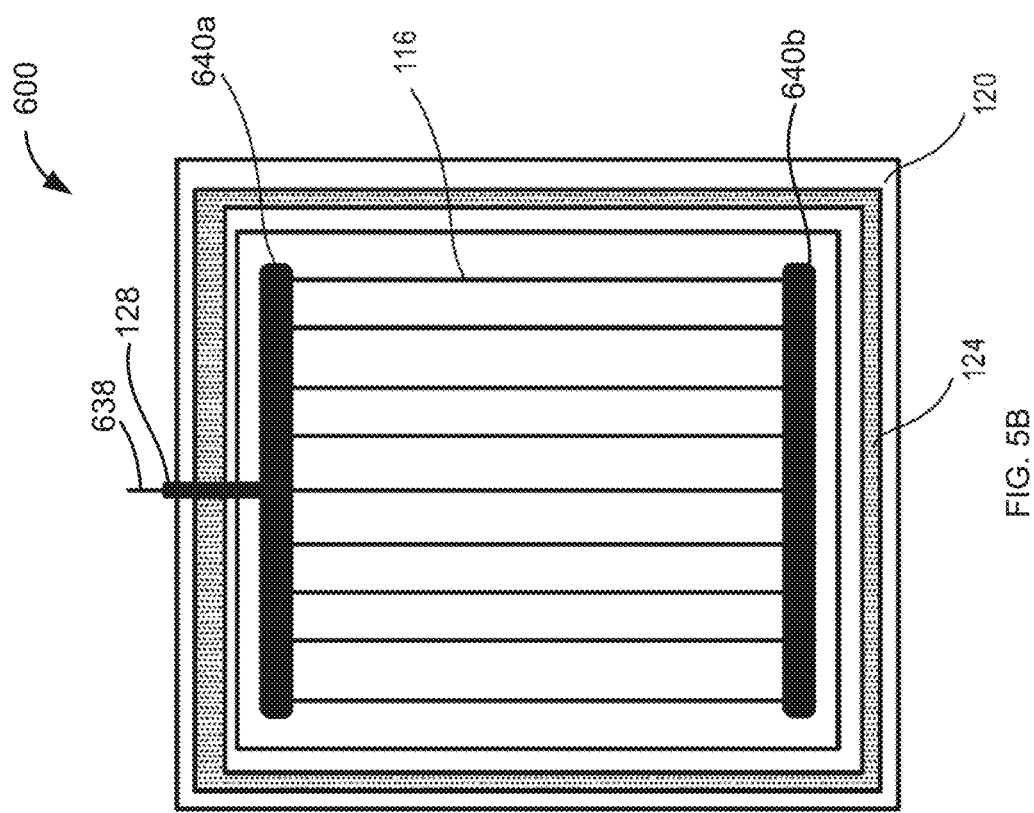

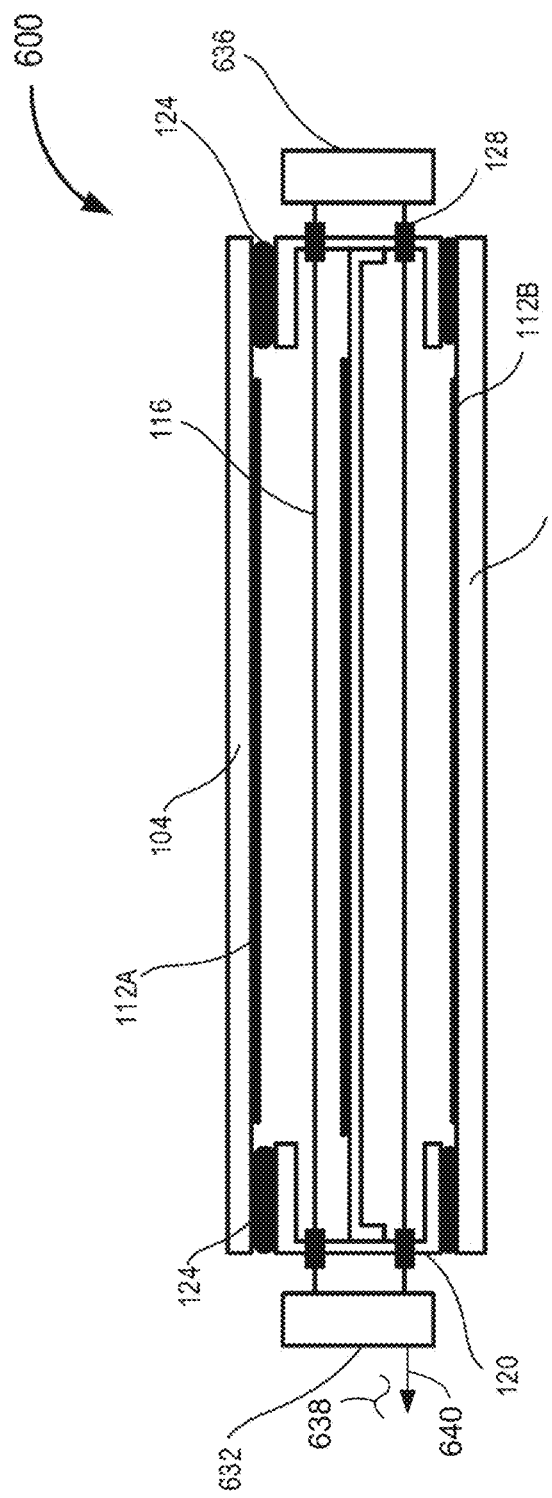
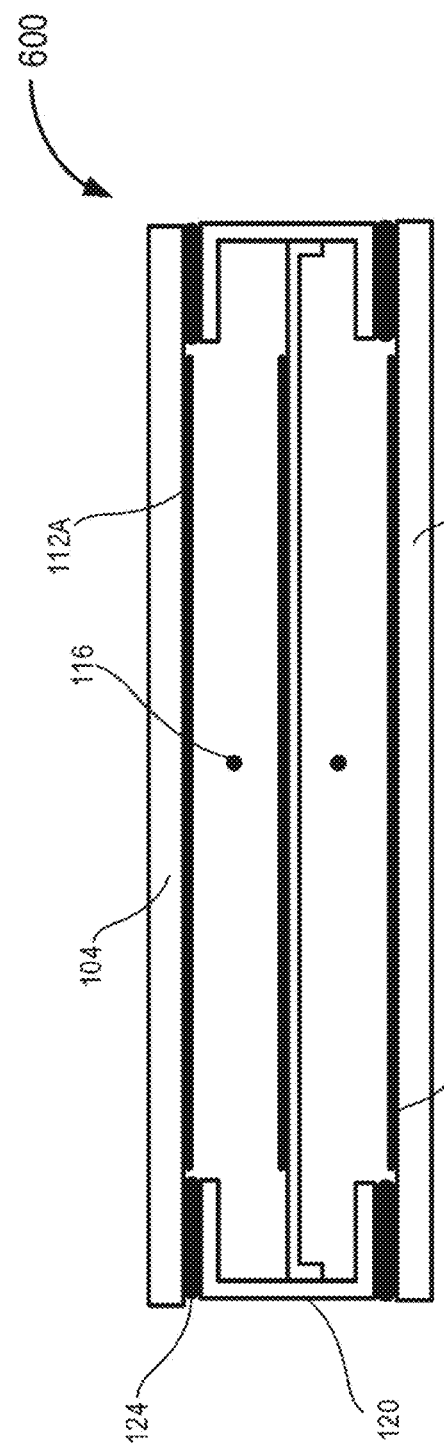
FIG. 5C
FIG. 5D

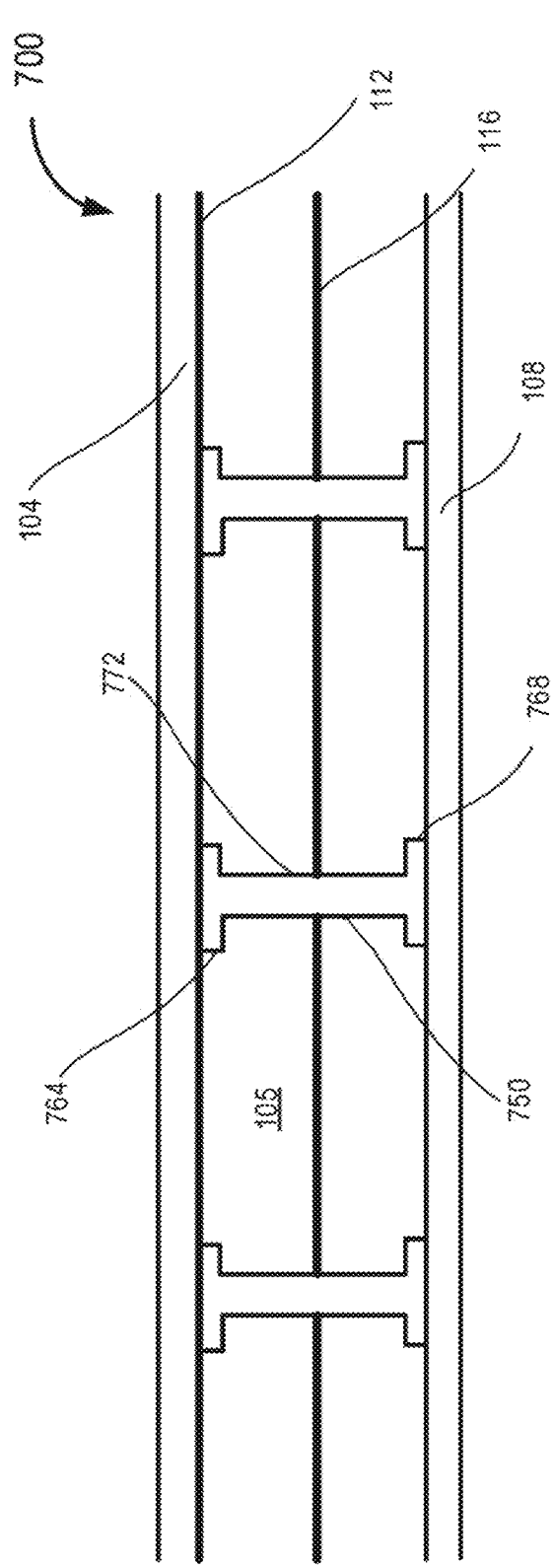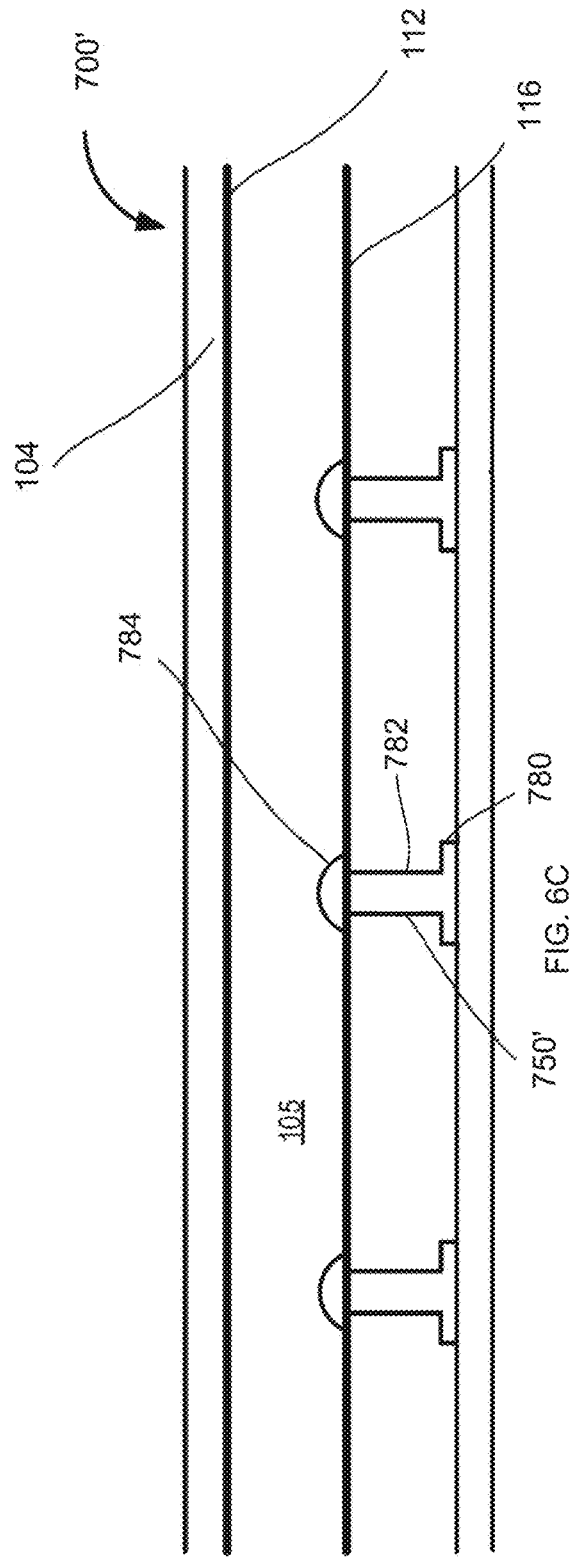

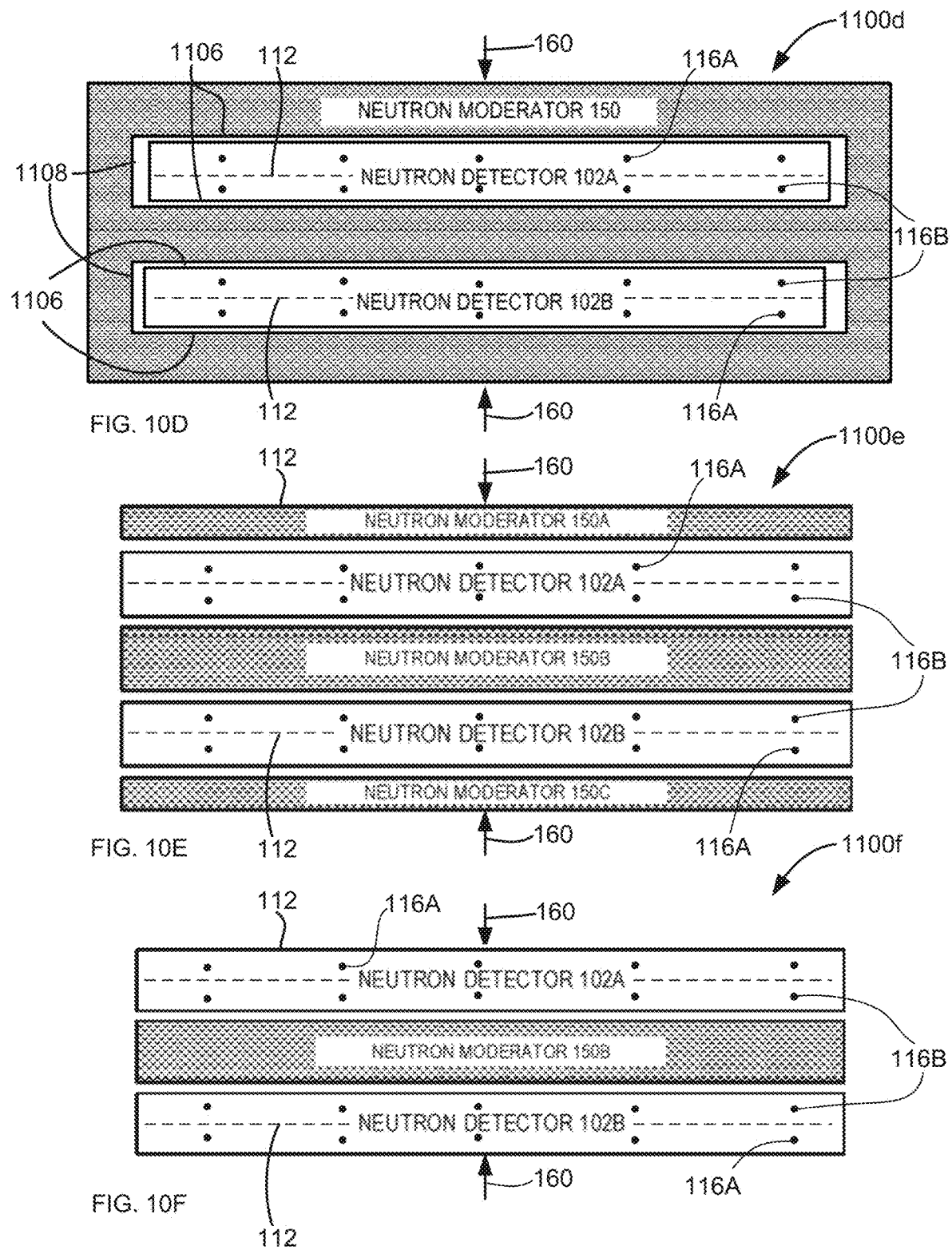

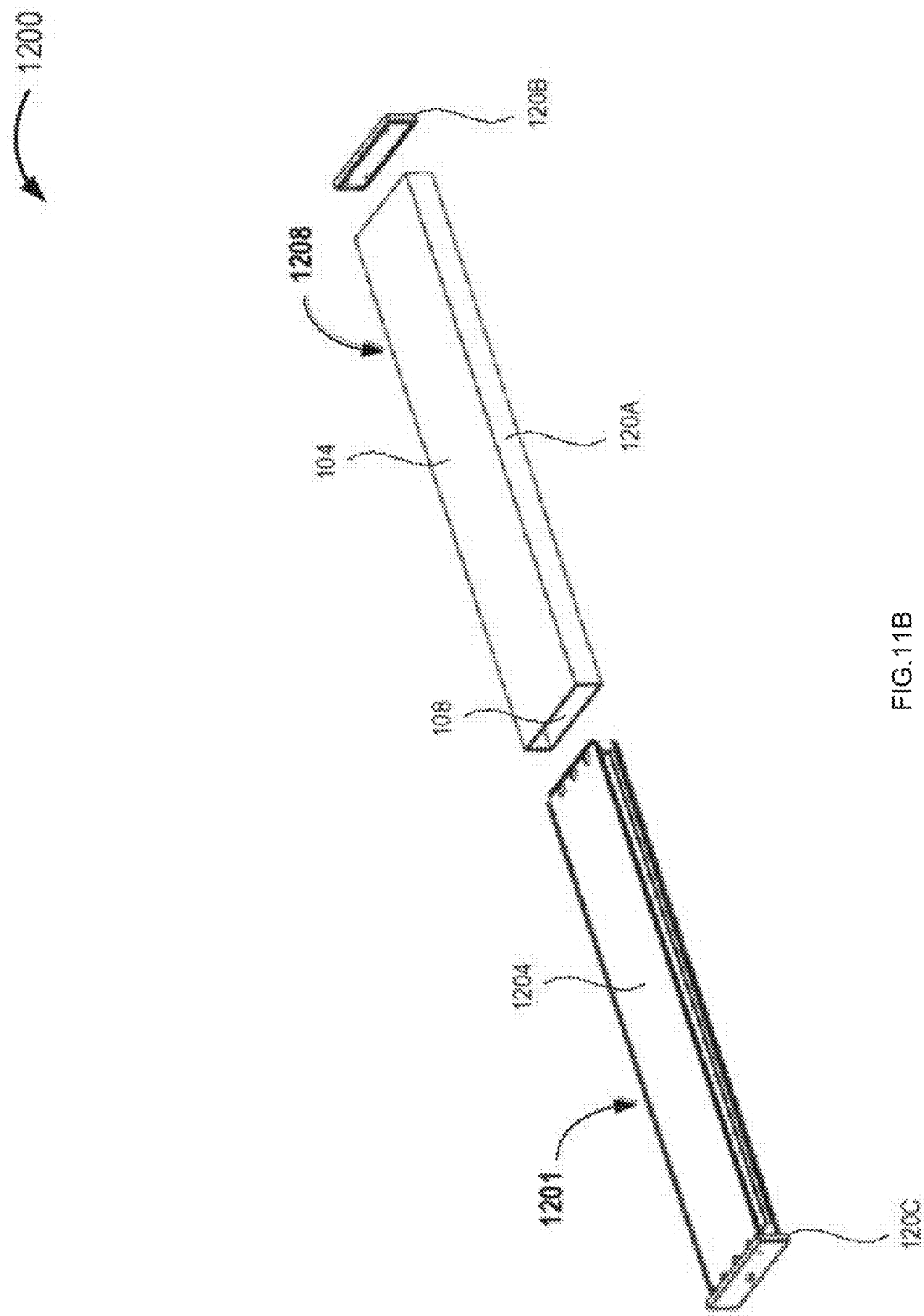

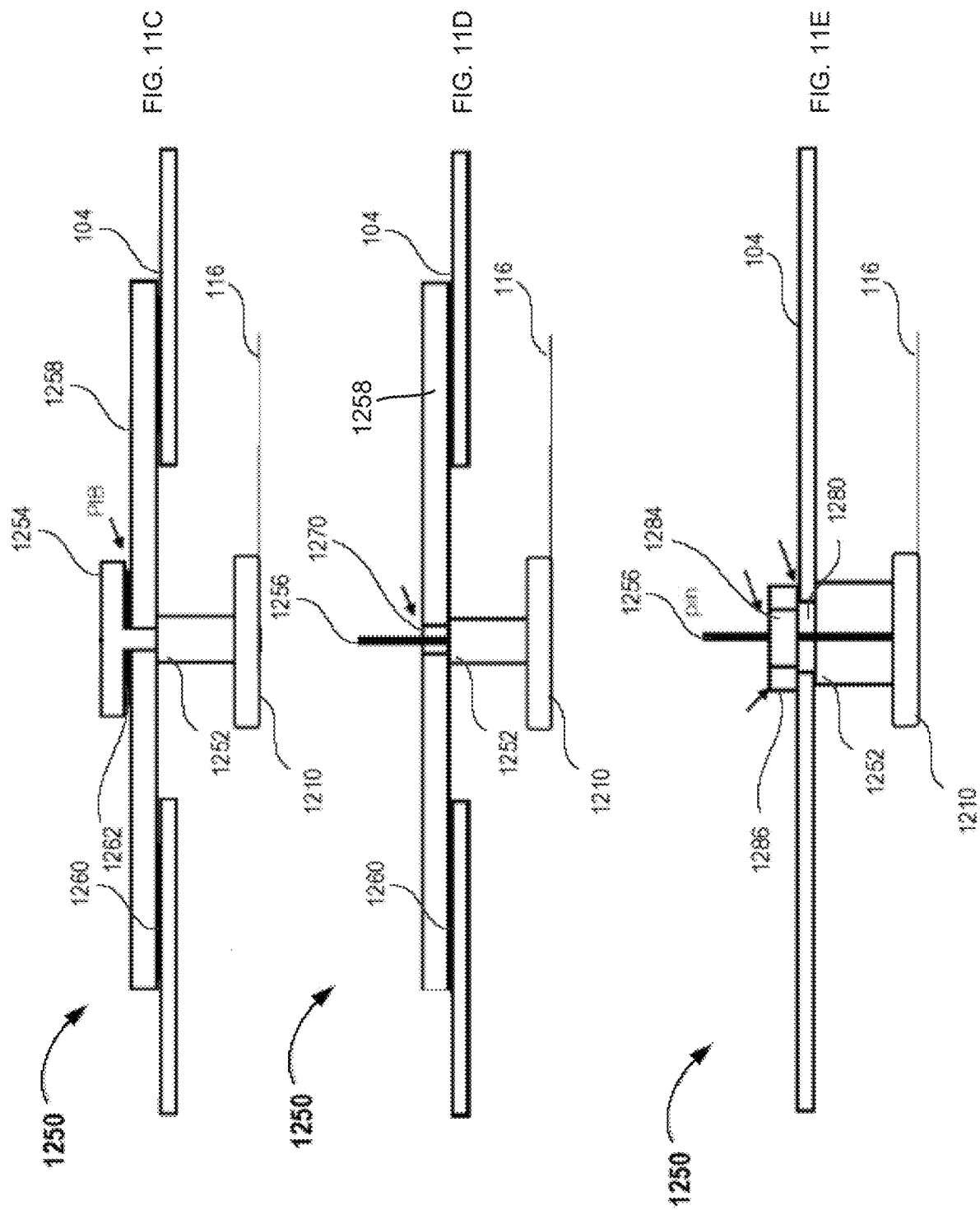

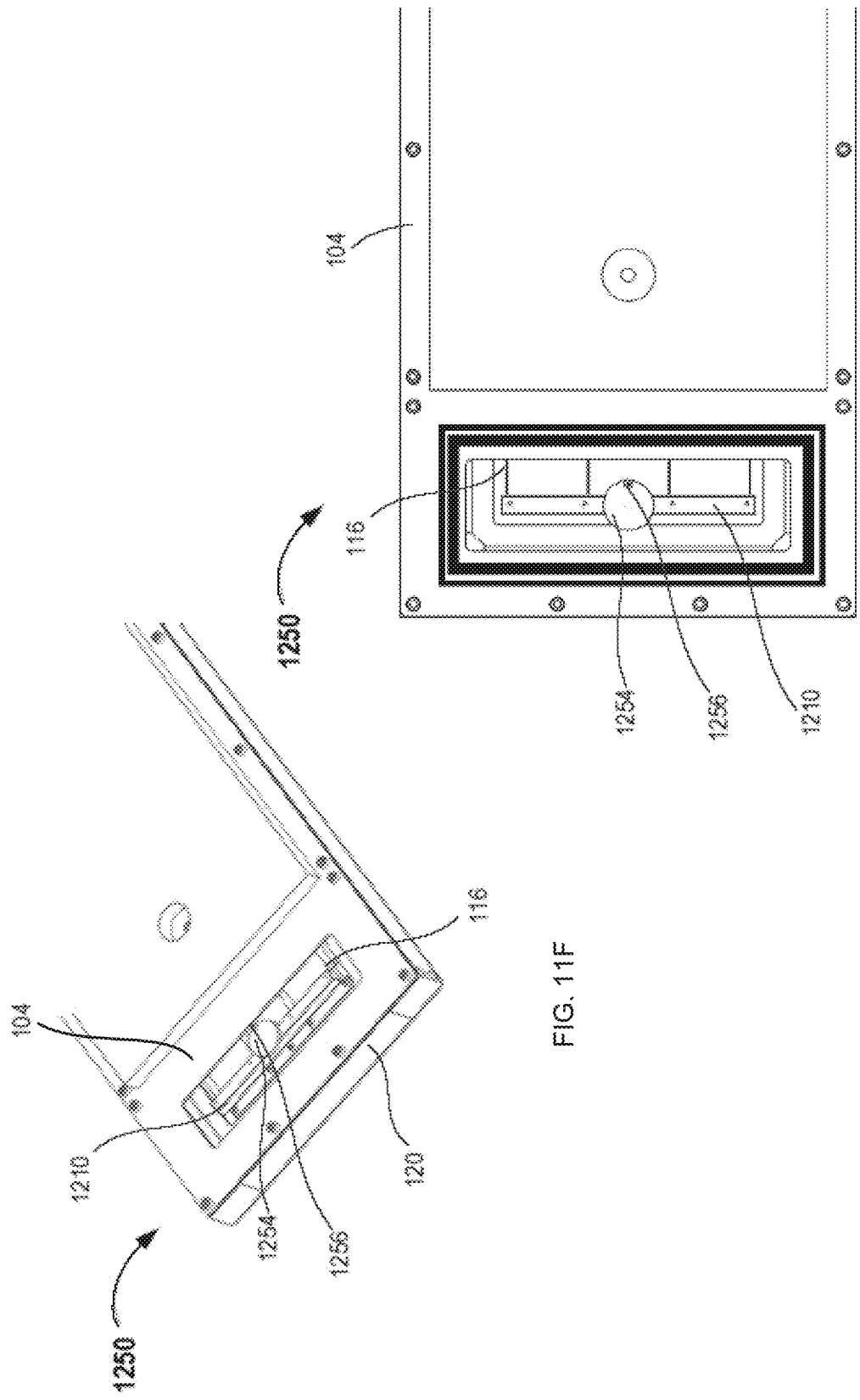

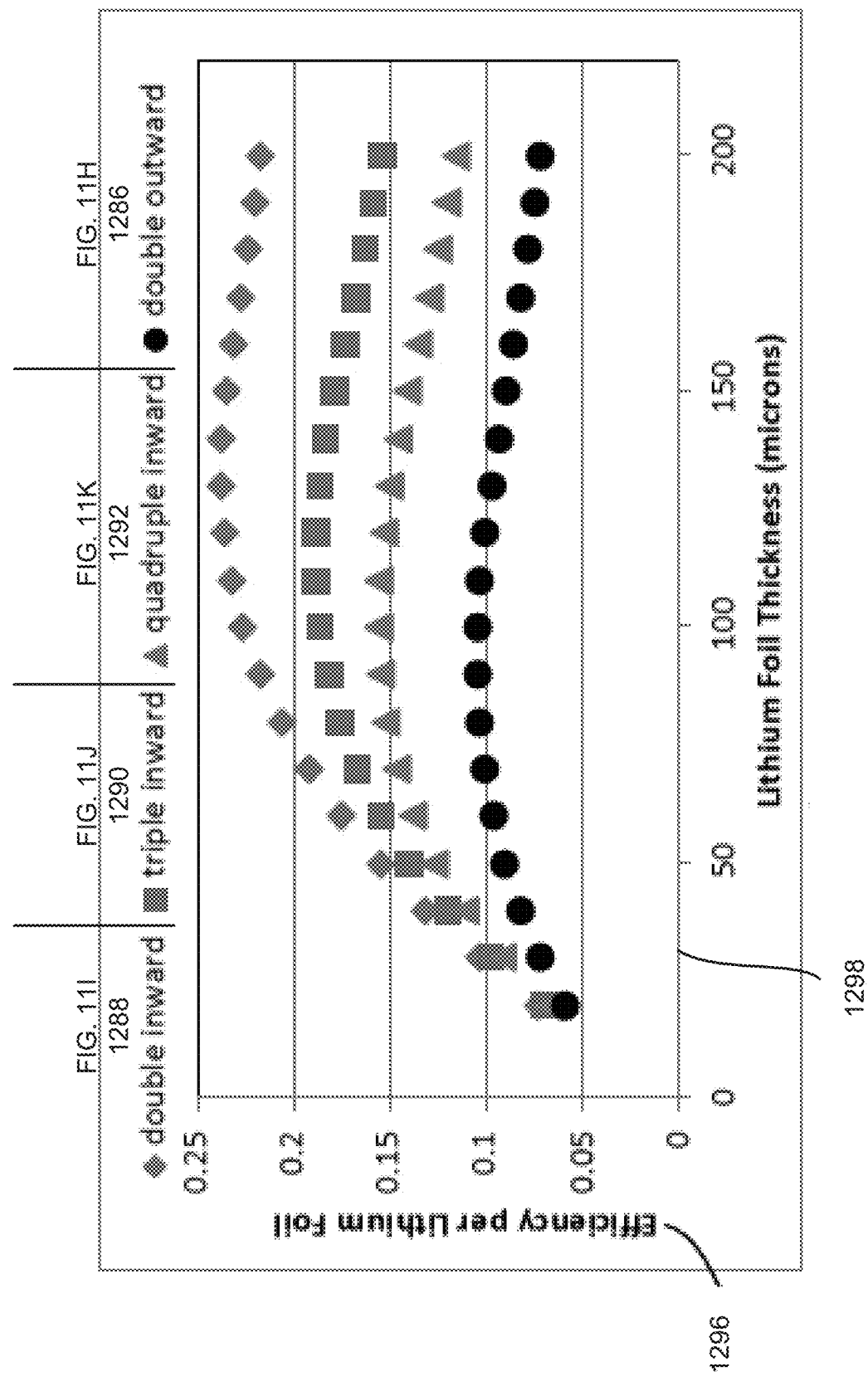

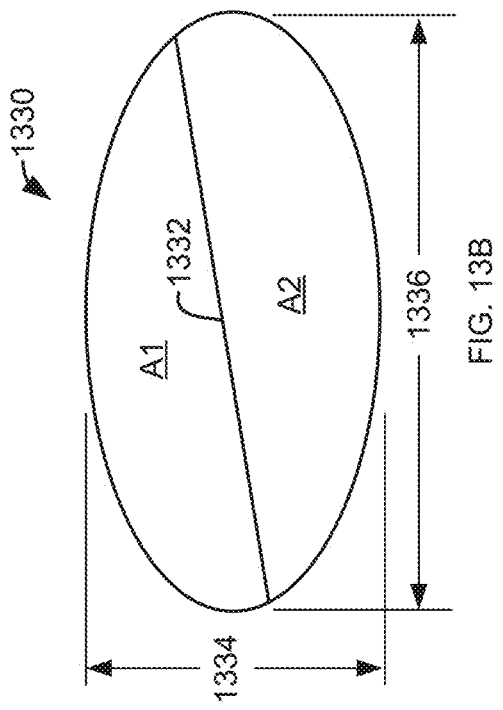
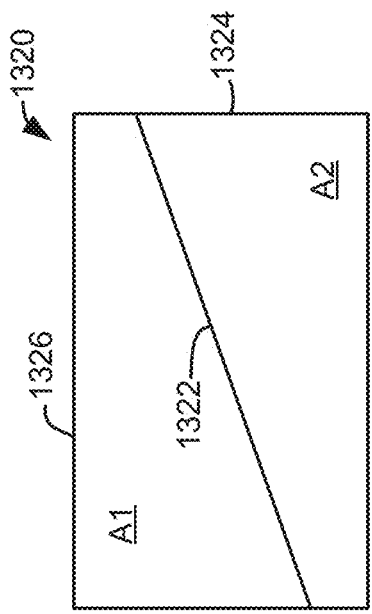
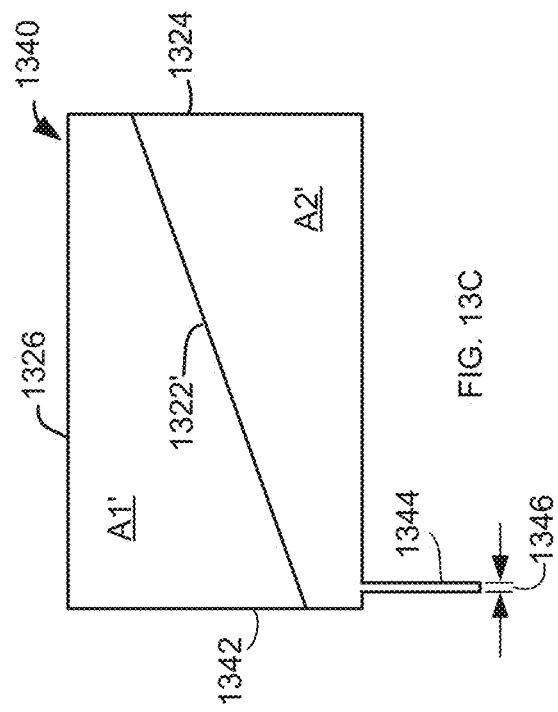
FIG. 13B
FIG. 13A
FIG. 13C

ADVANCED FISSILE NEUTRON DETECTION SYSTEM AND METHOD

RELATED APPLICATIONS

The present Application is a continuation of co-pending U.S. application Ser. No. 15/488,382, filed on Apr. 14, 2017 and issued as U.S. Pat. No. 10,317,541 on Jun. 11, 2019, which is hereby incorporated by reference in its entirety.

STATEMENT REGARDING FEDERALLY SPONSORED RESEARCH OR DEVELOPMENT

This invention was made with Government support under HR001114C0098 awarded by the Defense Advanced Research Projects Agency. The Government has certain rights in the invention.

BACKGROUND

The present invention relates at least generally to the field of detecting fissile, high energy neutrons and, more particularly, to an advanced fissile neutron detection system and associated method.

Governments mobilize radiation detectors to attempt to stop the illicit movement of nuclear material such as plutonium and uranium. Previous approaches to neutron detection have relied upon an isotope of helium gas, helium-3 or $^3$He, a limited resource generated during the construction and/or decommissioning of nuclear weapons which is already showing signs of a global short supply. Due to increasing $^3$He shortages and the resulting increase in associated costs, neutron detectors utilizing $^3$He cannot be economically deployed at scales. Efforts to develop replacement technologies have been initiated, however, none of these efforts have produced a cost effective, scalable solution.

The lack of scalable technology has limited the evolution of existing systems to meet evolving threats. Specifically, current modeling efforts show that the deployment of a large, networked array of detection technologies where the detectors are placed at potential points of attack, material source locations, and discreetly at randomized points of transportation pathways will lead to the greatest increase of overall security against nuclear threats.

Plutonium and highly enriched uranium (HEU) materials that can be used in a nuclear weapon emit both gamma rays and neutrons. After the attacks on Sep. 11, 2001, the U.S. government sought to strengthen border defenses against smuggled Special Nuclear Materials (SNM). To detect SNM, federal, state, and local governments initially deployed detection units using $^3$He gas in proportional counters wrapped in high-density polyethylene (HDPE) a technology pulled from physics laboratories and the nuclear power industry. Polyvinyltoluene (PVT) plastics coupled to photomultiplier tubes (PMT), pulled from the scrap-steel industry, were used to detect gamma rays emitted by HEU, as well as other dangerous radioactive sources that could be used to create a radiological dispersive device. Handheld devices, which have better gamma ray energy resolution than PVT, supported the main scanning capabilities of these larger $^3$He and PVT detectors.

This initial detection capability had challenges. The initial deployment of neutron detectors severely depleted the limited stockpile of $^3$He, driving costs sky-high and limiting scalability of deployment. Equally problematic were the number of false positive alarms that were due to the poor energy resolution of PVT, increasing overall scanning times and limiting the usability of the systems. Multiple government R&D programs over the past ten years have invested in $^3$He alternatives for neutron detection, as well as improved energy resolution gamma ray detection units. However, while some alternative materials have emerged, Applicants believe that none of the R&D programs succeeded in reducing the cost of these systems. Given that 1.2 million kilograms of Pu has been produced since World War II, and its key signature is neutron emission, neutron detection is now considered a non-negotiable component of threat detection capability.

In view of the foregoing, Applicants recognize that new neutron detection solutions are needed. Applicants further recognize that the solution should:

Be low cost and independent of $^3$He. This will enable scalable, affordable solutions;

Have low probability for gamma-ray induced false positives by having high gamma ray rejection;

Be rugged and long lived for compatibility with military CONOPS; and

Hit metrics of capture area and efficiency to detect the desired threats as a major advance in the overall reduction of nuclear threats.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a fissile neutron detection system is described for detecting incident fissile neutrons. In one aspect of the disclosure, the fissile neutron detection system includes an ionizing thermal neutron detector arrangement including an inner peripheral shape that at least substantially surrounds a moderator region for detecting thermal neutrons that exit the moderator region but is at least generally transparent to the incident fissile neutrons. A moderator arrangement is disposed within the moderator region for converting the incident fissile neutrons in the moderator region to thermal neutrons which exit the moderator region to then enter the thermal neutron detector arrangement for detection of at least some of the thermal neutrons to produce an electrical current as a detector output with the moderator arrangement having an outer peripheral shape that is at least generally complementary to the inner peripheral shape and the moderator arrangement and includes lateral extents such that any given dimension that bisects the lateral extents includes a length that is greater than any thickness of the moderator arrangement transverse to the lateral extents.

In another aspect of the disclosure, the fissile neutron detection system includes an ionizing thermal neutron detector arrangement including an inner peripheral shape that at least substantially surrounds a moderator region for detecting thermal neutrons that exit the moderator region but is at least generally transparent to the incident fissile neutrons. A moderator arrangement is disposed within the moderator region for converting the incident fissile neutrons in the moderator region to thermal neutrons which exit the moderator region to then enter the thermal neutron detector arrangement for detection to produce an electrical current as a detector output with the moderator arrangement having an outer peripheral shape that is at least generally complementary to the inner peripheral shape and the moderator arrangement includes major widthwise and major lengthwise lateral extents such that any given dimension across the lengthwise and widthwise lateral extents includes a length that is greater than any thickness of the moderator arrangement transverse to the lateral extents.

BRIEF DESCRIPTION OF THE DRAWINGS

Example embodiments are illustrated in referenced figures of the drawings. It is intended that the embodiments and figures disclosed herein are to be illustrative rather than limiting.

FIG. 5B is a diagrammatic, cutaway plan view the illustrative thermal neutron detector depicted in FIG. 5A, at least illustrating additional details of an embodiment of an electrode arrangement.

FIG. 5C is a diagrammatic, cutaway view, in elevation, of the illustrative thermal neutron detector depicted in FIG. 5A showing additional details of an embodiment of its structure, in accordance with at least one embodiment of the present disclosure.

FIG. 5D is another diagrammatic, cutaway view, in elevation of the illustrative thermal neutron detector depicted in FIG. 6A, in accordance with at least one embodiment of the present disclosure.

FIG. 6B is a diagrammatic and fragmentary, cutaway view, in elevation, of a thermal neutron detector electrode configuration that can be used in the illustrative neutron detector depicted in FIG. 6A, in accordance with at least one embodiment of the present disclosure.

FIG. 6C is a diagrammatic and fragmentary, cutaway view, in elevation, of another embodiment of a thermal neutron detector electrode configuration that can be used in the illustrative neutron detector depicted in FIG. 6A, in accordance with at least one embodiment of the present disclosure.

FIG. 11B is a diagrammatic partially assembled view, in perspective, of the illustrative thermal neutron detector depicted in FIG. 11A, in accordance with at least one embodiment of the present disclosure.

FIG. 11C is a diagrammatic, fragmentary cutaway detail drawing, in elevation, depicting an electrode connection devices for use with the illustrative thermal neutron detector depicted in FIGS. 11A and 11B, in accordance with at least one embodiment of the present disclosure.

FIG. 11D is a diagrammatic, fragmentary cutaway detail drawing, in elevation, depicting another electrode connection device for use with the illustrative thermal neutron detector depicted in FIGS. 11A and 11B, in accordance with at least one embodiment of the present disclosure.

FIG. 11E is a diagrammatic, fragmentary cutaway detail drawing, in elevation, depicting another electrode connection device for use with the illustrative thermal neutron detector depicted in FIGS. 11A and 11B, in accordance with at least one embodiment of the present disclosure.

FIG. 11F is a diagrammatic, fragmentary close up view, in perspective, of the electrode connection device depicted in FIG. 11C, in accordance with at least one embodiment of the present disclosure.

FIG. 11G is a diagrammatic, fragmentary close up plan view of the electrode connection device depicted in FIG. 11C, in accordance with at least one embodiment of the present disclosure.

FIG. 11L is a graphic that illustrates the relative efficiencies of the system embodiments of FIGS. 11H-11K normalized per sheet of active material.

FIGS. 13A-13C are diagrammatic plan views which illustrate embodiments of the lateral extents of moderator arrangements in accordance with the present disclosure.

Figure 1A:
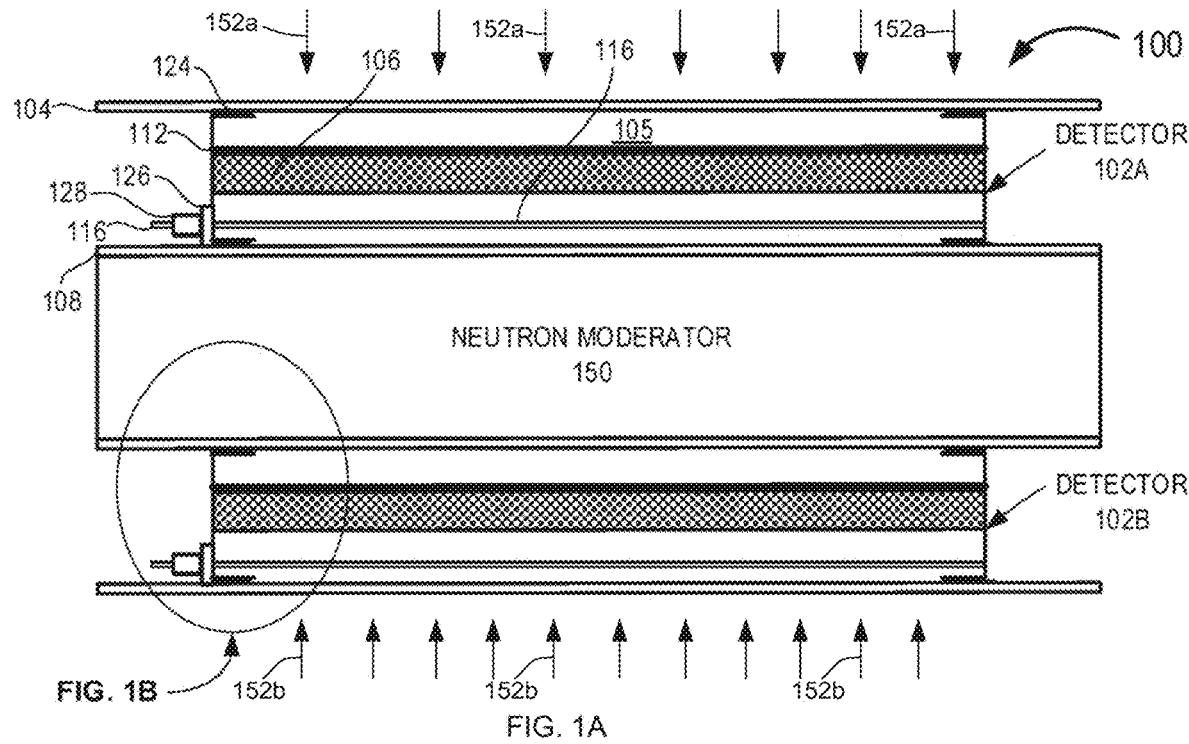
FIG. 1A is a diagrammatic front elevation view of an embodiment of an illustrative fissile neutron detection system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein can be applied to other embodiments. Thus, the present invention is not intended to be limited to the embodiments shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology can be used with respect to these descriptions, however, this terminology has been adopted with the intent of facilitating the reader's understanding and is not intended as being limiting.

The present disclosure brings to light a fissile neutron detection system. The term fissile neutron is intended to refer to a high energy neutron that is typically emitted by Pu or HEU. By way of example, the energy of a fissile neutron can be in the range from 100 keV to 10 MeV. The fissile neutron detection system can include a first thermal neutron detector and a second thermal neutron detector. The first thermal neutron detector and the second thermal neutron detector can each include: a chamber containing at least one active material that emits at least one ionizing particle upon exposure to thermal neutrons and at least one electrode. The system can further include a neutron moderator disposed proximate the first thermal neutron detector and the second thermal neutron detector in a space between the first thermal neutron detector and the second thermal neutron detector. The neutron moderator can include a hydrogen-containing material that transitions at least a portion of high-energy incident fissile neutrons to low-energy thermal neutrons. In some implementations, the fissile neutron capture efficiency of such a system can exceed 50%. In some implementations, the active material can include one or more sheets of a solid material such as lithium-6 ($^6$Li) or boron-10 ($^{10}$B) that can emit a number of charged particle(s) upon capture of a thermal neutron. In some implementations, the neutron moderator can include one or more solid thermoplastic materials, such as high-density polyethylene (HDPE), which includes a high percentage of atoms per $cm^3$ of hydrogen.

A fissile neutron detection method is provided. In an embodiment, the method can include transitioning at least some incident fissile neutrons to thermal neutrons by passing the incident fissile neutrons through at least one neutron moderator proximate a first thermal neutron detector and a second thermal neutron detector. The neutron moderator is located in a space between the first thermal neutron detector and the second thermal neutron detector. The neutron moderator includes a hydrogen containing material that causes the transition of the at least some incident fissile neutrons to thermal neutrons. The method further includes impinging at least a portion of the thermal neutrons exiting the neutron moderator on either of: at least one active material disposed in a chamber of the first thermal neutron detector or, at least one active material disposed in a chamber of the second thermal neutron detector. The method also includes generating, by the first thermal neutron detector and the second thermal neutron detector, a current proportional to the number of thermal neutrons impinging on the active material in the first thermal neutron detector and on the active material in the second thermal neutron detector.

The relatively high-energy fissile neutron (energy level >100 keV) enters the neutron moderator and collides with hydrogen nuclei within the moderator. The collisions reduce the energy level of the fissile neutron to a relatively low-energy thermal neutron (energy level <0.1 eV). The collisions may also cause a portion of the incident fissile neutrons to exit the moderator along a vector that does not intersect the first thermal neutron detector or the second thermal neutron detector. Thus only a portion of the incident fissile neutrons may be captured by the thermal neutron detectors. Using the detector/moderator/detector arrangement described herein offers a significant cross-sectional area for fissile neutron capture, providing capture efficiencies of greater than 60%. Such capture efficiency exceeds the capture efficiency of other neutron detection systems such as systems using $^{10}B$ straw detectors placed in a moderator block which offer significantly less cross-sectional area for neutron capture.

At least some of the thermal neutrons exiting the neutron moderator enter the first thermal neutron detector or the second thermal neutron detector. Within the thermal neutron detector, the thermal neutron impinges on an active material. In some instances, the active material can capture the thermal neutron and generate a number of daughter particles such as an alpha particle (two protons/two neutrons) and triton (one proton/two neutrons). At least some of the daughter particles can ionize a readout gas within the neutron detector. The drift electrons and ionized readout gas cause a charge flow within the neutron detector. The charge flow can be captured by an electrode as an electrical current. One or more properties of the electrical current can be indicative of the fissile neutron detected by the thermal neutron detector.

Another embodiment of a fissile neutron detection system is provided which includes at least one thermal neutron detector. Each thermal neutron detector can include a body having a length, a width, and a thickness defining a closed chamber; the length and the width of the chamber greater than the thickness of the chamber, at least one active material that emits at least one ionizing particle upon exposure to thermal neutrons, the active material disposed within the chamber and at least one electrode disposed in the chamber. The fissile neutron detection system can further include at least one neutron moderator disposed proximate the at least one neutron detector. Each neutron moderator can include a material that transitions at least a portion of high-energy incident fissile neutrons to low-energy thermal neutrons.

An embodiment of a fissile neutron detection method is also provided. The embodiment can include transitioning at least some incident fissile neutrons to thermal neutrons by passing the incident fissile neutrons through at least one neutron moderator disposed proximate at least one thermal neutron detector. Each thermal neutron detector can include a body having a length, a width, and a thickness defining a closed chamber; the length and the width of the chamber greater than the thickness of the chamber. Each neutron detector can further include at least one active material that emits at least one ionizing particle upon exposure to thermal neutrons, the active material disposed within the chamber and at least one electrode disposed in the chamber. The method can additionally include impinging at least 60% of the thermal neutrons exiting the neutron moderator on the at least one active material disposed in the chamber of the at least one neutron detector. The method can further include generating, by the at least one thermal neutron detector, a current at the at least one electrode, the current proportional to the number of thermal neutrons impinging on the at least one active material in the at least one thermal neutron detector.

Still another embodiment of a fissile neutron detection system is provided. The fissile neutron detection system can include a first thermal neutron detector, a second thermal neutron detector, and a neutron moderator. Each of the neutron detectors can include a body having a length, a width, and a thickness that define a hermetically sealed, continuous chamber, wherein the length and the width of the body exceed a thickness of the body. Each thermal neutron detector can also include at least one active material disposed within the hermetically sealed chamber, the at least one active material to emit at least one charged particle upon exposure to a thermal neutron. Each thermal neutron detector can additionally include at least one electrode disposed within the chamber and electrically isolated from the body. The neutron moderator can be disposed proximate the first thermal neutron detector and the second thermal neutron detector. The neutron moderator can be disposed in a space between the first thermal neutron detector and the second thermal neutron detector. The neutron moderator can include one or more hydrogen-containing materials that transition at least a portion of high-energy incident fissile neutrons to low-energy thermal neutrons that are detectable by the first thermal neutron detector or the second thermal neutron detector.

As used herein, the terms "top" and "bottom", as well as other descriptive terminology, are intended to provide a relative rather than absolute reference to a location and is not intended to limit a positional relationship merely on the basis of descriptive nomenclature. Thus, inverting an object having a "top cover" and a "bottom cover" can place the "bottom cover" on the top of the object and the "top cover" on the bottom of the object. Such configurations should be considered as included within the scope of this disclosure.

As used herein, the terms "first," "second," and other similar ordinals are intended to distinguish a number of similar or identical objects and not to denote a particular or absolute order of the objects. Thus, a "first object" and a "second object" can appear in any order including an order in which the second object appears before or prior in space or time to the first object. Such configurations should be considered as included within the scope of this disclosure.

Figure 1B:
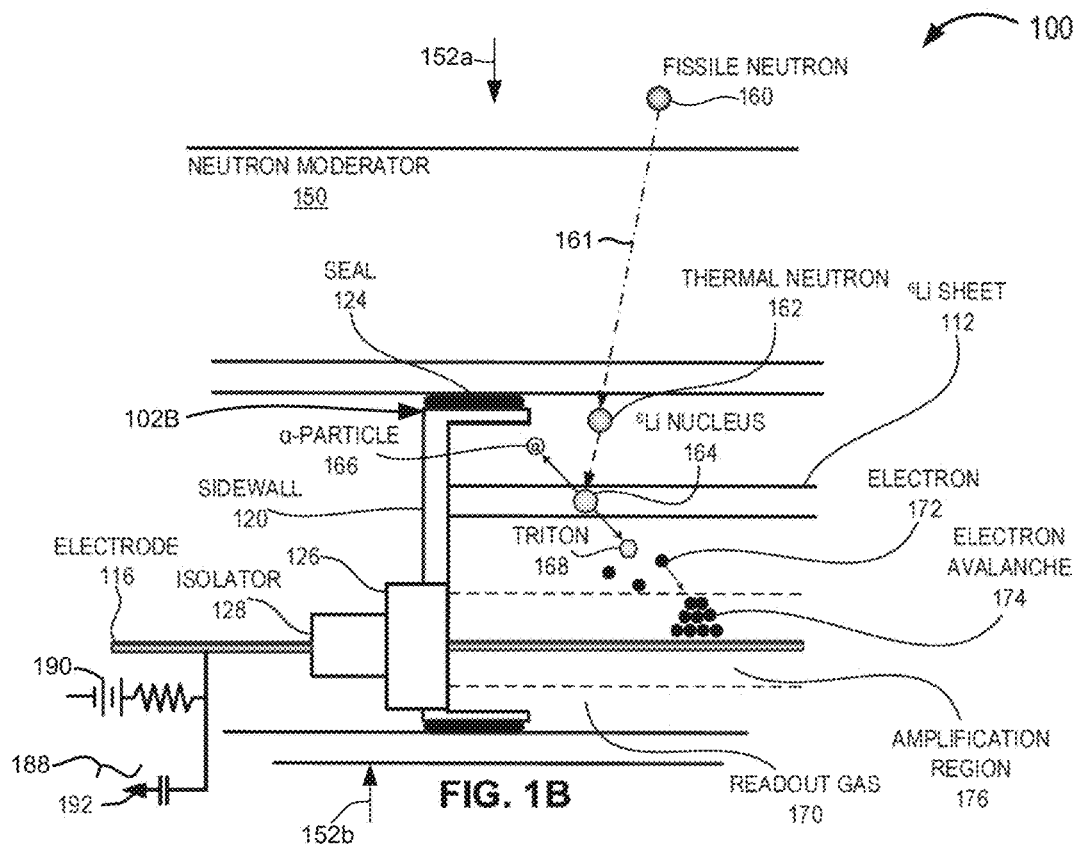
FIG. 1B is a diagrammatic fragmentary, cutaway view, in elevation, of the illustrative fissile neutron detection system depicted in FIG. 1A, shown here to illustrate details of its operation.
Figure 1C:
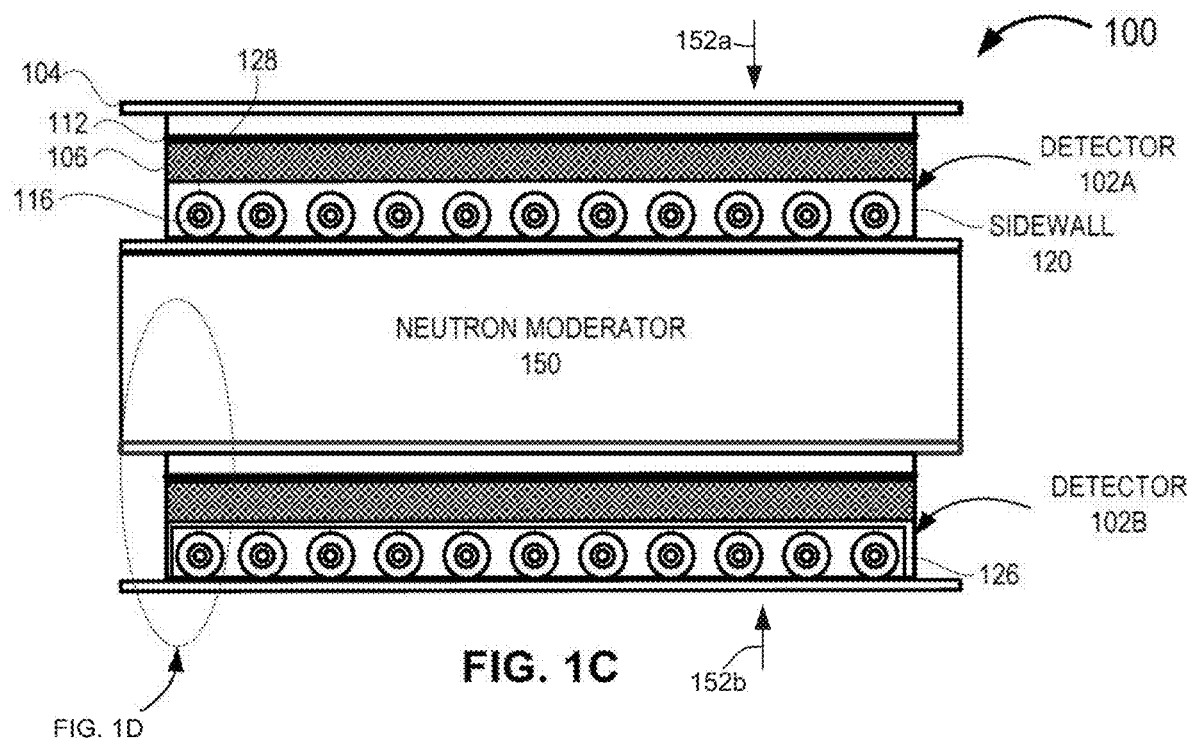
FIG. 1C is a diagrammatic side elevation view, in elevation, of the illustrative fissile neutron detection system depicted in FIG. 1A, in accordance with at least one embodiment of the present disclosure.
Figure 1D:
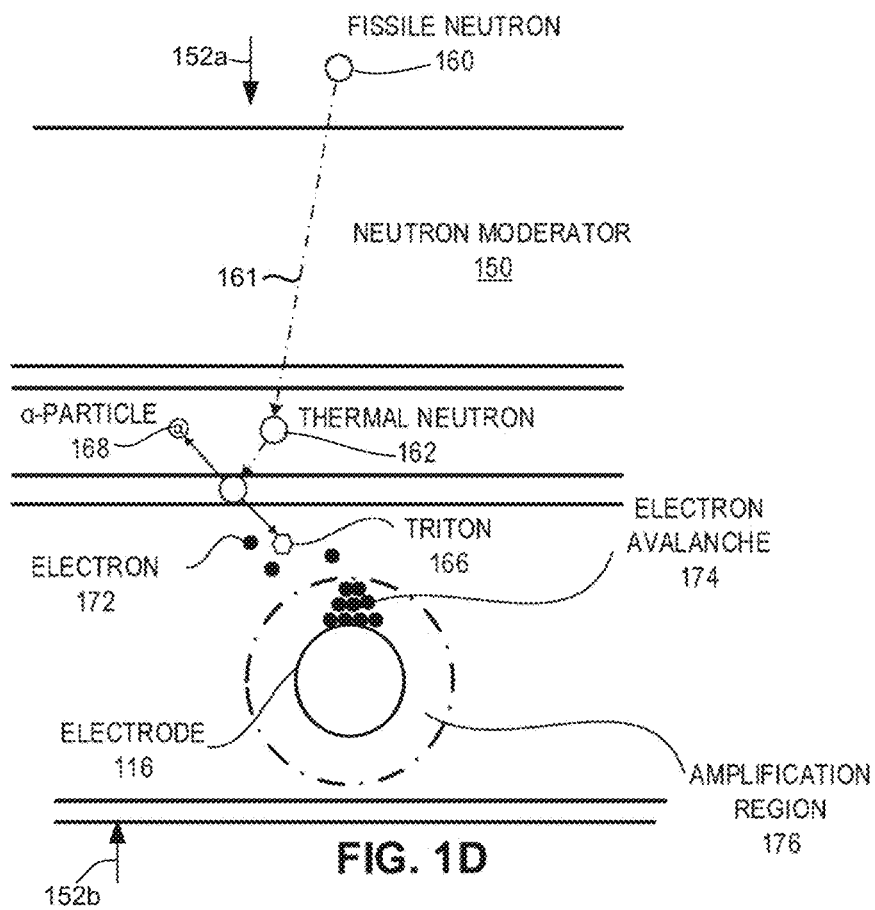
FIG. 1D is a diagrammatic, fragmentary cutaway view of the illustrative fissile neutron detection system depicted in FIG. 1C, shown here to illustrate details of its operation.
Figure 1E:
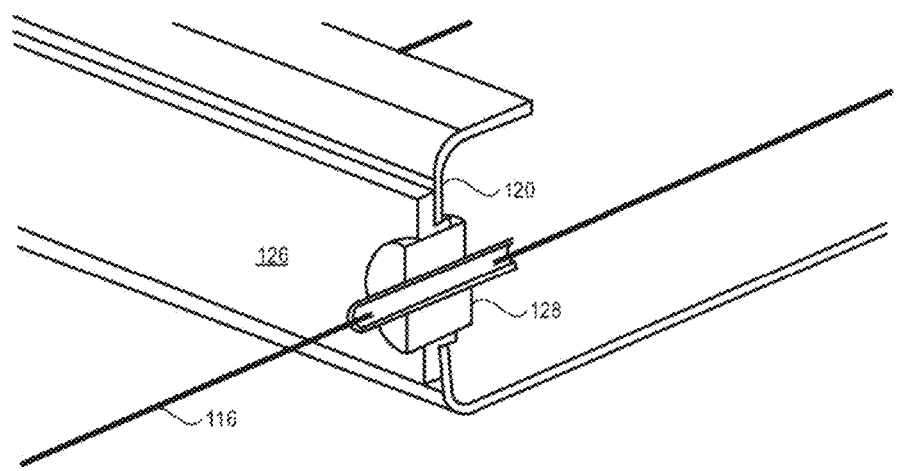
FIG. 1E is a diagrammatic fragmentary, cutaway view of an illustrative isolator through which an electrode is introduced to an interior chamber in the thermal neutron detector, in accordance with at least one embodiment of the present disclosure.

FIG. 1A is a front elevational view of an illustrative embodiment of a fissile neutron detection system 100 that includes a first thermal neutron detector 102A, a second thermal neutron detector 102B (collectively, "thermal neutron detectors 102") and a neutron moderator 150 that is at least partially disposed proximate first thermal neutron detector 102A and second thermal neutron detector 102B in a space, cavity or volume formed between first thermal neutron detector 102A and second thermal neutron detector 102B, in accordance with at least one embodiment of the present disclosure. FIG. 1B is a partial sectional view of a portion of fissile neutron detection system 100 shown circled in FIG. 1A, in accordance with at least one embodiment of the present disclosure. FIG. 1B diagrammatically depicts operational level details of fissile neutron detection system 100. FIG. 1C is a side elevation of illustrative fissile neutron detection system 100 depicted in FIG. 1A, in accordance with at least one embodiment of the present disclosure. FIG. 1D is a partial sectional view of fissile neutron detection system 100 shown circled in FIG. 1C, in accordance with at least one embodiment of the present disclosure. FIG. 1D diagrammatically depicts operational level details of fissile neutron detection system 100. FIG. 1E is a partial sectional view of an embodiment of an isolator 128 through which an electrode 116 is disposed within thermal neutron detector(s) 102.

Although first thermal neutron detector 102A and second thermal neutron detector 102B are depicted and described in association with FIGS. 1A-1E, other arrangements that include only a single neutron detector 102 are considered as embodiments of the concepts described herein.

Neutron moderator 150 can be a single or multi-piece member having any number or combination of shapes or configurations. Regardless of shape and/or configuration, neutron moderator 150 has a surface area that can be defined by the external sides of neutron moderator 150. Such surface area can include exposed (e.g., outwardly facing) exterior surfaces, hidden (e.g., inwardly facing) exterior surfaces, or any combination thereof. For example, the surface area of a planar neutron moderator 150 having an annulus therethrough would include the surface area of the plane, the "edges" of the plane, and the surface area about the perimeter of the annulus. A majority of the surface area of neutron moderator 150 can be disposed proximate one or more thermal neutron detectors 102. In various embodiments, neutron moderator 150 can include a proximate surface area (i.e., a surface area that is in contact and/or nearest to the thermal neutron detectors, as opposed to extending beyond the periphery or moderator region defined by the thermal neutron detector(s)) that is substantially greater than the total moderator surface area in one embodiment and greater than approximately 60% of the total moderator surface area in another embodiment. The moderator or moderator arrangement serves to define what may be referred to as the lateral extents of the detection system. For example, the lateral extents of an orthorectangular moderator likewise define a rectangle. The lateral extents can define any suitable shape without limitation.

A flux of fissile neutrons can be can be incident on the fissile neutron detection system generally originating along either one or both of two major receiving directions with a first major receiving direction 152a diagrammatically indicated by arrows and a second major receiving direction 152b diagrammatically indicated by arrows. These example receiving directions are at least generally opposite of one another. While the operation of fissile neutron detection system 100 can conveniently be described and understood based on the first and second opposing major receiving directions, it should be appreciated that the incident fissile neutrons or a flux(es) thereof can be received from a wide range of receiving directions, most of which are not normal to the opposing major outwardly facing surfaces of the overall assembly. Thus, the detection of fissile neutrons is not limited to the first and second major receiving directions. However, while Applicants recognize that the fissile neutron detection systems described herein are certainly capable of efficiently detecting fissile neutrons over a wide range of incident angles, these designs and methods are nevertheless explicitly intended for optimization with respect to the major receiving directions rather than omnidirectional receiving capability. Indeed, many distinguishing aspects of these teachings are considered by Applicants to be related to performance optimization that could be rendered somewhat less clear if any specification of receiving directionality was simply removed from consideration, and at least some aspects of these teachings could be rendered moot in applications wherein directional requirements stray sufficiently far from those that are discussed herein.

Applicants recognize that thermal neutron detectors 102A and 102B are at least substantially transparent to the incident fissile neutrons. That is, the incident fissile neutrons generally do not interact with the thermal neutron detectors, but instead travel through the thermal neutron detectors to then reach moderator 150. The neutrons are most often detected by the thermal neutron detector(s) subsequent to moderation/slowing.

Turning to FIG. 1B, at least a portion of the incident fissile neutrons, one of which is indicated by the reference number 160, impinging upon neutron moderator 150 can enter, strike, or otherwise impinge upon neutron moderator 150. Since the present descriptions relating to fissile neutron 160 apply essentially to all incident fissile neutrons that are subsequently detected, the reference number 160 can interchangeably reference a flux or plurality of incident fissile neutrons. Based on the descriptions above, it should be appreciated that fissile neutron 160 may have already transited through thermal neutron detector 102A. A path 161 for fissile neutron 160 through moderator 160 is shown as a straight line, however, it is noted that this path can be complex, and considered as a chain of causality between its origination and end points rather than an actual trajectory. Details with respect to this chain of causality will be described at various points hereinafter. Within neutron moderator 150, energy of the fissile neutron can be reduced in elastic scattering events in which the fissile neutrons collide with hydrogen nuclei within the moderator. As a result of these collisions, the energy level of fissile neutron 160 is reduced to that of a thermal neutron which is indicated by the reference number 162. Also, as a result of the random nature of these collisions, low-energy thermal neutron 162 can exit the neutron moderator along the same or a different vector than incident fissile neutron 160. By placing a majority of the surface area of neutron moderator 150 proximate to each neutron detector 102, the probability of detecting thermal neutron 162 exiting the neutron moderator is increased. In various embodiments, the probability that incident fissile neutron(s) 160 will pass through detector 102 after exiting neutron moderator 150 as thermal neutron(s) 162 can be approximately 60%. As will be described hereinafter, the percent of thermal neutrons detected can depend on a number of factors, and can be determined by a designer, at least in part, based on tradeoffs that can influence the thickness, weight and cost of the overall detector system.

Each of neutron detectors 102 includes a top cover 104, a bottom cover 108, and sidewalls 120 that form a chamber 105. In some implementations, one or more gas tight or gas impervious seals 124 can be disposed in the joints formed by the sidewall 120 and the top cover 104 and the sidewall 120 and the bottom cover 108. In at least some implementations, the seals 124 can isolate or hermetically seal chamber 105 to minimize or even prevent exchange of gases or fluids between chamber 105 and the exterior environment. In some implementations, chamber 105 can include a single, continuous (i.e., uninterrupted) chamber 105. In some implementations, chamber 105 can contain one or more gases or gas combinations. For example, chamber 105 can contain a noble gas such as argon (Ar). In some implementations, at least one layer or sheet of active material 112 is arranged with a support matrix 106 (FIG. 1C) to support each layer or sheet of active material 112. In this embodiment, a number of electrodes 116 can extend partially or completely through all or a portion of the chamber 105. Isolators 128 can be disposed at locations where the electrodes 116 extend through a wall or cover of the chamber 105 to electrically isolate electrode 116 from the sidewall or cover of chamber 105. Although not depicted in FIGS. 1A-1E, in some implementations, all or a portion of the number of electrodes 116 can penetrate the top cover 104 and/or bottom cover 108 to enter the chamber 105 of the neutron detector 102 rather than penetrating sidewall 120. In such instances, one or more isolators 128 can be disposed about electrodes 116 at the point the electrodes penetrate into chamber 105. As depicted in FIGS. 1A thru 1D, during operation, neutrons impinge upon fissile neutron detection system 100. Fissile neutrons 160 can be produced, for example, by plutonium (Pu) or other highly enriched uranium (HEU) products such as may be found in nuclear or radiological explosive device. Within chamber 105 of each of thermal neutron detectors 102, a sheet of active material 112, such as lithium 6 ($^6$Li) can be disposed on a support structure 106 such as, for example, an aluminum honeycomb matrix. Fissile neutrons impinging upon fissile neutron detection system 100 can pass through neutron moderator 150 where the energy level of at least a portion of incident fissile neutrons 160 (between 100 keV and 10 MeV) can be reduced to the energy level of a thermal neutron 162 (e.g., less than 0.1 eV).

Thermal neutron(s) 162 can be captured by one of the $^6$Li atoms contained in active material 112. The capture of thermal neutron 162 by the $^6$Li atom forms a lithium 7 ($^7$Li) atom that can decay into two daughter particles, an alpha particle 166 and a triton 168. Triton 168 and alpha particle 166 travel in opposite directions, and dissipate energy as they travel through active material 112. Upon exiting active material 112, at least some of tritons 168 or alpha particles 166, having sufficient kinetic energy, ionize atoms in readout gas 170 disposed within chamber 105. Electrons 172 produced by the ionization of readout gas 170 can drift towards electrodes 116 in the chamber and the ionized gas generated by the ionization of readout gas 170 can drift towards active layer 112. Electrons 172 that drift within amplification region 176 (i.e., the Townsend avalanche region approximately 5 times the radius of electrode 116) encounter an electric field that accelerates drifting electrons 172 to a sufficient velocity that additional readout gas 170 can be ionized. The additional ionized readout gas can create additional electrons 172 that also tend to drift toward electrodes 116 and cause additional ionization of readout gas 170. This process that occurs within the Townsend avalanche can be referred to as "gas multiplication." Ionized atoms of readout gas 170 within the Townsend avalanche region that move towards the active layer 112 induce a current flow along electrode 116. In some implementations, the current along electrode 116 can be collected and amplified using a pulse-mode, charge-sensitive preamplifier to produce a voltage output signal 188 on an output 192. Pulse height discrimination circuitry can be used to compare the voltage output signal to a first defined threshold to determine whether fissile neutron(s) 160 has been detected (e.g., for a gas multiplication of roughly 100, and an amplification circuitry gain of approximately 1 fC/mV, pulse heights greater than approximately 250 keV can indicate the presence and/or detection of fissile neutron(s) 160).

In some embodiments, the false positive detection rate of fissile neutron(s) 160 based on the first predetermined threshold can be less than $1\times10^{-5}$ for a gamma ray exposure rate of 100 mR/hr. A second predetermined threshold can be selected and can be set at a value that is less than the first predetermined threshold. Voltage output signals 192 below the second predetermined threshold can be deemed as very low ionizing gamma ray events or movements of charge in fissile neutron detection system 100 that were induced by another source (e.g., thermal heat, radio frequency electromagnetic radiation, and changes in the relative position of electrodes 116 and active layer 112—known as microphonics). Voltage output signal 188 below the first predetermined threshold and above the second predetermined threshold can be indicative of gamma ray events. The detected rate of neutrons and gamma rays impinging upon fissile neutron detection system 100 can be used in radiation detection methodologies (e.g., to detect the presence of a nuclear weapon or unauthorized nuclear device).

In embodiments, the composition of readout gas 170 can be maintained relatively constant over time to avoid deterioration of the gamma ray and neutron detection process. Change in readout gas 170 composition greater than 1% in the composition can affect the Townsend avalanche process. For example, nitrogen, oxygen, or water molecules that leak into the chamber 105 may not ionize as well as a readout gas 170, such as argon, in the amplification region 176 near the electrodes 116, and therefore may reduce the Townsend avalanche process near the electrodes 116 when introduced into the readout gas 170. This can reduce the ability of the readout electronics to distinguish between noise, gamma ray, and fissile neutron events, thereby decreasing the efficiency and/or accuracy of fissile neutron detection system 100. A 1% change in the composition of readout gas 170 can cause up to an 8% change in voltage output signal 188. To maintain accuracy and responsiveness of the fissile neutron detection system, it can be advantageous to limit the change in composition of readout gas 170 by minimizing the following: (1) the egress of readout gas 170 from chamber 105; and (2) the ingress of contaminants, including air constituents (nitrogen, oxygen, carbon dioxide), water, and other airborne molecules, into chamber 105.

Top cover 104 and bottom cover 108 can be fabricated from one or more materials that permit the passage of thermal neutrons 162 from neutron moderator 150 to chamber 105. In at least some implementations, top cover 104 and bottom cover 108 can be fabricated from one or more suitable stainless steels, such as, an 18/8 stainless steel, a 304 stainless steel, a 304L stainless steel, a 316 stainless steel, or a 316L stainless steel. Other grades and materials can be substituted with equal efficiency. Top cover 104 and bottom cover 108 define the overall configuration of neutron detector 102. In one example, top cover 104 and bottom cover 108 can include generally planar members in such embodiments, the neutron detector 102 can have a generally planar configuration, for example a square periphery of major opposing surfaces having a side length of approximately 20 cm to 100 cm. Top cover 104 and bottom cover 108 can have other shapes, such as triangular, octagonal, hexagonal, circular, elliptical, rectangular, or even irregular shapes to fit within designated areas. Similarly, chamber 105 at least partially formed and/or bounded by top cover 104 and/or bottom cover 108 can have any shape, configuration, or regular/irregular perimeter. For example, the shapes defined by the lateral periphery chamber 105 can be generally square, generally rectangular, generally oval, generally elliptical, generally circular, generally triangular, generally polygonal, generally trapezoidal, or any other regular or irregular configuration. In some implementations, all or a portion of chamber 105 can be spherical or hemispherical and all or a portion of neutron moderator 150 can be spherical and placed concentrically within the chamber 105 of thermal neutron detector 102.

In some embodiments, chamber 105 can be defined by three, mutually orthogonal, measurements, such as a length, a width, and a thickness. Major lateral extents of chamber 105 can have any suitable dimensions in accordance with a given application, and various thicknesses can be selected in accordance with the teachings and descriptions herein. In various such embodiments, top cover 104 and/or bottom cover 108 can define either or both the length and the width of chamber 105. In such embodiments, sidewall 120 can define the thickness of chamber 105. Chamber 105 can have a length and width that greatly exceed the thickness of chamber 105. In some embodiments, the length of chamber 105 measured along a first axis can exceed the thickness of chamber 105 measured along a second axis orthogonal to the first axis by a factor of approximately 20 times or greater. In some embodiments, the width of chamber 105 measured along a third axis can exceed the thickness of chamber 105 measured along the second axis orthogonal to the third axis by a factor of approximately 5 times or greater.

In some embodiments, chamber 105 can have a length, measured along a first axis, of approximately 100 centimeters (cm). In some embodiments, chamber 105 can have a thickness, measured along a second axis orthogonal to the first axis, of approximately 2 to 5 centimeters (cm). In some embodiments, chamber 105 can have a width, measured along a third axis orthogonal to the first axis and the second axis, of approximately 20 centimeters (cm).

In other embodiments, a number of which will be described at appropriate points hereinafter, top cover 104 and bottom cover 108 can have configurations other than planar, for example top cover 104 can include a simple or compound curved surface having a first radius while bottom cover 108 can include a similar simple or compound curved surface having a second radius that is greater or less than the first radius. Such an implementation can provide a thermal neutron detector that is curved, arced, or hemispherical.

In yet other embodiments, top cover 104 and bottom cover 108 can have generally similar irregular shapes that permit the construction of thermal neutron detectors 102 having virtually any size, shape, and/or physical configuration. Such irregular shapes can, for example, advantageously permit the custom fitting of thermal neutron detectors 102 within odd or irregular shaped housings. In at least some implementations, all or a portion of top cover 104 and/or bottom cover 108 can be integrally formed with all or a portion of sidewall 120 to eliminate one or more joints between respective cover 104, 108 and sidewall 120. In some implementations, all or a portion of top cover 104 and/or bottom cover 108 can be affixed to all or a portion of sidewall 120 using one or more adhesives, by welding or brazing, or similar attachment or affixment techniques capable of providing a gas tight seal between sidewall 120, top cover 104, and bottom cover 108. In some implementations, top cover 104, bottom cover 108, and at least a portion of sidewall 120 can be integrally formed, for example using one or more casting, extrusion, injection molding, or similar processes in which all or a portion of top cover 104, all or a portion of bottom cover 108, and a portion of sidewalls 120 are seamlessly formed.

In some embodiments, some or all of seals 124 between sidewall 120 and top cover 104 and/or sidewall 120 and bottom cover 108 can be formed from an elastomeric compound that is compressed or otherwise formed to the mating surfaces of sidewall 120 and top cover 104 and/or sidewall 120 and bottom cover 108. In some implementations all or a portion of seals 124 can include polyisobutylene or one or more polyisobutylene containing compounds to maintain the composition of readout gas 170 over an extended timeframe (e.g., 30 years). Beneficially, the use of flexible elastomeric seal 124 provides the ability for seal 124 to conform to the mating surfaces of sidewall 120, top cover 104 and/or bottom cover 108, filling any imperfections in the mating surfaces and minimizing the likelihood of readout gas 170 leakage through gaps formed by imperfections in the mating surfaces.

In some embodiments, the quality of the mating surfaces found on top cover 104, bottom cover 108, and/or sidewalls 120 can be selected to generate uniform electric fields near electrodes 116 of the fissile neutron detection system 100 (e.g., the variance in the finish on the mating surfaces of top cover 104, bottom cover 108, and/or sidewall 120 can be equal to or less than 0.020" inches). Providing such a surface finish on the mating surfaces improves sealing of the chamber 105 and takes advantage of the sealing properties of seal 124, at least when elastomeric, which can accommodate such fluctuations in the surface finish of the mating surfaces.

The use of elastomeric seal 124 can also facilitate a low temperature manufacturing process that minimizes or even eliminates high temperature processes, such as welding or brazing, on fissile neutron detection system 100 which reduces warping and bending of the components of fissile neutron detection system 100. An elastomeric seal can also accommodate thermal expansion/contraction of the chamber components, thereby allowing a greater number of material choices for top plate 104, bottom plate 108, and sidewalls 120 such as glass, aluminum, or stainless steel. Elastomeric seal 124 can have a thickness in the range of approximately 25 micrometers ($\mu$m) to approximately 1 centimeter (cm) and a width in the range of approximately 1 cm to approximately 5 cm. Such an elastomeric seal 124 can provide less than 1% leakage, as a percentage of the volume of the chamber, of an argon-methane readout gas 170 from chamber 105, and less than 1% leakage of oxygen into chamber 105 over a 30 year period for chamber 105 having a length of approximately 0.5 m, a width of approximately 1 m, and a thickness of approximately 1 cm. In one implementation, elastomeric seal 124 can include a polyisobutylene seal 124 having a width of approximately 1.5 cm, a total surface area of 30 square centimeters ($cm^2$), can maintain an oxygen leak rate into the chamber 105 of approximately $1.3 \times 10^{-10}$ $cm^3 \cdot cm/(s \cdot cm^2 \cdot cm\text{-}Hg)$. A leak rate of approximately $1.3 \times 10^{-10}$ $cm^3 \cdot cm/(s \cdot cm^2 \cdot cm\text{-}Hg)$ provides an oxygen concentration of approximately 0.75% by volume for a chamber 105 having a volume of approximately 5000 cubic centimeter ($cm^3$) after 30 years of operation.

In some embodiments, all or a portion of sidewalls 120 can be fabricated using one or more metallic materials, such as stainless steel. In some embodiments, all or a portion of the sidewall 120 can be fabricated using aluminum or an aluminum containing alloy. In some embodiments, sidewall 120 can have a mating surface or lip that, upon assembly, is disposed proximate top cover 104, bottom cover 108, or both top cover 104 and bottom cover 108. In some implementations, the mating surface can be machined or similarly finished to remove irregularities in the surface and provide a relatively smooth sealing surface.

In some embodiments, readout gas 170 can include one or more pure or nearly pure noble gases, such as argon (Ar). In some embodiments, readout gas 170 can include a gas mixture, for example a gas containing 90 percent by volume (vol %) argon and 10 vol % quenching gas such as carbon dioxide or methane. In some implementations, the voltage bias applied to electrode 116 can be adjusted, controlled, or otherwise altered based at least in part on the composition of readout gas 170. In such instances, a small (e.g., 1%) change in the bias voltage applied to electrode(s) 116 can cause a larger change (e.g., up to approximately 15%) in the voltage output signal provided by or generated by electrode(s) 116.

Active material 112 disposed in chamber 105 can include one or more sheets of active material disposed within the chamber, one or more layers of active material disposed within the chamber, or in some implementations, an active gas disposed within chamber 105. In some implementations, the active material can include lithium 6 ($^6$Li), boron 10 ($^{10}$B), and helium 3 ($^3$He) as well as some combination thereof. In some embodiments, active material 112 can include a sheet of active material such as a sheet of $^6$Li foil that, in some embodiments, can be supported within chamber 105 by support matrix 106. The latter can be, by way of non-limiting example, a honeycomb formed, for instance from aluminum or a stainless steel mesh that can be generally planar, rather than a honeycomb. In such implementations, the length and width of sheet 112 of active material can greatly exceed the thickness of the layer of active material. In such implementations, the length and width of sheet 112 of active material can greatly exceed the thickness of neutron detector 102. In such implementations, the length and width of sheet 112 of active material can greatly exceed the thickness of chamber 105.

In some embodiments using one or more sheets of $^6$Li foil as active material 112, each sheet of $^6$Li foil can have a length and a width each of which greatly exceeds the thickness of the foil. In some embodiments, the sheet of $^6$Li foil can have a thickness of approximately 100 micrometers (μm). In some embodiments, the sheet of $^6$Li foil can have a width of approximately 20 centimeters (cm). In some embodiments, the sheet of $^6$Li foil can have a length of approximately 100 centimeters (cm).

Embodiments in which active layer 112 is disposed at an intermediate point within the chamber can advantageously detect tritons 166 emitted from both sides of active layer 112. In contrast, tritons 166 emitted from only one side of active layer 112 can be detected in embodiments in which active layer 112 is disposed proximate top cover 104 and/or bottom cover 108 rather than disposed at an intermediate point in chamber 105.

In some embodiments, active material 112 can include a layer of active material such as a layer of $^{10}$B that can be disposed on substrate that is disposed within chamber 105. In some embodiments, active material 112 can include a layer of active material such as a layer of $^{10}$B that can be disposed (e.g., via chemical vapor deposition or similar processes) on all or a portion of an interior surface of top cover 104, bottom cover 108, and/or sidewalls 120 forming chamber 105. In such implementations, each of the length and width of the layer of active material 112 can greatly exceed the thickness of the layer of active material 112. In such implementations, each of the length and width of the layer of active material 112 can greatly exceed the thickness of thermal neutron detector 102. In such implementations, each of the length and width of the layer of active material 112 can greatly exceed the thickness of chamber 105. With regard to the foregoing discussions and those which follow, it should be appreciated that the terms "length" and "width" are applied in terms of describing the lateral extents of major surface areas of the various components in a pair of orthogonal directions that are transverse or orthogonal to the thicknesses of the various components as well as to the thickness of the overall fissile neutron detection system. Furthermore, insofar as a given detector is configured for operation with respect to a given receiving direction, it should be appreciated that the lateral extents of that given detector can generally be considered as being at least approximately orthogonal to that receiving direction. For the case of bidirectional detectors the two major receiving directions can be aligned along a single receiving axis with one major receiving direction antiparallel to the other major receiving direction, and the lateral extents can be oriented at least approximately orthogonal to that receiving axis. In some instances, a peripheral outline of the lateral extents of an irregularly-shaped fissile neutron detector can have a lateral extent that does not exceed the subject thickness requirements, however, the lateral extents will nevertheless be seen to circumscribe at least one major area in a plan view which major area falls within the scope of the present disclosure as well as the appended claims.

In some implementations, active material 112 can include one or more active gas species, for example helium 3 ($^3$He). In such instances, chamber 105 can be filled with one or more active gases or a mixture that includes one or more active gases. In some implementations, a combination of active sheets, active layers, and/or active gases can be disposed within chamber 105.

In some implementations, all or a portion of top cover 104 and/or bottom cover 108 can be formed into a dished or tray-like form such that top cover 104 and/or bottom cover 108 form at least a portion of sidewall 120, and can, on occasion, form the entirety of sidewall 120 of chamber 105. In some implementations, neutron detector 102 can have a thickness (that includes top cover 104, sidewall 120 (if present), and bottom cover 108 of approximately 2 to 5 centimeters (cm).

Top cover 104 and bottom cover 108 can have any suitable dimensions, geometry, and/or configuration to provide thermal neutron detector 102 having any suitable shape or geometry. In some implementations, thermal neutron detector 102 can be in the physical configuration of a planar structure having a length and width that greatly exceeds the thickness of thermal detector 102. In some implementations, the length of thermal neutron detector 120, measured along a first axis, can be from approximately 5 or more times the thickness of detector 102 to approximately 100 or more times the thickness of detector 102. In some implementations, the width of thermal neutron detector 102, measured along a second axis that is orthogonal to the first axis, can be from approximately 3 or more times the thickness of thermal detector 102 to approximately 50 or more times the thickness of thermal detector 102. In some implementations, thermal neutron detector 102 can have a length, measured along a first axis, of from approximately 10 centimeters (cm) or greater to approximately 1000 cm or greater; a thickness, measured along a second axis orthogonal to the first axis, of from approximately 0.5 centimeters (cm) or less to approximately 5 cm or less; and a width, measured along a third axis orthogonal to the first axis and the second axis of from approximately 30 cm to approximately 500 cm. In such implementations, top cover 104 and bottom cover 108 can have a corresponding width of from approximately 30 cm to approximately 500 cm; and a corresponding length of from approximately 10 cm or less to approximately 100 cm or less.

Other thermal neutron detector 102 physical configurations are possible. For example, thermal neutron detector 102 can be curved about a single axis to provide chamber 105 that is arced or parabolic. In such an implementation, top cover 104 and bottom cover 108 can be arced or parabolic along the desired axis to provide chamber 105. In another example, thermal neutron detector 102 can be curved about two axes to provide chamber 105 that is a concave dish, a convex dish, or hemispherical. In such an implementation, top cover 104 and bottom cover 108 can be arced or dished along the respective axes to provide the arced or dished chamber 105. In some implementations, top cover 104 and/or bottom cover 108 can be fabricated using one or more stainless steels, aluminum, or one or more aluminum alloys. Top cover 104 and/or bottom cover 108 can be made of glass such as soda-lime or borosilicate glass.

In some embodiments, some or all of electrodes 116 can pass through sidewall 120 of the neutron detector 102. In some embodiments, some or all of electrodes 116 can pass through top cover 104 and/or bottom cover 108 of thermal neutron detector 102. Any number of electrodes 116 can be disposed within chamber 105. Each of electrodes 116 can have any profile or shape, for example, electrodes 116 can include conductors having a round cross section with a diameter of from approximately 25 micrometers (μm) to approximately 150 μm. In embodiments, electrodes 116 can be tensioned to approximately 33% to approximately 67% of the breaking or failure limit for the electrode material. In another embodiment that is illustrated by a subsequent figure, a single feedthrough can couple to a plurality of electrodes 116.

One or more isolators 128 can electrically isolate electrodes 116 from sidewall 120, top cover 104, and/or bottom cover 108 of neutron detector 102. In some implementations, one or more isolators 128 can hermetically seal about electrode 116, thereby maintaining the hermetic integrity of chamber 105. In some implementations, each of one or more isolators 128 can permit the passage of electrode 116 through an aperture extending through isolator 128. After passing electrode 116 through isolator 128, the space around isolator 128 can be filled using a material such as solder, conductive epoxy, brazing, or welding. The tube length through isolator 128 and the inner diameter of isolator 128 can be selected based on a variety of factors. For example, the shear strength of Sn-37Pb and Sn-3.5Ag solder can exceed 3000 pounds per square inch (psi). With a tension of approximately 450 grams or 1 pound on a 50 μm diameter tungsten rhenium wire, a solder length of approximately 7 millimeters (mm) would provide a safety factor of 5. Isolators 128 can include any current or future developed electrical insulator. Non-limiting examples of such electrical insulators include, but are not limited to, glass isolators, ceramic isolators, Bakelite isolators, resin isolators, epoxy isolators, and similar.

In some implementations, thermal neutron detector 102 can include one or more isolator feedthrough inserts 126. Beneficially, feedthrough inserts 126 can be manufactured separate from thermal neutron detector 102 using a separate process that provides a glass-to-metal or ceramic-to-metal feedthrough assembly process. Such construction permits the formation of a hermetic seal between the isolator feedthrough inserts 126, isolator 128 and electrode 116 without requiring feedthrough inserts 126 to be incorporated during the manufacturing process of neutron detector 102. Feedthrough inserts 126 can be modularly constructed and can contain any number of electrodes 116. Feedthrough inserts 126 can be affixed to thermal neutron detector 102 via one or more processes such as welding or brazing.

In some implementations, electrodes 116 can be disposed generally parallel to each other and extending from a first side (i.e., major surface) of thermal neutron detector 102 to a second side (i.e., major surface) of thermal neutron detector 102. Any suitable electrode configuration can be used, for example, implementations in which some or all of electrodes 116 are arranged in a pattern such as a star pattern in which electrodes 116 are not parallel to each other. In various embodiments, electrodes 116 can be maintained at the same potential or different potentials. For example, in thermal neutron detectors 102 using a sheet type active material 112, an electrical source 190 can maintain electrodes 116 at a positive or negative potential measured with respect to sheet-type active material 112. In some implementations, electrodes 116 can be maintained at a potential of approximately 1100 volts (V) greater than active material 112.

Moderator 150 includes one or more materials capable of reducing an energy level of fissile neutron 160 to an energy level of thermal neutron 162. Such reduction in energy level of fissile neutron 160 occurs within moderator 150 as fissile neutron 160 impacts nuclei in moderator 150. Moderator 150 can include one or more materials that include a minimum of approximately 10 percent atoms per $cm^3$. Moderator 150 can include one or more solids, one or more liquids, and/or one or more compressed gases, or combinations thereof. The use of moderators containing predominantly larger nuclei (e.g., carbon) can disadvantageously cause ricocheting (rather than the preferred slowing) of the incident fissile neutrons 160.

In at least some implementations, all or a portion of moderator 150 can be disposed between first thermal neutron detector 102A and second thermal neutron detector 102B. In some implementations, no air gap or similar void is formed between moderator 150 and the exterior surface of top cover 104 and/or exterior surface of the bottom cover 108 of the neutron detector 102. In other words, the major, opposing sides (i.e., major, opposing surfaces) of the moderator can be in direct physical contact with one of the major surfaces of each thermal neutron detector 102. In some implementations, an air gap (or some other form of void or space disposed between the moderator and the detector arrangement) can exist between moderator 150 and the exterior surface of top cover 104 and/or the exterior surface of bottom cover 108 of neutron detector 102. Applicants recognize that in the context of the described embodiments the distance between the moderator or moderator arrangement and the thermal neutron detectors can generally be minimized in order to ensure that thermal neutrons do not escape the detection system after exiting the moderator. In a manner consistent with minimal gaps, embodiments that are within the scope of the present disclosure can at least substantially fill the volume (i.e., greater than 50 percent) of a moderator region that is defined between the thermal neutron detectors with moderating material. In one embodiment, at least 60 percent of the volume of the moderator region is filled by moderating material. In this regard, a moderating arrangement can include a single member or multiple members of moderating material. Interstitial gaps between multiple members do not contribute to the filled volume. With this disclosure in hand it should be clear that excessive thermal neutron detector-to-moderator spacing will generally reduce overall efficiency. Applicants recognize that for a fissile neutron detection system in which a thermal neutron detector arrangement surrounds a given moderator, as taught herein, increasing the moderator-to-detector spacing, in addition to reducing detection efficiency, will generally require the designer to increase the surface area of the detectors that make up the detector arrangement in order to insure that the thermal neutron detector arrangement continues to surround the moderator at the increased moderator-to-detector spacing. Since the active sheet layer(s) tends to be composed of relatively costly material, such as Lithium, such configurations can result in increased cost with a detrimental effect on detection efficiency. Furthermore, as described at various points previously, insofar as the thermal neutron detectors disclosed herein are designed for some degree of optimization with respect to a given receiving axis, the spacing between the moderator and each thermal neutron detector along the receiving axis can generally be minimized at least within reasonable practical limits, in order to correspondingly minimize instances whereupon thermalized neutrons can escape undetected. While not intending to be bound by theory, Applicants submit that excess space that is not filled by moderating material provides what may be referred to as sideways or grazing escape paths for thermal neutrons to exit from moderating material without thereafter entering a thermal neutron detector to thereby evade detection. For at least this reason, a person of ordinary skill in the art, having this disclosure in hand, should appreciate that for the embodiments described herein detection efficiency is typically enhanced when the volume or region defined by the detector arrangement is at least substantially filled by the moderator, as opposed to cases where moderator-detector spacing results in significant void or otherwise unfilled space within the envelope defined by the inner periphery of the thermal neutron detector arrangement. Detection efficiency is also enhanced responsive to Applicants' recognition that the detector arrangement at least substantially surrounds the moderator arrangement. In FIG. 1A, the neutron moderator is substantially surrounded by the detector arrangement since a majority of the major opposing surfaces of neutron moderator 150 are in a direct confronting relationship with thermal neutron detectors 102A and 102B and, more particularly, in such a confronting relationship with active material 112 within each thermal neutron detector. Examination of the embodiments described below will reveal that the moderator arrangement, forming the core of system 100, is at least substantially surrounded by the neutron detector arrangement. This is in sharp and opposite contrast with the accepted thinking of the prior art. Applicants submit that those of ordinary skill in the art were led to believe that the optimum architecture was to provide a moderator arrangement that surrounds a thermal neutron detector. It is further submitted that Applicants' discoveries, as brought to light herein, serve to sweep aside this misconception of the prior art based, at least in part, on the recognition that the thermal neutron detectors used herein are, at least from a practical standpoint, essentially transparent to the fissile neutrons, resulting in an entirely new and heretofore unseen detection system architecture that embodies, in its essence, a complete reversal of prior art beliefs. Without intending to be bound by theory, Applicants submit that the performance levels provided by the present disclosure are, at least in part, attributable to the capability to capture backscattered neutrons that were lost in prior art architectures.

Having discussed the particular case of moderator voids resulting from moderator-to-detector spacing or any general equivalent thereof, it is noted that this consideration in no way limits customizing of the mechanical and material properties of the moderator structure, as a whole. In other words and by way of example, certain moderator materials can actually define voids as part of the characteristic structure of the material that do not contribute sideways or grazing escape paths within the intended meaning. For instance, a moderator material can include voids that make for a composite structure including solid and gaseous regions interspersed with one another.

In some implementations, the thickness of moderator 150 disposed between first thermal neutron detector 102A and second thermal neutron detector 102B can have a constant thickness that is greater than the thickness of either first thermal neutron detector 102A and/or second thermal neutron detector 102B. In some implementations, moderator 150 can have a length and a width that is about the same as the length and the width of first thermal neutron detector 102A and second thermal neutron detector 102B. In embodiments, moderator 150 can have a length that is approximately 100 centimeters (cm). In embodiments, moderator 150 can have a width that is approximately 20 centimeters (cm). In embodiments, moderator 150 can have a thickness that is approximately 1 cm to 5 cm. In some implementations, the thickness of moderator 150 can be based in whole or in part on the thickness of either or both thermal neutron detectors 102 adjacent to moderator 150. In embodiments, the thickness of moderator 150 can be approximately 1 to 4 times the thickness of the adjacent neutron detector 102. In some implementations, moderator 150 can include one or more materials having a length and width that both greatly exceed the thickness of moderator 150.

Figure 1F:
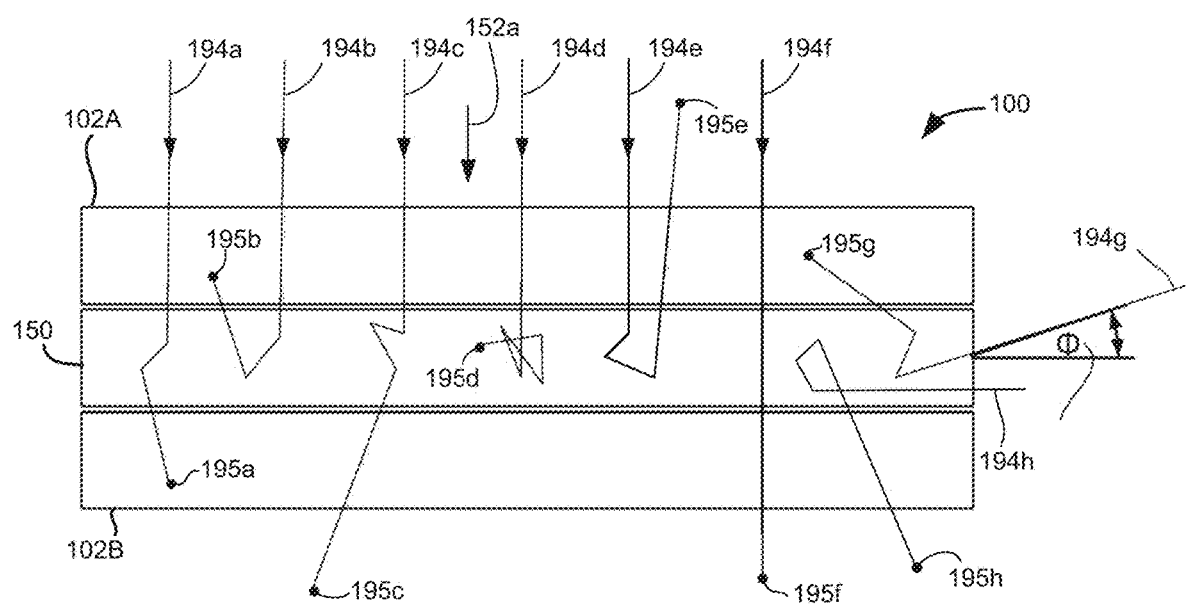
FIG. 1F is a diagrammatic view, in elevation, of the fissile neutron detection system of FIG. 1A, shown here to illustrate non-limiting examples of neutron paths, for neutrons that are initially fissile neutrons.

The reader's attention is now directed to FIG. 1F, which is a diagrammatic, partially cutaway view of fissile neutron detection system 100, in elevation, shown here for purposes of illustrating paths of incident fissile neutrons. Most of the example paths start at least initially along first major receiving direction 152a. The example paths are not intended to imply that the number of nuclei interactions in the moderator are limited, but rather are intended to illustrate major interactions in the moderator that either contribute to detection or to non-detection. On a path 194a, a fissile neutron passes through thermal neutron detector 102A and is then forward scattered and slowed by moderator 150 to a thermal neutron which is, in turn, detected by thermal neutron detector 102B at 195a. On a path 194b, the fissile neutron passes through thermal neutron detector 102A and is then backscattered and slowed by moderator 150 to a thermal neutron which is, in turn, detected by thermal neutron detector 102A at 195B. On a path 194c, the fissile neutron passes through thermal neutron detector 102A, is forward scattered and slowed through moderator 150 to a thermal neutron and then evades detection by thermal neutron detector 102B at 195c. On a path 194d, the fissile neutron passes through thermal neutron detector 102A and is slowed by moderator 150 to a thermal neutron and lost to hydrogen neutron capture at 195d. On a path 194e, the fissile neutron passes through thermal neutron detector 102A, is back scattered and slowed by moderator 150 to a thermal neutron and then passes back through thermal neutron detector 102A to evade detection at 195e. On a path 194f, the fissile neutron passes through fissile neutron detection system 100 without being slowed down in moderator 150 to evade detection at 195f. On a path 194g, the thermal neutron is incident on an end face of moderator 150 at an angle φ with respect to the major surfaces of the overall assembly and then slowed down and scattered by moderator 150 into thermal neutron detector 102A for detection at 195g. On a path 194h, another fissile neutron is incident on an end face of the moderator and is slowed down and scattered by the moderator into thermal neutron detector 102B, but evades detection at 195h. It should be noted that the illustrated paths are provided for purposes of enhancing the understanding of the reader. In view of these path examples, one of ordinary skill in the art will appreciate that the orientation of the incident fissile neutrons can be from any direction and still can result in conversion to thermal neutrons which are subsequently detected. At the same time, it should be appreciated, however, that Applicants have discovered that the structure of the fissile neutron detection system, as brought to light herein, provides for improved efficiency for detection of fissile neutrons that are incident upon the overall detection system at least compared with prior art systems without thermal neutron detectors at least substantially surrounding a moderator region. In this regard, most of the incident fissile neutrons will initially pass through one of the outwardly facing major surfaces of one of the thermal neutron detectors, enter the moderator and then be scattered to lose energy for detection as a thermal neutron by one of the thermal neutron detectors. It should also be noted that the number of scattering events shown for trajectories 194 a, b, c, d, e, g and h in moderator 150 in FIG. 1F has been limited in order to maintain illustrative clarity. More realistically, the number of scattering events that lead to a thermalized neutron from a fissile neutron is 10 to 40 scatters.

Figure 2A:
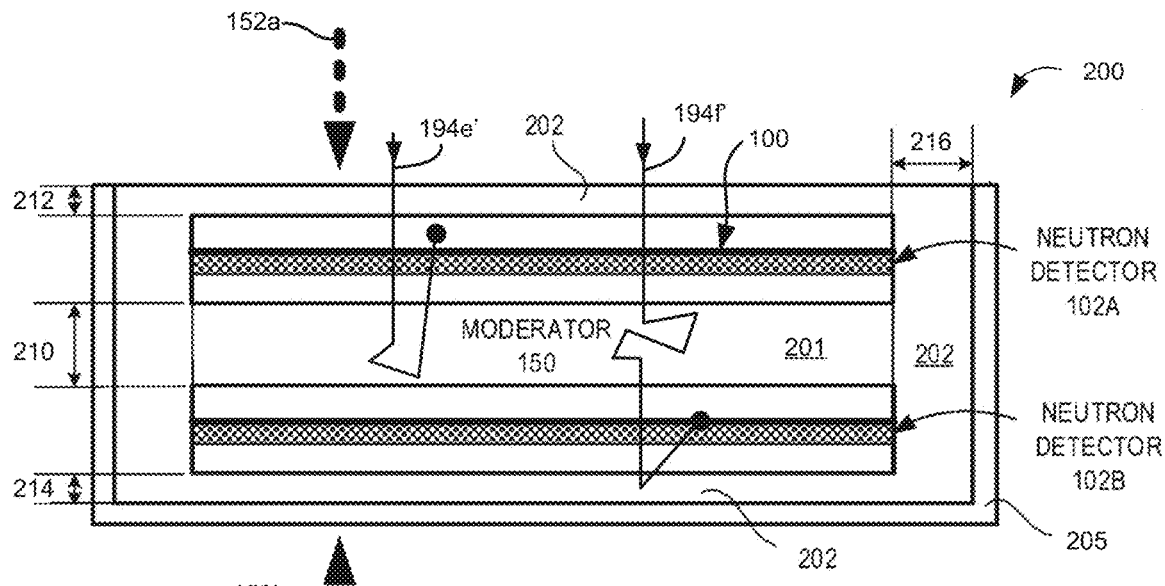
FIG. 2A is a diagrammatic, cutaway view, in elevation, of an embodiment of a fissile neutron detection system that includes two thermal neutron detectors with an interposed neutron moderator, in accordance with at least one embodiment of the present disclosure.

FIG. 2A is a diagrammatic, partially cutaway view of an illustrative embodiment of a fissile neutron detection system 200 that includes fissile neutron detection system 100, described above, as a core structure having first thermal neutron detector 102A, second thermal neutron detector 102B, and neutron moderator 150 disposed proximate first thermal neutron detector 102A and second thermal neutron detector 102B at least partially within a space 201 formed between first thermal neutron detector 102A and second thermal neutron detector 102B, in accordance with at least one embodiment of the present disclosure. An external or supplemental moderator arrangement 202, thinner than moderator 150, can at least substantially surround system 100 by being positioned at least adjacent to the major outwardly facing surfaces of thermal neutron detectors 102A and 102B. In the embodiment of FIG. 2A, moderator arrangement 202 completely surrounds system 100. The supplemental moderator arrangement can be integrally formed or formed from panels of a sheet material in any suitable manner and adjoined in any suitable manner.

Figure 2B:
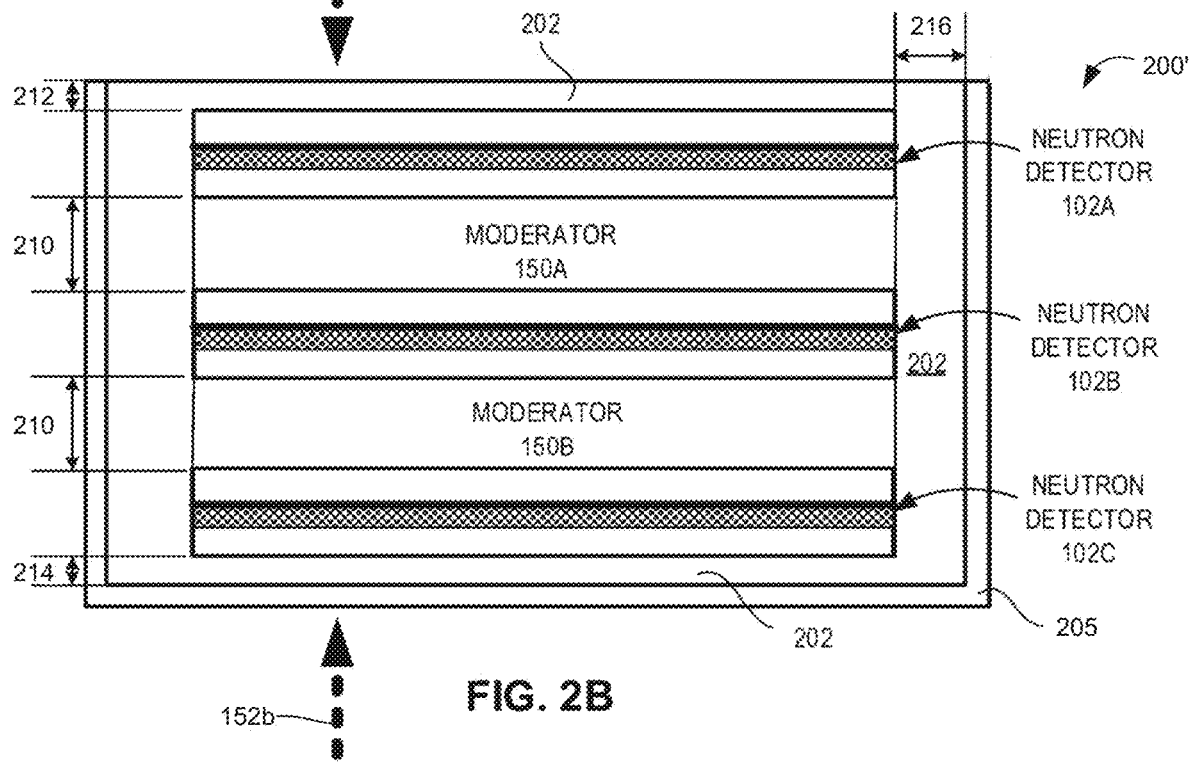
FIG. 2B is a diagrammatic, cutaway view, in elevation, of an embodiment of an illustrative fissile neutron detection system that includes three thermal neutron detectors with interposed neutron moderators, in accordance with at least one embodiment of the present disclosure.

FIG. 2B is a diagrammatic, partially cutaway view of another illustrative embodiment of a fissile neutron detection system 200' that includes first thermal neutron detector 102A, second thermal neutron detector 102B, and a third thermal neutron detector 102C, in accordance with at least one embodiment of the present disclosure. FIG. 2B depicts a first neutron moderator 150A disposed proximate first thermal neutron detector 102A and second thermal neutron detector 102B at least partially within a space or volume formed between first thermal neutron detector 102A and second thermal neutron detector 102B and a second neutron moderator 150B disposed proximate second thermal neutron detector 102B and third thermal neutron detector 102C at least partially within a space or volume formed between second thermal neutron detector 102B and third thermal neutron detector 102C.

As depicted in FIGS. 2A and 2B, neutron detectors 102 and neutron moderator(s) 150 can be at least partially enclosed by an external neutron moderator 202. In some implementations, a housing or shell 205 can be disposed about all or a portion of external neutron moderator 202. The thickness of external moderator 202 can be the same or different in various areas of the neutron detectors 102. For example, external neutron moderator 202 can have a first thickness 212 proximate at least a portion of first thermal neutron detector 102A (e.g., on the "top" or exposed portion of the fissile neutron detection system 200) and a second thickness 214 proximate at least a portion of second thermal neutron detector 102B (FIG. 2A) or third thermal neutron detector 102C (FIG. 2B)—e.g., on the "bottom" of fissile neutron detection system 200. In addition, external neutron moderator 202 can have a third thickness 216 proximate the surface of thermal neutron detectors 102. As will be discussed at one or more appropriate points hereinafter, a thickness of the supplemental moderator outward of the major surfaces of the thermal neutron detectors that is less than thickness 210 of moderator 150 can provide for enhanced detection efficiency, as will be further discussed. For the moment, it is sufficient to note that the structure of FIG. 2A can, at least in some cases, provide for a modified sensitivity at least in each of major receiving directions 152a and 152b that is greater than a fundamental receiving sensitivity of core fissile neutron detection system 100 in each of the major receiving directions. In order to maintain an equal modified receiving sensitivity in each of the major receiving directions, thickness 212 is equal to thickness 214.

External moderator 202 includes one or more materials capable of reducing an energy level of an incident fissile neutron 160. Such reduction in energy level of incident fissile neutron 160 occurs within external moderator 202 as fissile neutron 160 impacts hydrogen nuclei in the material forming the external moderator 202. External moderator 202 can include one or more materials that include a minimum of approximately 10 weight percent atoms per $cm^3$ of hydrogen. External moderator 202 can include one or more solids, one or more liquids, and/or one or more compressed gases, or combinations thereof. In at least some implementations, external moderator 202 can partially or completely include a hydrogen-containing, solid, thermoplastic, material such as high-density polyethylene (HDPE).

In at least some implementations, all or a portion of external moderator 202 can be disposed proximate thermal neutron detectors 102 forming fissile neutron detection system 200. In some implementations, no air gap or similar void can exist between the external moderator 202 and the exterior surface of the neutron detectors 102 forming fissile neutron detection system 200. In some implementations, an air gap or similar void space can exist between external moderator 202 and the exterior major surfaces of neutron detectors 102.

As depicted in FIGS. 2A and 2B, each of neutron detectors 102 is separated by a neutron moderator 150 having a thickness 210. In some implementations, each of neutron detectors 102 can be separated by a neutron moderator 150 having a constant thickness 210. In some implementations, each of thermal neutron detectors 102 can be separated by a neutron moderator 150 having a variable thickness 210. In some implementations that include a plurality of neutron moderators 150A-150n in a stacked relationship (e.g., FIG. 2B), each of neutron moderators 150 can have the same or a different constant thickness 210. In some implementations that include a plurality of neutron moderators 150A-150n (e.g., FIG. 2B), each of neutron moderators 150 can have the same or a different variable thickness 210.

Figure 2C:
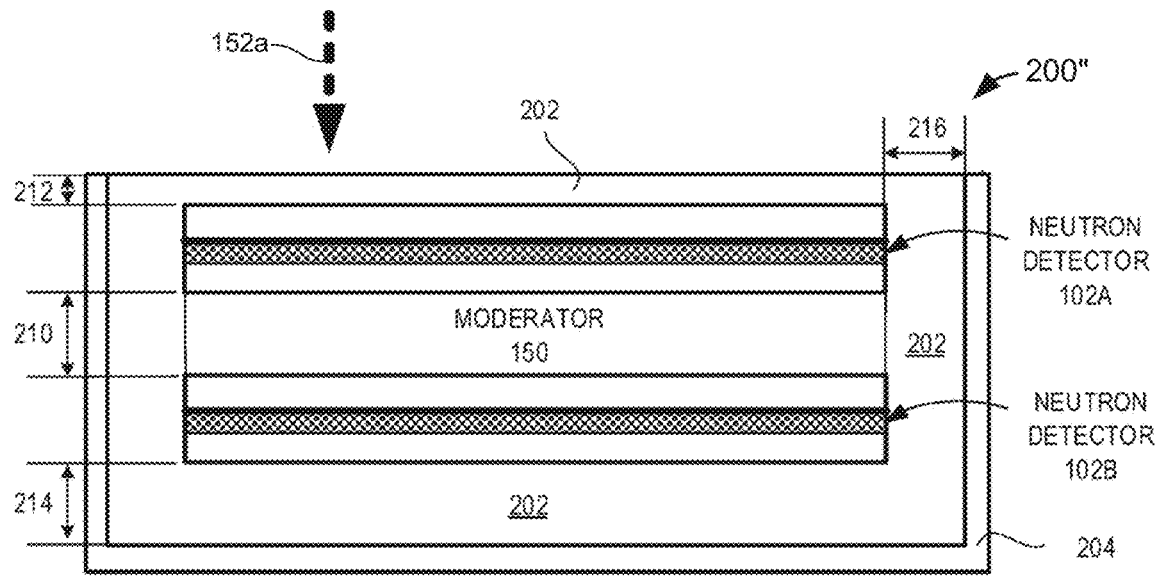
FIG. 2C is a diagrammatic, partially cutaway view, in elevation, of an embodiment of a unidirectional fissile neutron detection system, in accordance with at least one embodiment of the present disclosure.

FIG. 2C is a diagrammatic, partially cutaway illustration of an embodiment of a fissile neutron detection system generally indicated by the reference number 200". System 200" can be identical to system 200 of FIG. 2A with the exception that thickness 214 outward of thermal neutron detector 102B is greater than thickness 212 outward of thermal neutron detector 102A. Applicants recognize that this configuration results in what can be referred to as a unidirectional fissile neutron detection system wherein the sensitivity in first major receiving direction 152a is greater than the sensitivity in second major receiving direction 152b. Further, the sensitivity in first major receiving direction 152a can be greater than the fundamental receiving sensitivity of core fissile neutron detection system 100 in direction 152a, and also greater than the fundamental receiving sensitivity of system 200 in direction 152a. At the same time, the receiving sensitivity in second major receiving direction 152b can be less than (or attenuated) compared to the fundamental receiving sensitivity of core fissile neutron detection system 100 in direction 152b, as well as less than (or attenuated) compared to the fundamental receiving sensitivity of system 200 in direction 152b. In some instances, the sensitivity opposite the primary receiving direction in a unidirectional system can be effectively negligible such that the opposite receiving direction may not be shown in illustrations of embodiments of unidirectional fissile neutron detection systems discussed below. Of course, whether one or the other of the denominative first or second major receiving directions is more sensitive that the other is merely a matter of descriptive nomenclature. While thickness 212 is less than thickness 210 of the moderator, thickness 214 can be greater than thickness 210 of the moderator or at least greater than thickness 212. Applicants have discovered that for a fissile neutron source that is located to one side of a detector system, a unidirectional detection system that applies the teachings that have been brought to light with regard to FIG. 2C can be of benefit.

As discussed previously, supplemental moderator layers, substantially thinner than moderator 150 in FIG. 2A, can provide for at least somewhat enhanced detection efficiency. In general, a thin supplemental moderator should be sufficiently thin such that only a negligible number of incoming fissile neutrons are scattered. In other words, incoming fissile neutrons that initially pass through the thin supplemental moderator have a low probability of experiencing scattering in the supplemental moderator. Indeed, no measurement enhancements due to immediate moderation of incoming fissile neutrons, from either of the major receiving directions, should be expected to arise from scattering in thin supplemental moderator layers. However, as discussed previously and as should be appreciated by a person of ordinary skill in the art having this disclosure in hand, for any fissile neutron detection system having no supplemental layers, a certain number of neutrons will escape detection, even after undergoing significant numbers of moderator collisions and despite having been scattered and hence slowed to some degree. Paths 194c, 194e and 194h of FIG. 1F represent a group of at least partially thermalized neutrons that evade detection in the absence of a thin supplemental moderator. As such, this is a representative group of scattered neutrons, scattered by the primary moderator in forward and backward directions, that can be further scattered in significant numbers by the supplemental moderators. In other words, significant numbers of neutrons that have been scattered by moderator 150, and that have nevertheless passed undetected through a thermal neutron detector, can be further scattered back toward that detector by the supplemental layer for subsequent detection. Path 194e' when compared to corresponding path 194e of FIG. 1F, illustrates a neutron that is backscattered by supplemental moderator 202 and then detected. Path 194f in FIG. 2A is representative of other neutrons that are backscattered by supplemental moderator 202 and detected. These events can occur in measurably significant numbers given that these neutrons have already been significantly slowed by moderator 150. Applicants recognize that thin supplemental moderators are generally not intended for scattering incoming fissile neutrons as the fissile neutrons initially enter the fissile neutron detection system.

It should be appreciated by a person of ordinary skill in the art, in view of this overall disclosure, that fissile neutron detection systems described herein generally pass undetected a significant number of fissile neutrons with little to no reduction in energy, and that a thin supplemental moderator layer generally will not result in a measurable increase in efficiency with respect to these undetected fissile neutrons that exit the system approximately as fissile neutrons. On the other hand, it is also the case that some neutrons exiting the moderator will pass undetected through the thermal neutron detectors and evade detection, even though these neutrons are subject to at least some thermalization. Applicants submit that the presence of a supplemental moderator does result in a measurable increase in detection with respect to these thermalized neutrons.

Figure 2D:
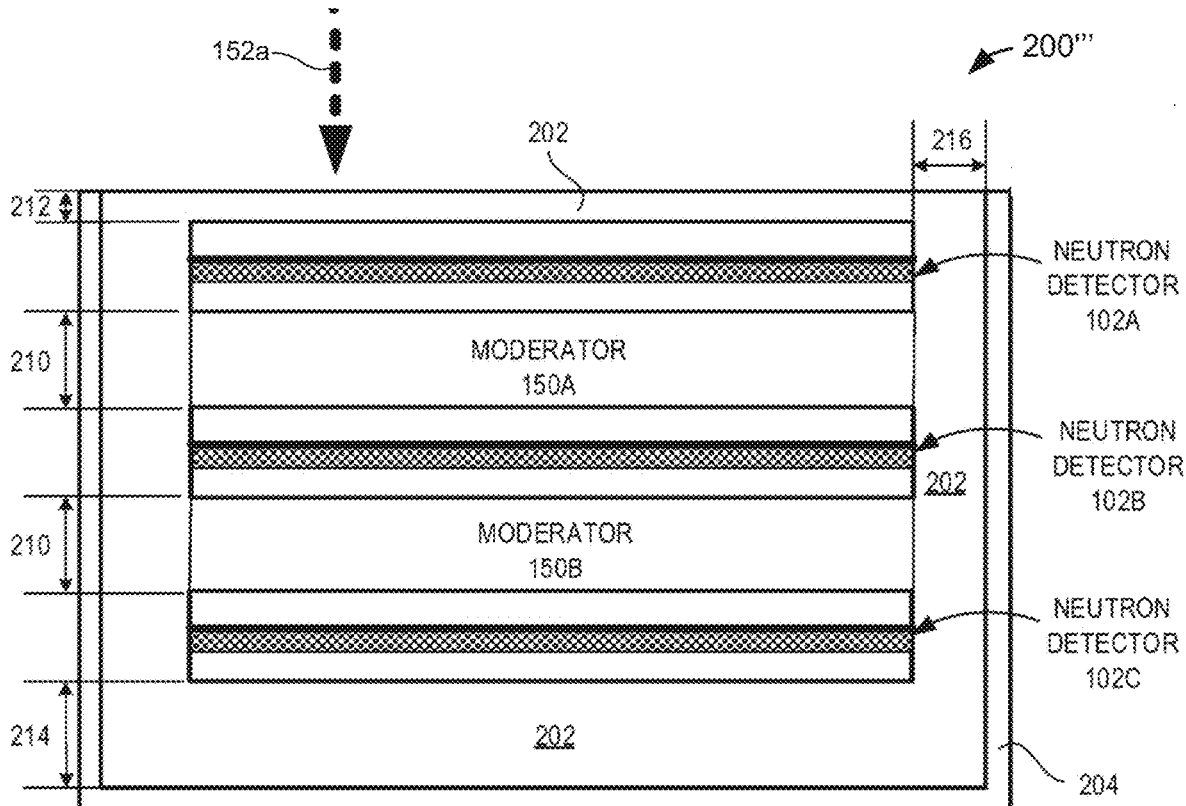
FIG. 2D is a diagrammatic, partially cutaway view, in elevation, of another embodiment of a unidirectional fissile neutron detection system, in accordance with at least one embodiment of the present disclosure.

FIG. 2D is a diagrammatic, partially cutaway illustration of an embodiment of a fissile neutron detection system generally indicated by the reference number 200'''. System 200''' can be identical to system 200' of FIG. 2B with the exception that thicknesses 212 and 214 are configured in accordance with embodiment 200'' of FIG. 2C to form a unidirectional detection system in a manner that is consistent with the descriptions above.

Figure 3A:
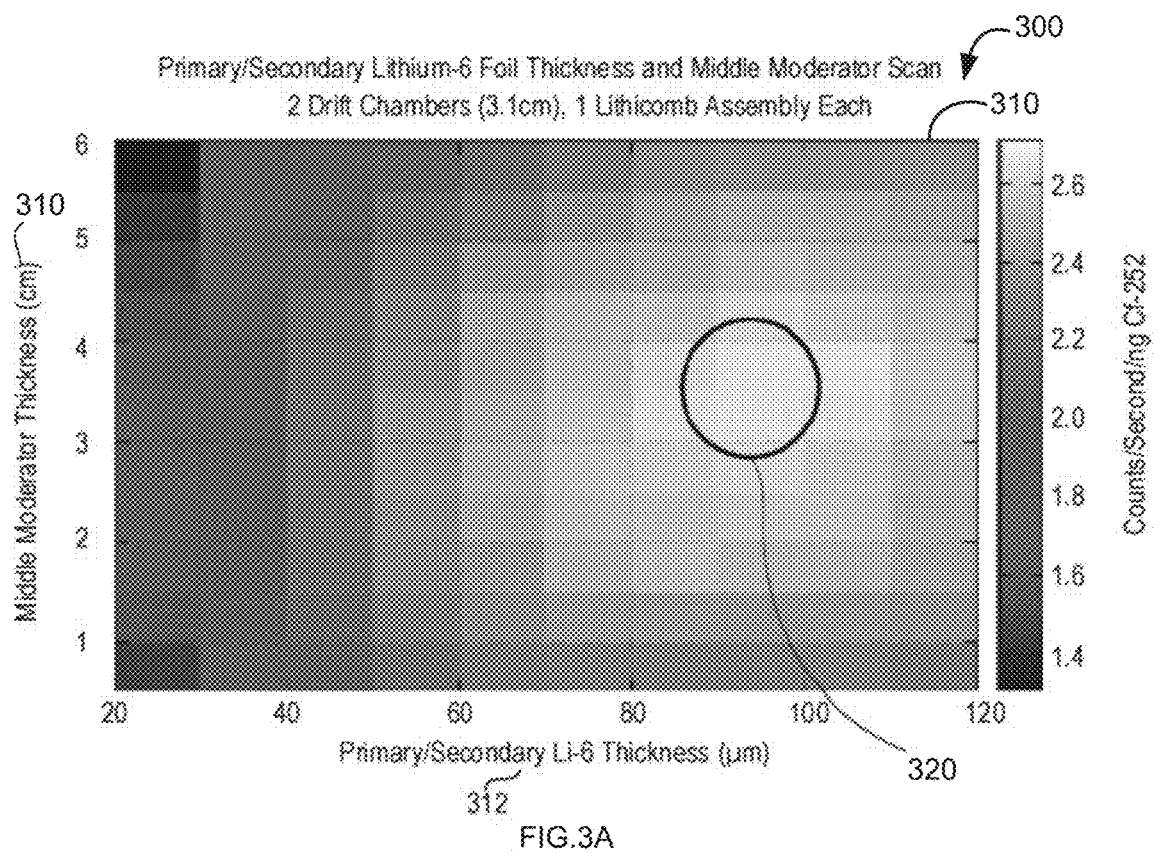
FIG. 3A is a two dimensional map depicting fissile neutron detector performance as a function of operation parameters for an illustrative fissile neutron detector system having two thermal neutron detectors separated by an interposed moderator, in accordance with at least one embodiment of the present disclosure.
Figure 3B:
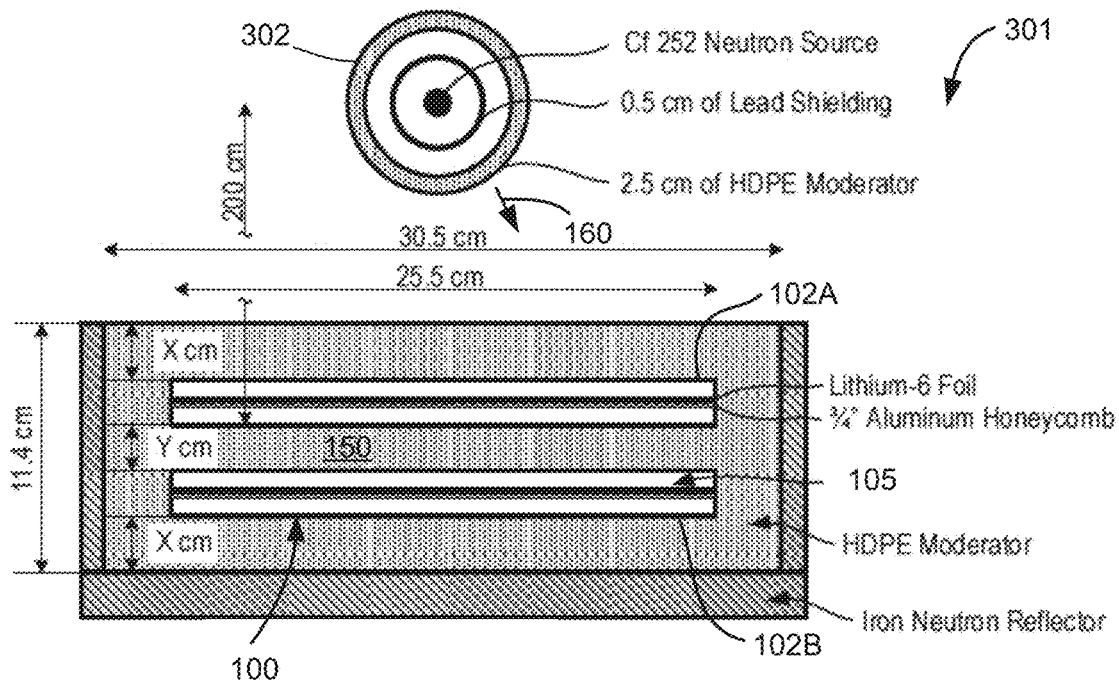
FIG. 3B is a diagrammatic cutaway view, in elevation, of a simulated fissile neutron detection system and fissile neutron source used to generate the map of FIG. 3A.

FIG. 3A depicts simulated performance 300 of an illustrative fissile neutron detection system 200 such as depicted and described in detail with regard to FIG. 2A in which a first neutron detector 102A and a second neutron detector 102B are separated by a neutron moderator 150, in accordance with at least one embodiment of the present disclosure. FIG. 3B illustrates details with regard to a simulation system, generally indicated by the reference number 301, for generating the performance shown in FIG. 3A. The simulated system includes a thickness parameter X for supplemental moderators and a thickness parameter Y for the center moderator of the core structure (i.e., detection system 100). It should be noted that the geometry is not shown to scale and that moderator thickness dimensions X and Y were varied as part of a scan of simulations. Consistent with known modeling and testing techniques that are familiar with those of ordinary skill in the engineering practice of neutron detection, a neutron source 302 is illustrated in a configuration that is thought to correspond, at least within a reasonable approximation, to real world threat sources for emitting fissile neutrons 160. Neutron source 302 is 200 cm from moderator 150. As depicted in FIG. 3B, each of thermal neutron detectors 102 can include a stainless steel, hermetically sealed, chamber 105 that can have a thickness (i.e., a sidewall 120 extent or height) of from approximately 1 centimeters (cm) to approximately 5 cm. Simulations were performed for various $^6$Li active material 112 sheet thicknesses and neutron moderator 150 thicknesses. Map 310 shows the capture performance of two neutron detector fissile neutron detection system 200 depicted in FIG. 2A as a shaded map of $^6$Li active material sheet thickness 312 along the x-axis versus neutron moderator thickness Y 314 along the y-axis. In this embodiment, capture performance peaks in a region 320, at a $^6$Li active material sheet thickness of from approximately 80 micrometers (μm) to approximately 100 μm in combination with a neutron moderator thickness Y of from approximately 3 centimeters (cm) to approximately 4 cm.

Figure 3C:
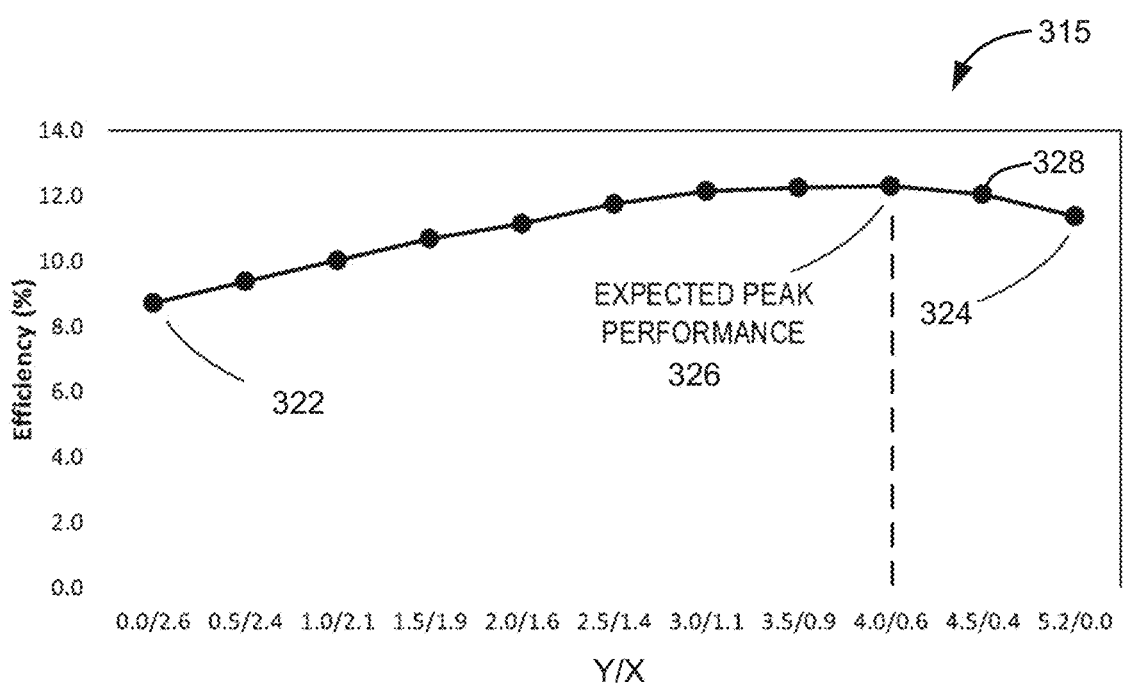
FIG. 3C is a plot of fissile neutron detection efficiency against a moderator thickness ratio for the simulated system of FIG. 3B.

FIG. 3C is a plot, generally indicated by the reference number 315, in which detection efficiency is plotted against a ratio of thickness Y of the middle moderator to thickness X of the supplemental moderators based on the simulations relating to FIG. 3B. These results were generated by Applicants based on Monte Carlo techniques for device simulation that were first developed by experimental physicists as computational tools used in the course of fundamental research relating to neutron detection. The horizontal axis explicitly gives the values of Y and X in centimeters for each point on the plot. A leftmost point 322 in the plot corresponds to middle moderator thickness Y being zero for a ratio (0.0/2.6). In other words, there is no middle moderator. A rightmost point 324 in the plot corresponds to a zero thickness X of the supplemental moderators for a ratio (5.2/0.0). In other words, only the middle moderator is present. Based on the plot, a peak efficiency occurs at a point 326 where the thickness ratio is given as (4.0/0.6). In other words, moderator 150 is approximately 6.7 times more thick than the supplemental moderators outward of the thermal neutron detectors. Based on FIG. 3C, one of ordinary skill in the art can define a range for the thickness ratio in order to maintain a desired detection efficiency. It should be clear from this plot, however, that the supplemental moderators should be substantially or far thinner than middle moderator 150. At the same time, a point 328 demonstrates that one can configure the middle moderator as too thick which likewise results in reduced detection efficiency.

Figure 4A:
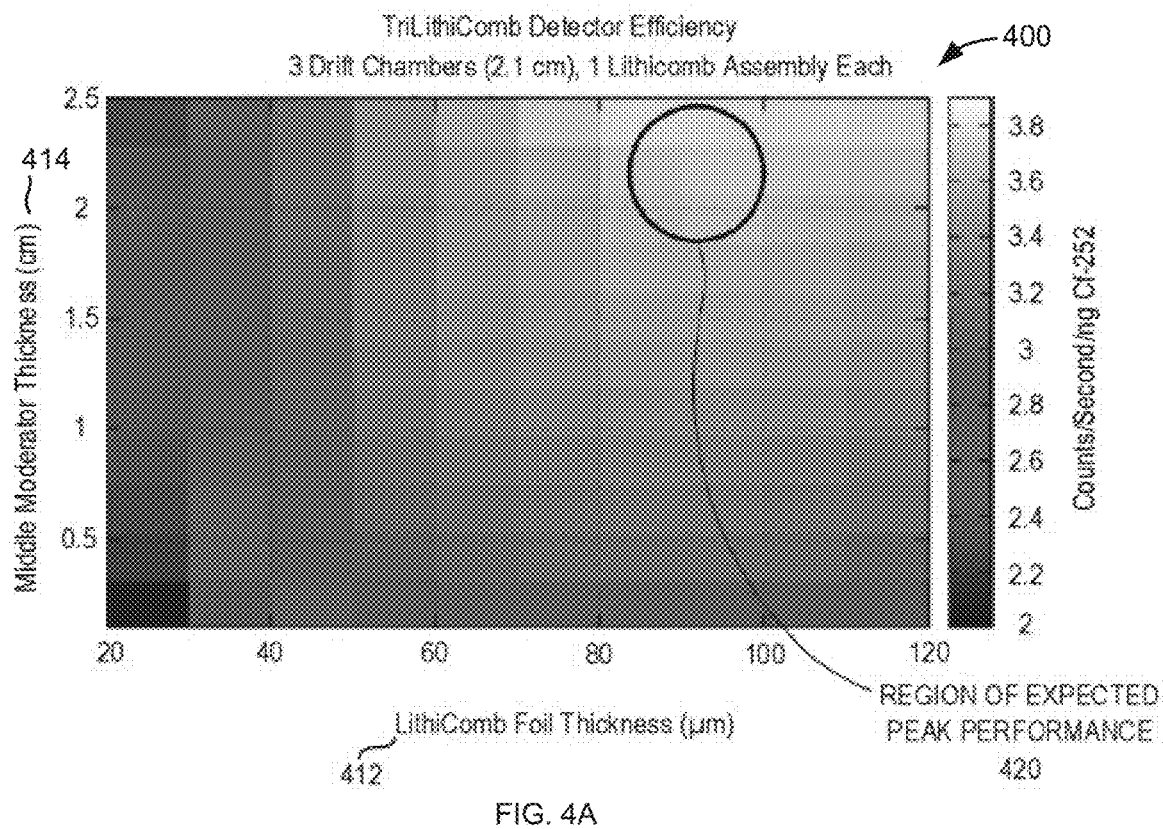
FIG. 4A is a two dimensional map depicting fissile neutron detector performance as a function of operation parameters for an illustrative fissile neutron detection system having three thermal neutron detectors separated by interposed moderators, in accordance with at least one embodiment of the present disclosure.
Figure 4B:
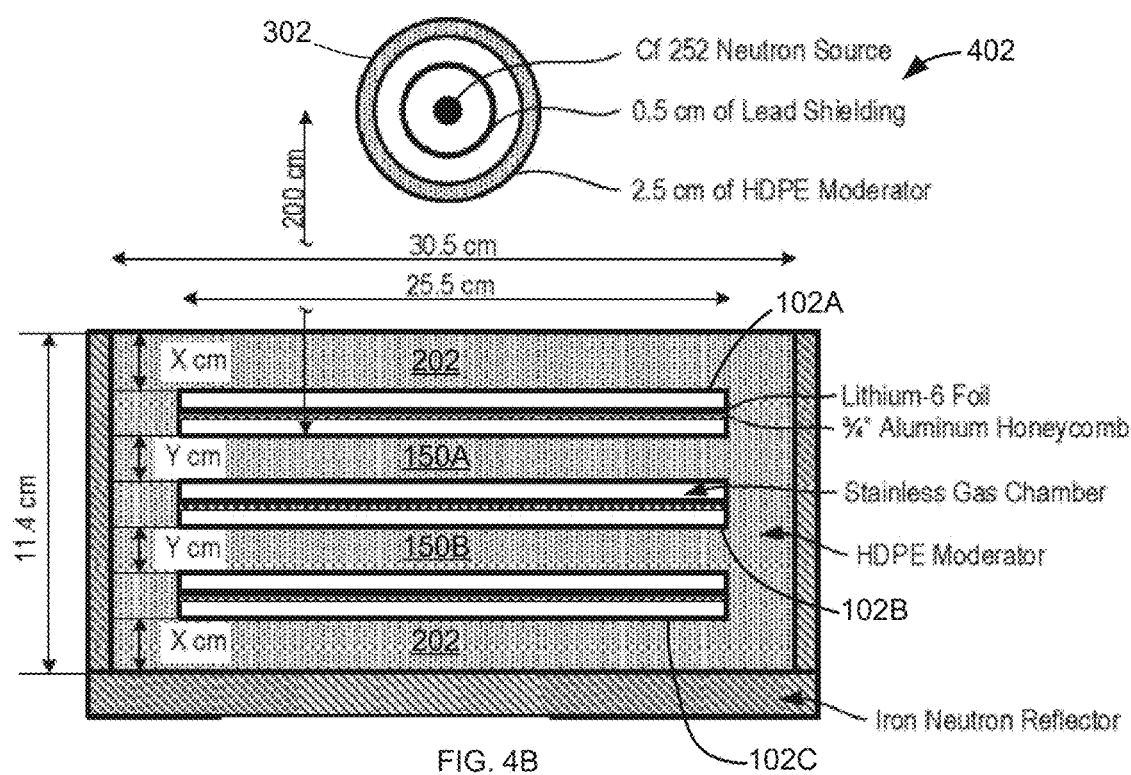
FIG. 4B is a diagrammatic cutaway view, in elevation, of a simulated fissile neutron detection system and fissile neutron source used to generate the map of FIG. 4A.

FIG. 4A depicts simulated performance 400 of fissile neutron detection system 200' such as depicted and described in detail with regard to FIG. 2B in which first neutron detector 102A, second neutron detector 102B, and a third neutron detector 102C are separated by respective neutron moderators 150A and 150B, in accordance with at least one embodiment of the present disclosure. FIG. 4B illustrates details with regard to a simulated system, generally indicated by the reference number 402, for generating the results of FIG. 4A. The simulated system includes a thickness parameter X for supplemental moderators and a thickness parameter Y for center moderators 150A and 150B. It should be noted that the geometry is not shown to scale and that moderator thickness dimensions X and Y were varied as part of a scan of simulations. For purposes of the simulations, honeycomb thickness is equal to 0.3 cm. The thermal neutron detector chamber thicknesses 102A-102C are 2.1 cm and the available moderator thickness of 2X+2Y is equal to 5.1 cm. As depicted in FIG. 4B, each of neutron detectors 102A-102C can include a stainless steel, hermetically sealed, chamber 105 (FIG. 1) that can have a thickness (i.e., a sidewall 120 extent or height, FIG. 1B) of from approximately 1 centimeters (cm) to approximately 2.5 cm. Simulations were performed for various $^6$Li active material 112 sheet thicknesses and neutron moderator 150 thicknesses. Map 400 shows the capture performance of fissile neutron detection system 200' depicted in FIG. 2B as a shaded plot of $^6$Li active material sheet thickness 412 along the x-axis versus neutron moderator thickness Y along the y-axis. In this embodiment, capture performance peaks in a region 420, at a $^6$Li active material sheet thickness of from approximately 80 micrometers (μm) to approximately 100 μm in combination with a neutron moderator thickness Y of from approximately 1.5 centimeters (cm) to approximately 2.5 cm.

Figure 5A:
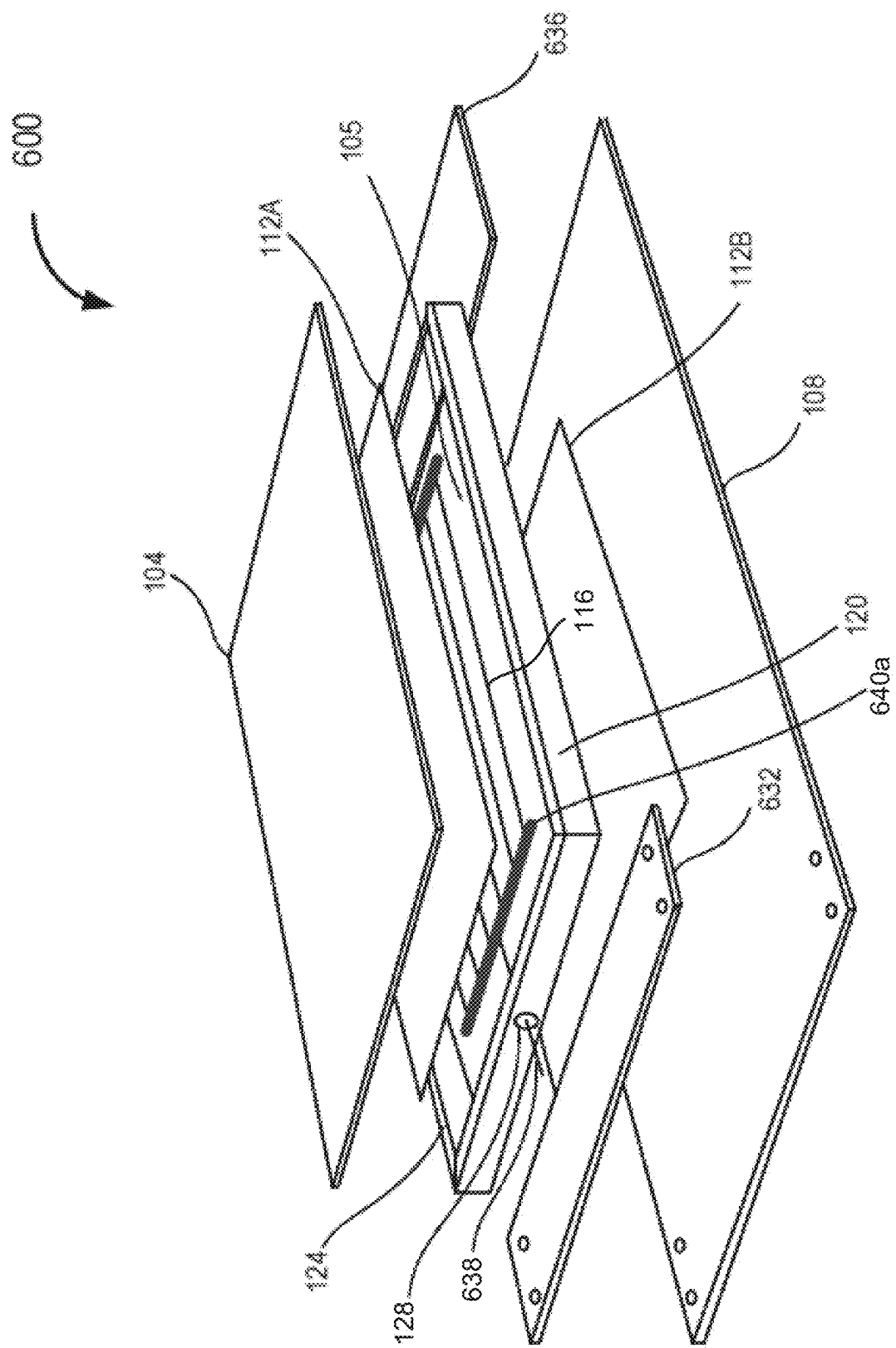
FIG. 5A is a diagrammatic, exploded view, in perspective, of an embodiment of an illustrative thermal neutron detector, in accordance with at least one embodiment of the present disclosure.

FIGS. 5A, 5B, 5C, and 5D depict an embodiment of a thermal neutron detector, generally indicated by the reference number 600, and suitable for use with fissile neutron detection system 100 depicted in FIGS. 1A-1D, in accordance with one or more embodiments described herein. Thermal neutron detector 600 can include top cover 104, bottom cover 108, lithium-6 ($^6$Li) foils 112A and 112B, a number of electrodes 116 (collectively "electrodes 616"), sidewall 120, seal 124, a front electronics board 632, and a back electronics board 636. In this embodiment, a single isolator feedthrough 128 isolates an input conductor 638 that is electrically coupled to an electrically conductive cross-member 640a which, in turn, is electrically connected to plurality of electrodes 116. This electrically conducting cross member may hereinafter be referred to as a "ganging board" and/or a "bus". Front electronics board 632 and back electronics board 636 can include communicably coupled readout electronics or similar devices to produce a detection signal 638 on an output line 640. A first $^6$Li foil 112A can be disposed proximate the top cover 104 and a second $^6$Li foil 112B can be disposed proximate the bottom cover 108. Top cover 104 and bottom cover 108 can be attached or otherwise disposed proximate to sidewalls 120 as shown in FIG. 5A to form chamber 105 that can, in operation, contain a readout gas. Seal 124 provides a seal between top cover 104, sidewalls 120, and bottom cover 108 that can greatly reduce or even prevent the readout gas from escaping from chamber 105. Seal 124 can also greatly reduce or prevent the entry of gases or fluids from external to chamber 105. Electrodes 116 are fed through isolator 128 that can be located on any suitable sidewall 120. Electrodes 116 can be electrically conductively coupled to the front electronics board 632 and can be conductively coupled to the back electronics board 636. The readout electronics can provide a voltage bias between electrodes 116 and the $^6$Li foils 112A and 112B. In some embodiments, each of the $^6$Li foils 112A and 112B can have a thickness of approximately 100 micrometers (μm). Additionally, the readout electronics can decouple the signals received from electrodes 116, can amplify the signals received from electrodes 116, and host post-digitization and further computer and wireless interfacing to share information relating to the collected signals with one or more user applications.

Upon exposure to fissile material such as plutonium and highly enriched uranium (HEU), neutrons and gamma rays can impinge upon fissile neutron detector system 100. Neutrons impinging upon fissile neutron detector system 100 (FIG. 1) can pass through one or more external moderators 202 and/or one or more neutron moderators 150 prior to impinging on the top plate 104 or bottom plate 108 of the neutron detector 600. External moderator 202 and/or neutron moderators 150 can reduce the energy level of incident fissile neutron 160 (e.g., 100 keV to 10 MeV) to the energy level of a thermal neutron 162 (e.g., 0.025 eV). Thermal neutron(s) 162 can be captured by one of the $^6$Li atoms in the $^6$Li foils 112A and 112B. The capture of thermal neutron(s) by the $^6$Li atom results in a lithium 7 atom that decays into two daughter particles, an alpha particle 166 and a triton 168. Triton 168 and alpha particle 166 travel in opposite directions, and dissipate energy as they travel through $^6$Li foil 112A and 112B.

Referring to FIGS. 1A and 1B, in conjunction with FIG. 5A, upon exiting the $^6$Li foil, triton 168 and/or alpha particle 166 can have sufficient kinetic energy to ionize atoms present in the readout gas within chamber 105. Electrons 172 liberated during the ionization of readout gas can drift in the direction of electrodes 116 and the ions produced during the ionization of readout gas atoms can drift in the direction of $^6$Li foils 112A and 112B. Electrons 172 that drift within a predetermined distance of roughly 5 times the radius of electrode 116 (i.e., the Townsend avalanche region) can encounter an electric field that accelerates electrons 172 at a rate sufficient to cause further ionization of the readout gas. The further ionization of the readout gas liberates additional electrons 172, which can drift toward electrodes 116 and cause even further ionization of the readout gas. This process that occurs within Townsend avalanche region 176 is called gas multiplication. Ionized readout gas atoms within the Townsend avalanche region that move towards $^6$Li foils 112A and 112B cause a movement of charge along electrodes 116.

The charge moving along each electrode 116 is collected by readout electronics, on board 632 and/or 636, and amplified with a pulse-mode, charge-sensitive preamplifier to produce a voltage output signal 192. Pulse height discrimination circuitry included with in the readout electronics then compares the voltage output signal to a first predetermined threshold and determines if a fissile neutron event has been detected (e.g., for a gas multiplication of roughly 100, and an amplification circuitry gain of 1 fC/mV, pulse heights greater than 250 keV can indicate the occurrence of a fissile neutron event). In some embodiments, the false positive detection rate of fissile neutrons 160 based on the first predetermined threshold can be less than $1 \times 10^{-5}$ for a gamma ray exposure rate of 100 mR/hr. A second predetermined threshold, lower than the first predetermined threshold, can also be established. Voltage output signals below the second predetermined threshold can be deemed attributable to very low ionizing gamma ray events or movements of charge in thermal neutron detector 600 induced by one or more other sources (e.g., thermal heat, radio frequency electromagnetic radiation, and changes in the relative position of electrodes 116 and the $^6$Li foils 112A and 112B. Voltage output signals below the first predetermined threshold and above the second predetermined threshold are indicative of gamma ray events. The detected rate of fissile neutrons 160 and gamma rays impinging upon the detector can be used in radiation detection methodologies (e.g., to detect the presence of plutonium or highly enriched uranium).

The composition of the readout gas can advantageously remain relatively constant over time to avoid deterioration of the gamma ray and neutron detection process. Changes greater than 1% in the composition of the readout gas can affect the Townsend avalanche process. For example, nitrogen, oxygen, or water molecules that leak into the chamber do not ionize as well as the argon gas in the amplification region near electrodes 116, and therefore can reduce the Townsend avalanche process near electrodes 116 when introduced into the readout gas. This reduces the ability of the readout electronics to distinguish between noise, gamma ray, and fissile neutron events, thereby decreasing the efficiency of neutron detector 600.

In some embodiments, seal 124 can be formed from one or more elastomeric materials, such as polyisobutylene, to maintain the readout gas composition within the chamber 105 over extended periods of time (e.g., 30 years). Seal 124 can conform to the region between top cover 104 or bottom cover 108 and sidewalls 120, filling any gaps due to imperfections in the surface quality of top cover 104, bottom cover 108, and sidewalls 120. In some embodiments, the surface quality of top cover 104, bottom cover 108, and sidewalls 120 can be selected to generate uniform electric fields near electrodes 116 of neutron detector 600, with no regard for sealing of top cover 104, bottom cover 108, and sidewalls 120, since the elastomeric nature of seal 124 can accommodate such fluctuations. It is noted that in a given thermal neutron detector, there is no requirement that an integral layer of active sheet material 112 must be used. In other words, an overall layer of active sheet material can be made up, for example, of a plurality of "tiles" of active sheet material or a patchwork of such tiles.

Figure 6A:
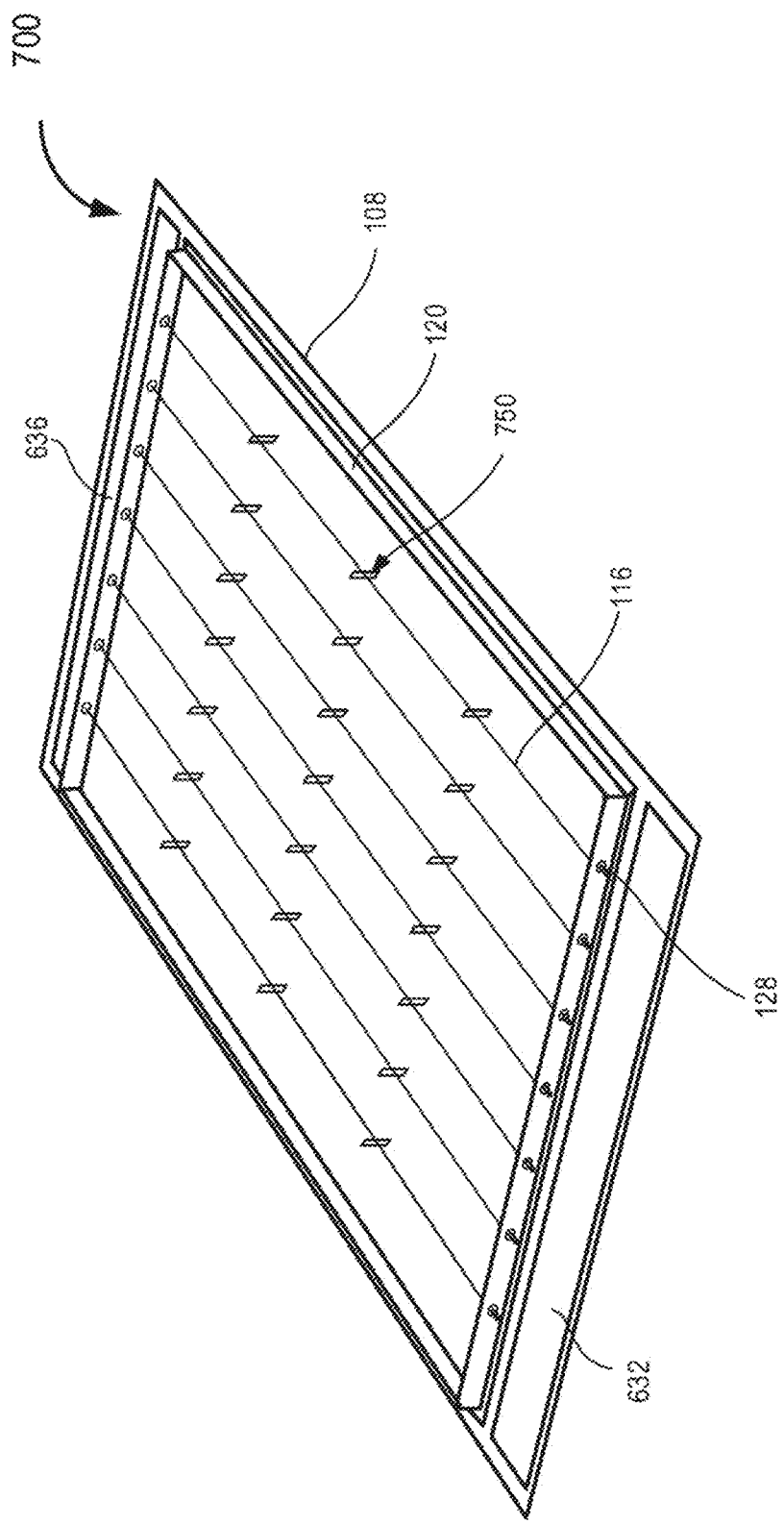
FIG. 6A is a diagrammatic view, in perspective, of an embodiment of an illustrative thermal neutron detector having a number of detector electrodes, in accordance with at least one embodiment of the present disclosure.

FIGS. 6A and 6B depict another illustrative thermal neutron detector, generally indicated by the reference number 700, suitable for use with fissile neutron detection system 100 depicted in FIGS. 1A-1D, in accordance with one or more embodiments described herein. FIG. 6A is a diagrammatic perspective view whereas FIG. 6B is a diagrammatic view, in elevation, taken to show the right edge of the thermal neutron detection in the view of FIG. 6A. Thermal neutron detector 700 includes similar elements as thermal neutron detector 600 depicted in FIGS. 5A-5D.

Thermal neutron detector 700 can include an array of vertically elongated structural members 750 that can be posts, for example, having upper and lower feet that serve as bonding pads. Elongated structural members 750 can include a top pad 764, a bottom pad 768, and a post 772. In embodiments, elongated structural members 750 can extend between top cover 104 and bottom cover 108. In some embodiments, elongated structural members 750 can provide structural support that can reduce undesirable mechanical vibrations within thermal neutron detector 700. For example, a tungsten wire electrode 116 having a length of approximately 100 centimeters (cm) and a diameter of approximately 30 micrometer (μm), placed under approximately 250 g of tension has a first vibrational frequency of approximately 200 Hz, which corresponds to significant vibrations typically generated by motor vehicles. Placing a single structural support 750 near the middle of the tungsten wire electrode 116, increases the first vibrational frequency to approximately 420 Hz, thereby reducing vibrations induced by vehicular movement by a factor of 100 or more. Reducing vibrations in thermal neutron detectors with surface areas greater than 1000 square centimeters (cm$^2$) is advantageous because, as the surface area of neutron detector 700 and the length of electrodes 116 is increased, the increased dimensions can lead to vibrations that can cause changes in the relative position of electrodes 116 and/or active materials 112 disposed in chamber 105. Relative changes in position between electrodes 116 and active materials 112 can cause movement of charge within fissile neutron detection system 100. Such charge displacement within fissile neutron detection system 100 can generate voltage output signals 192 that are indistinguishable from gamma ray or neutron signals.

Elongated structural members 750 can reduce mechanical vibrations of top cover 104 and bottom cover 108 by providing a mechanical connection therebetween. For example, adding elongated structural support 750 at the center of a 1 square meter (m$^2$) thermal neutron detector 700 can increase the resonance frequency of electrodes 116 in neutron detector 700 by a factor of two or greater and can reduce the amplitude of the vibrations by a factor of two compared to when top cover 104 and/or bottom cover 108 are supported only at the edges by sidewall 120. The shape of elongated structural members 750 can be selected to minimize vibrations between top cover 104 and bottom cover 108 (e.g., the cross section of the elongate structural members 250 can be a "T", an "I", an "L", an "X", or a "C"). In some embodiments, the cross section of the elongated structural members 750 can be rectangular.

In embodiments, each of the electrodes 116 can pass through a slot or similar aperture that penetrates at least a portion of elongated structural member 750 to reduce the vibration of the electrodes 116. The slots or apertures can provide mechanical support for electrodes 116. In some embodiments, the slot or aperture can be located near a side or edge of elongated structural member 750. Electrode 116 traversing the chamber 105 can pass through multiple slots or apertures. Elongated structural members 750 can be positioned within chamber 105 such that the slots or apertures alternate sides of elongated structural members 750 as electrode 116 traverses chamber 105. In some embodiments, some or all of the elongated structural members 750 can be fabricated using an electrically non-conductive material such as, for example, plastic. In some embodiments, the slot or aperture can be positioned to provide an upward or downward lateral force on electrode 116. In some embodiments, electrodes 116 can be supported by a structural member that attaches to the top cover 104 or the bottom cover 108, but not both. In some embodiments, elongated structural members 750 can contact top cover 104 and bottom cover 108, but do not include a slot or aperture and are displaced from electrodes 116 so as to not cause a mechanical interference.

FIG. 6C illustrates a modified form of thermal neutron detector 700, generally indicated by the reference number 700' and taken from the same viewpoint as FIG. 6B. The structure is the same as that of FIG. 6B with the exception that a modified support member 750' is used. Support member 750' can be of any suitable shape including a mounting pad 780 from which a post 782 extends. A cap 784 that secures to 782 is positioned on top of post 782 to capture electrode 116. Like support member 750, support member 750' can be formed from an electrically insulative material such as plastic.

Figure 7:
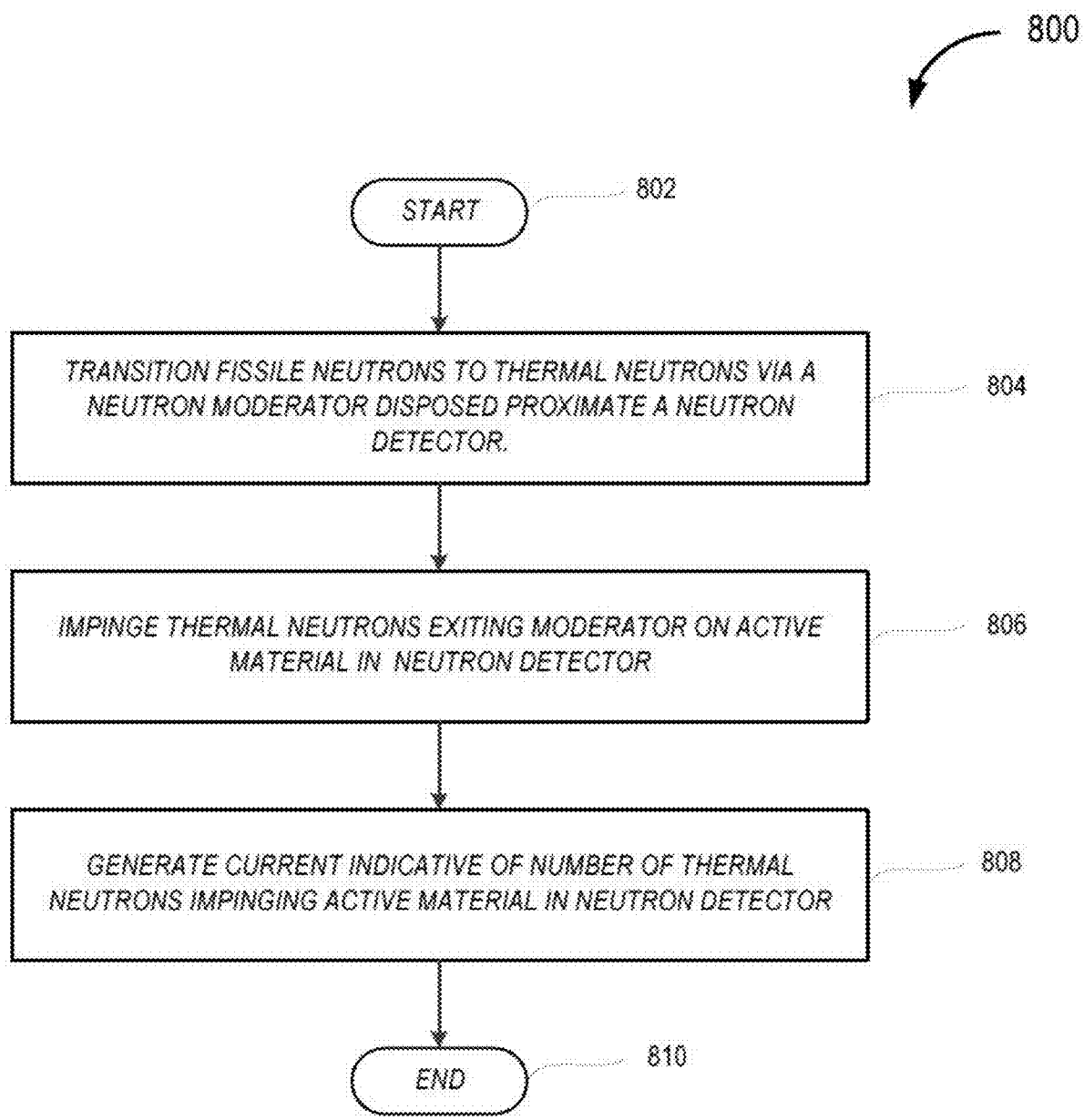
FIG. 7 is a flow diagram illustrating an embodiment of a method for detecting fissile neutrons using a fissile neutron detection system, in accordance with at least one embodiment of the present disclosure.

FIG. 7 is a flow diagram of an embodiment of a method, generally indicated by the reference number 800, for detecting fissile neutrons 160 using fissile neutron detector 100 that includes at least one thermal neutron detector 102, and at least one neutron moderator 150 disposed proximate thermal neutron detector 102, in accordance with at least one embodiment of the present disclosure. High-energy fissile neutrons such as those emitted by plutonium and highly enriched uranium (HEU) provide a tell-tale indicator of the presence of such materials. Fissile neutrons can have energy levels that exceed 100 keV. At such energy levels, a large percentage of fissile neutrons can pass undetected through active material 112 typically found in thermal neutron detectors 102, 600, 700 and 700'. The presence of a neutron moderator, such as neutron moderator 150, can beneficially reduce the energy level of fissile neutrons to the energy level of thermal neutrons, approximately 0.025 eV. Such a reduction in energy level can be at least partially attributable to collisions between fissile neutrons 160 and hydrogen nuclei in moderator 150. Consequently, moderators having a high percentage of hydrogen by weight can be preferable. Thermal neutrons 162 can impact active material 112, causing the spontaneous formation of charge-carrying daughter particles, such as alpha-particles 166 and tritons 168. Triton 168 can ionize a gas within chamber 105 of neutron detector 102, 600, 700 and 700'. The presence of the ionized gas and dissociated electrons 172 within chamber 105 can induce a current flow on an electrode in the chamber that is maintained at a potential. The current flow can be proportional to the number or rate at which fissile neutrons 160 are impacting active material 112 within chamber 105. Method 800 commences at 802.

At 804, the energy level of at least a portion of fissile neutrons 160 incident upon fissile neutron detection system 100 is reduced to the energy level of thermal neutron 162. In some implementations, this reduction in energy level is accomplished using moderator(s) 150. Such neutron moderators 150 can include a number of interstitial neutron moderators 150 that are positioned proximate first thermal neutron detector 102A and second thermal neutron detector 102B and within a space formed between the between first thermal neutron detector 102A and second thermal neutron detector 102B. Such neutron moderators 150 can include one or more neutron moderators 150 having an exterior side and in which at least a portion of the exterior side is disposed proximate thermal neutron detector(s) 102. Fissile neutron detection systems can include one or more external neutron moderators 202 positioned proximate an exterior surface of first thermal neutron detector 102A, second thermal neutron detector 102B, and/or intermediate moderators 150A-150*n*.

Neutron moderator(s) 150 which reduce the energy level of incident fissile neutrons 160 can include one or more solids, liquids, and/or compressed gases capable of reducing the energy level of at least some of incident fissile neutrons 160. In some implementations, neutron moderator(s) 150 can include materials, compounds, or substances having a significant hydrogen concentration—greater than approximately 10 percent atoms per $cm^3$ hydrogen. The impact between incident fissile neutrons 160 and the hydrogen nuclei within the neutron moderator(s) 150 can reduce the energy level of incident fissile neutron 160 to that of thermal neutron 162 which then exits neutron moderator(s) 150.

Due to the random nature of the collisions within neutron moderator(s), a portion of incident fissile neutrons 160 can flow as neutrons having an energy level at or above that of thermal neutron 162 from neutron moderator(s) 150 in a direction that precludes impingement on a thermal neutron detector 102, 600, 700, 700' disposed proximate at least a portion of the exterior side of neutron moderator 150. For example, incident fissile neutron 160 can flow from the "side" or "edge" of neutron moderator(s) 150 in a direction along a vector pointing away from a thermal neutron detector 102, 600, 700, 700' that is proximate at least a portion of the side of neutron moderator(s) 150. The geometry of fissile neutron detection system 100, the geometry and composition of neutron moderator 150, the geometry and composition of external neutron moderator 202, and the construction and geometry of the thermal neutron detector 102, 600, 700 and 700' all play a role in determining the capture rate of incident fissile neutrons 160. For example, planar neutron detectors such as neutron detector 102 depicted in FIGS. 1A-1E, neutron detector 600 depicted in FIGS. 5A-5D, neutron detector 700 depicted in FIGS. 6A-6B and neutron detector 700' of FIG. 6C all present a significantly increased cross-sectional capture area which provides a marked advantage and improvement in fissile neutron detection performance and accuracy over straw-type neutron detectors in which detector "straws" can be positioned within a block of neutron moderator.

At 806, at least some of thermal neutrons 162 exiting neutron moderator(s) 150 can pass through top cover 104 or bottom cover 108 of first thermal neutron detector 102A and enter chamber 105A or pass through top cover 104 or bottom cover 108 of second thermal neutron detector 102B and enter chamber 105B. Once inside of chamber 105, thermal neutron 162 can impinge on one or more active materials 112 disposed therein. Active material 112 can include any substance, isotope, element, compound, or mixture capable of generating charge-carrying particles upon exposure to thermal neutrons 162. Non-limiting examples of such active materials include, but are not limited to, lithium-6 ($^6$Li); boron-10 ($^{10}$B); and helium-3 ($^3$He). Such active materials 112 can be present in chamber 105 in one or more forms. For example, in some implementations, $^6$Li in the form of thin (50 μm to 150 μm) sheets can provide all or a portion of active material 112 that is disposed either at one or more intermediate points (e.g., thermal neutron detector 102) or proximate one or more interior surfaces (e.g., thermal neutron detector 600) of chamber 105. In some implementations, $^{10}$B in the form of a thin layer disposed on at least a portion of the interior surface of chamber 105 can provide all or a portion of active material 112. In some implementations, $^3$He in the form of a gas disposed in chamber 105 can provide all or a portion of active material 112.

The charge-carrying particle(s) emitted by active material 112 in response to the impact of thermal neutron 162 can travel into readout gas 170 disposed within chamber 105.

The charge-carrying particles, such as triton 168, can ionize a portion of readout gas 170, creating a positively charged readout gas ion and electron 172.

At 808, neutron detector 102, 600, 700, 700' in response to the charged particles generated by the impact of thermal neutron 162 on active material 112, generates a current indicative of a number of thermal neutrons 162 that impact active material 112 or a rate at which thermal neutrons 162 impact active material 112 in the respective neutron detector 102, 600, 700, 700'. The method 800 concludes at 810.

Figure 8:
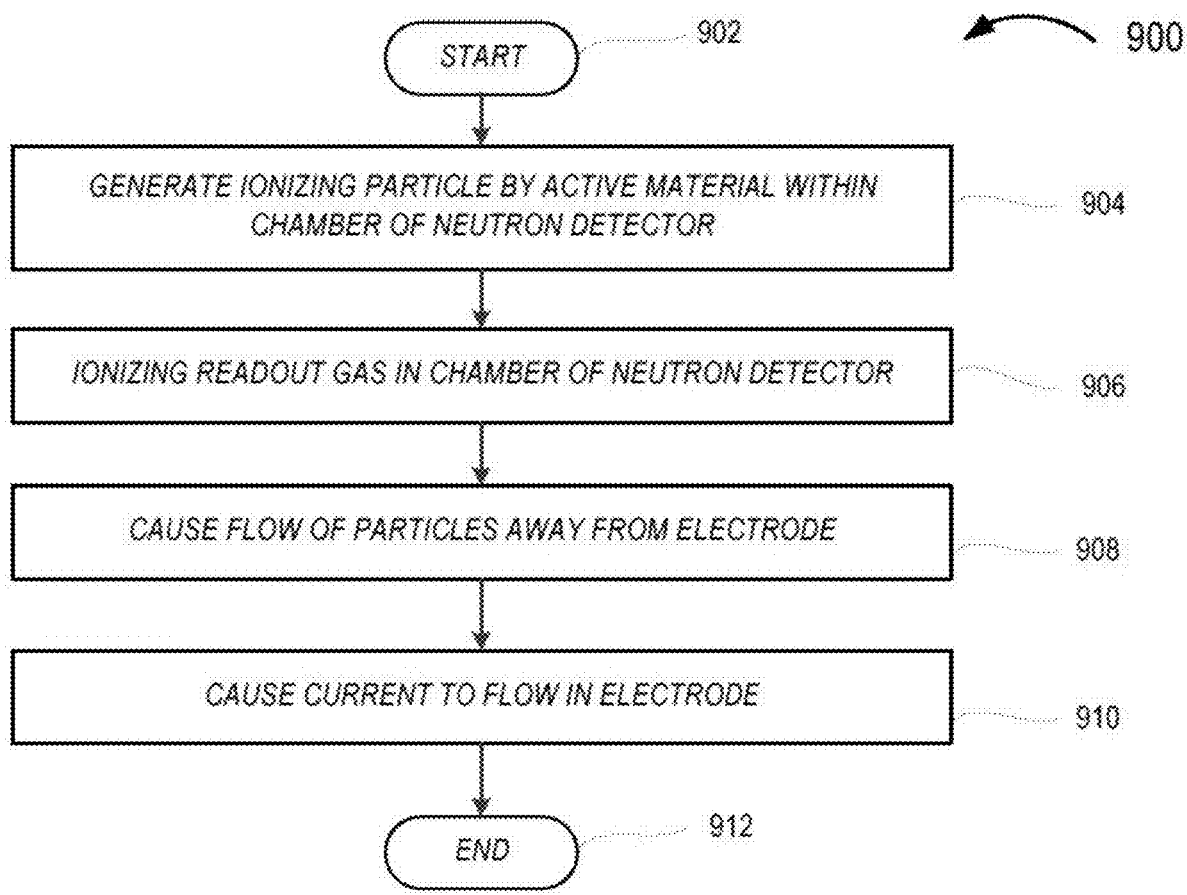
FIG. 8 is a flow diagram illustrating an embodiment of a method for detecting fissile neutrons using a fissile neutron detection system that includes at least one active material in the form of a solid sheet or layer, in accordance with at least one embodiment of the present disclosure.

FIG. 8 is a flow diagram of an embodiment of a method, generally indicated by the reference number 900, for generating a current in thermal neutron detector 102, 600, 700, 700' in response to the impact of thermal neutron 162 on an active material such as $^6$Li or $^{10}$B disposed in chamber 105 of thermal neutron detector 102, 600, 700, 700' in accordance with at least one embodiment of the present disclosure. The interaction of the charged particles, such as triton 168, generated by the impact of thermal neutron 162 on active material 112, with readout gas 170 disposed in chamber 105 can cause a current to flow on electrode 116 placed in chamber 105. Electrode 116 can be maintained at a potential that differs from the potential of active material 112. Method 900 commences at 902.

At 904, one or more charged particles can be generated by the capture of thermal neutron 162 by active material 112. In implementations using $^6$Li, these charged particles can include alpha-particle 166 (two protons and two neutrons) and triton 168 (one proton and two neutrons). In implementations, triton 168 can travel a distance of up to 135 μm through a $^6$Li sheet of active material 112. Thus, within thermal neutron detectors 102, 600, 700, 700' using $^6$Li active materials, the thickness of a $^6$Li sheet of active material 112 can be maintained at less than 135 μm to increase the probability that triton 168 will escape active sheet material 112.

In implementations using B, these charged particles can include an alpha particle and a $^7$Li ion. Approximately 78% of the time either of the alpha particle or the $^7$Li ion can escape a 1 μm thick layer of $^{10}$B. Thus, within thermal neutron detectors 102, 600, 700, 700' using $^{10}$B active materials, the $^{10}$B is typically applied as a coating or layer to all or a portion of the interior surfaces of chamber 105.

At 906, the charged particles escaping active material 112 ionize at least a portion of readout gas 170 disposed within chamber 105. In some implementations, readout gas 170 can include an elemental gas, a gas mixture, a gas combination, a gas compound, or any other combination of gases. In some implementations, readout gas 170 can include one or more noble gases, such as argon (Ar). In $^6$Li implementations, at least a portion of alpha particles 166 and/or at least a portion of tritons 168 can ionize a portion of readout gas 170, generating drift electrons 172 and a positively charged readout gas ion. In $^{10}$B implementations, at least a portion of alpha particles 166 and/or at least a portion of the $^7$Li particles can ionize a portion of readout gas 170, generating drift electrons 172 and a positively charged readout gas ion.

At 908, electrode 116 placed in chamber 105 can be maintained at a potential that differs from the potential of active material 112. In some instances, electrode 116 can be maintained at a potential that is positive (e.g., +1100 V) measured with respect to the potential of active material 112 (e.g., grounded or 0 V). The electric field created within chamber 105 can cause drift electrons 172 to drift or travel towards electrode 116. The electric field created within chamber 105 can also cause the positively charged readout gas ions to drift or travel towards active material 112. As drift electrons 172 travel and/or accelerate toward electrode 116, additional ionization of readout gas 170 can occur. This "chain reaction" of ionization of readout gas 170 can, in turn, cause an avalanche of electrons 174 within amplification region 176 about electrode 116.

At 910, the combined flow of positively charged readout gas ions toward active material 112 and the flow of drift electrons 172 toward electrode 116 causes an overall charge flow within chamber 105. This flow of charges within chamber 105 can induce a current in electrode 116. In some instances, the magnitude of the current in the electrode can be correlated with the number of thermal neutrons 162 that impact active material 112 and/or the rate at which thermal neutrons 162 impact active material 112. Method 900 concludes at 912.

Figure 9:
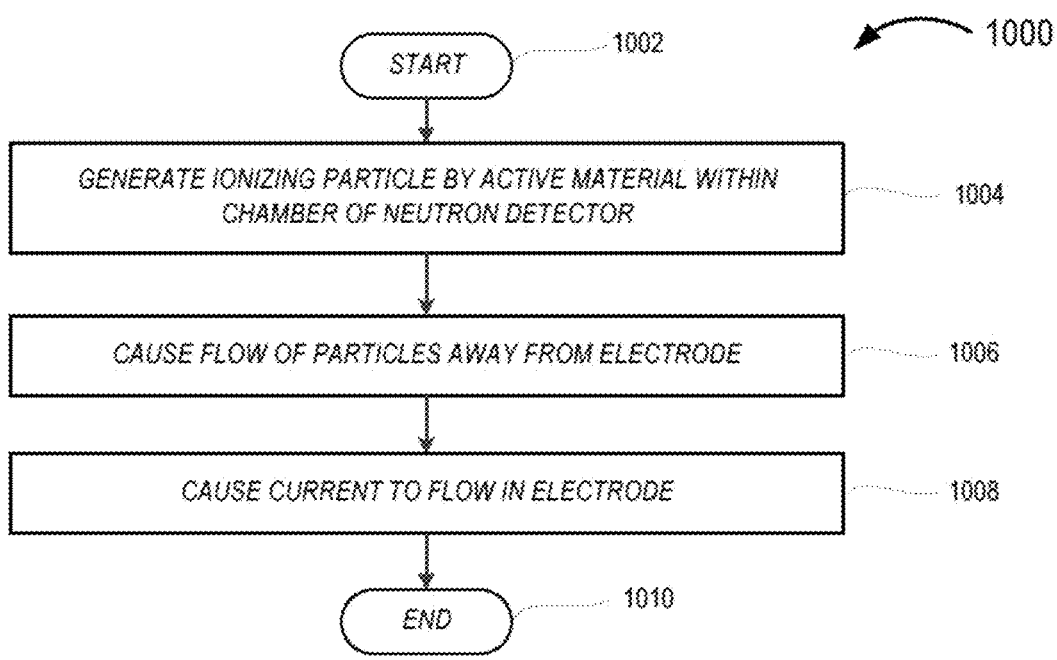
FIG. 9 is a flow diagram illustrating an embodiment of a method for detecting fissile neutrons using a fissile neutron detection system that includes at least one active material in the form of a gas, in accordance with at least one embodiment of the present disclosure.

FIG. 9 is a flow diagram of an embodiment of a method, generally indicated by the reference number 1000, for generating a current in thermal neutron detector 102, 600, 700, 700' in response to the impact of thermal neutron(s) 162 on an active material such as $^3$He or boron trifluoride (BF$_3$) disposed in chamber 105 of thermal neutron detector 102, 600, 700, 700' in accordance with at least one embodiment of the present disclosure. The interaction of the charged particles generated by the interaction between thermal neutron 162 and a gaseous active material 112 such as $^3$He disposed in the chamber 105 can cause a current to flow on electrode 116 disposed within chamber 105. In some instances, electrode 116 can be maintained at a potential that differs from the potential elsewhere in chamber 105 and different from the potential of gaseous active material 112. Method 1000 commences at 1002.

At 1004, one or more charged particles can be generated by the capture of thermal neutron 162 by active material 112. In implementations using $^3$He, these charged particles can include a proton and a triton.

At 1006, electrode 116 placed in chamber 105 can be maintained at a potential that differs from the potential of active material 112. In some instances, electrode 116 can be maintained at a potential that is positive (e.g., +1100V) measured with respect to the potential of active material 112 (e.g., grounded or 0 V). The electric field created within chamber 105 can cause the charged particles to drift or travel towards electrode 116.

At 1008, the flow of charged particles toward electrode 116 causes an overall charge flow within chamber 105. This flow of charges within chamber 105 can induce a current in electrode 116. In some instances, the magnitude of the current in the electrode can be correlated with the number of thermal neutrons 162 that impact active material 112 and/or the rate at which thermal neutrons 162 impact active material 112. Method 1000 concludes at 1010.

Figure 10A:
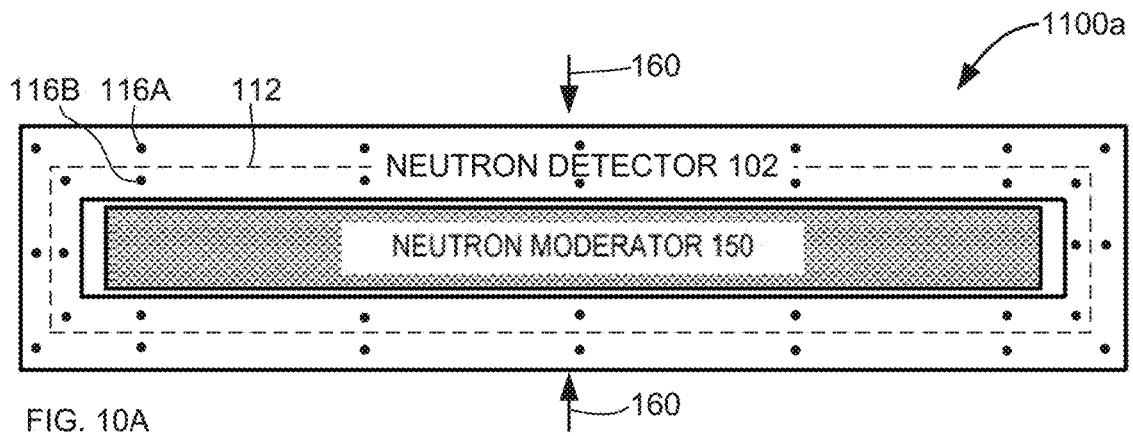
FIGS. 10A-10S are diagrammatic, partially cutaway views, in elevation, of embodiments of fissile neutron detection systems, in accordance with the present disclosure.

FIG. 10A depicts a diagrammatic, partially cutaway view, in elevation, of an embodiment of a fissile neutron detection system, generally indicated by the reference number 1100a, including thermal neutron detector 102 and neutron moderator 150. In the embodiment depicted in FIG. 10A, thermal neutron detector 102 is formed into a ring-like structure that at least partially surrounds neutron moderator 150. In such an arrangement, incident high-energy fissile neutrons 160 most often pass through thermal neutron detector 102 and impinge upon neutron moderator 150. Within neutron moderator 150, the energy level of at least some of fissile neutrons 160 can be reduced to an energy level of thermal neutron 162. At least a portion of thermal neutrons 162 can exit the neutron moderator 150 and enter the neutron detector 102. In accordance with the teachings of this disclosure, the embodiment of the thermal neutron detector arrangement of FIG. 10A can be configured to include an active sheet layer arrangement 112 that surrounds moderator 150 such that a majority of the incident fissile neutrons pass through the active sheet layer arrangement prior to impinging on moderator 150, and (ii) a majority of thermal neutrons impinge on the active sheet layer arrangement after exiting the moderator arrangement. As will be further discussed and as also shown in subsequent figures, thermal neutron detectors, in accordance with the present disclosure, can include a first set of electrodes 116A on one side of the active sheet layer arrangement and another set of electrodes 116B on an opposite side of the active sheet layer arrangement.

Figure 10B:
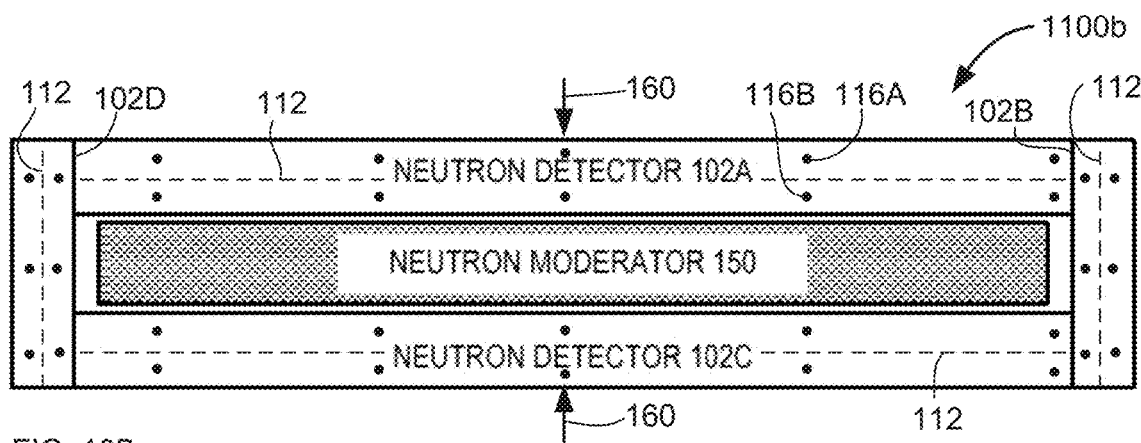

FIG. 10B is a diagrammatic, partially cutaway view, in elevation, of an embodiment of a fissile neutron detection system, generally indicated by the reference number 1100b, including thermal neutron detector 102 and neutron moderator 150. In the embodiment depicted in FIG. 10B, a number of thermal neutron detectors 102A-102D at least partially surround an exterior periphery or peripheral outline of neutron moderator 150. In such an arrangement, incident high-energy fissile neutrons 160 can pass through any one of the number of neutron detectors 102A-102D and thereafter impinge upon neutron moderator 150. Within neutron moderator 150, the energy level of at least some of fissile neutrons 160 can be reduced to an energy level of thermal neutron 162. At least a portion of thermal neutrons 162 can exit neutron moderator 150 and enter one of thermal neutron detectors 102A-102D.

Figure 10C:
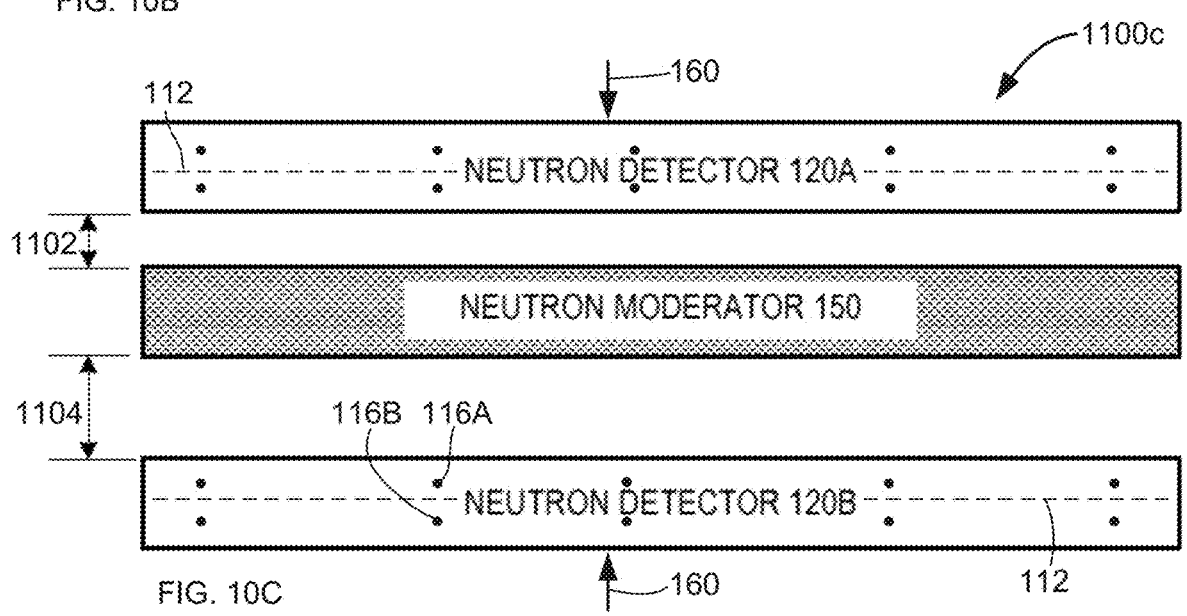

FIG. 10C is a diagrammatic, partially cutaway view, in elevation, of an embodiment of a fissile neutron detection system, generally indicated by the reference number 1100c, including thermal neutron detector 102 and neutron moderator 150. In the embodiment depicted in FIG. 10C, a number of thermal neutron detectors 102A-102B at least substantially surround an exterior periphery or peripheral outline of neutron moderator 150. Although depicted as a planar body, in such an arrangement, each of neutron detectors 102 can include a planar body, a curved body, or an angular body. As depicted in FIG. 10C, first thermal neutron detector 102A can be spaced a first distance 1102 from at least a portion of an exterior side (i.e., major surface) of neutron moderator 150 and a second thermal neutron detector 102B can be spaced a second distance 1104 from at least a portion of an opposing exterior side (i.e., major surface) of neutron moderator 150. In accordance with the general teachings of this disclosure, each thermal neutron detector arrangement of FIG. 10C can be configured to include an active sheet layer arrangement 112 that spans at least a majority of the lateral extents of that detector.

FIG. 10D is a diagrammatic, partially cutaway view, in elevation, of an embodiment of a fissile neutron detection system, generally indicated by the reference number 1100d, including thermal neutron detector 102 and neutron moderator 150. In the embodiment depicted in FIG. 10D, neutron moderator 150 at least partially surrounds at least a portion of an exterior surface of first thermal neutron detector 102A and an exterior surface of second thermal neutron detector 102B. Gaps or voids are present around each thermal neutron detector. These gaps can contain, for example, air, or materials that secure the thermal neutron detectors to the moderator. Horizontal gaps 1106 above and below each major surface of the thermal neutron detectors are sufficiently limited in vertical extents so as to have a limited effect on detection performance. Vertical gaps 1108 are wider than horizontal gaps but are limited in volume and are less critical than the horizontal gaps due to positioning outward of the thermal neutron detectors so as to be less interactive with active material 112 within each of the thermal neutron detectors.

FIG. 10E is a diagrammatic, partially cutaway view, in elevation, of an embodiment of a fissile neutron detection system, generally indicated by the reference number 1100e, including thermal neutron detector 102 and neutron moderator 150. In the embodiment depicted in FIG. 10E, first thermal neutron detector 102A and second thermal neutron detector 102B are disposed in an alternating or "sandwich" arrangement with first neutron moderator 150A, second, center thermal neutron moderator 150B and a third, thermal neutron moderator 150C. As depicted in FIG. 10E, moderators 150A and 150C are substantially thinner than moderator 150B for purposes of enhancing detection performance.

FIG. 10F is a diagrammatic, partially cutaway view, in elevation, of an embodiment of a fissile neutron detection system, generally indicated by the reference number 1100f, including thermal neutron detector 102 and neutron moderator 150. In the embodiment depicted in FIG. 10F, first thermal neutron detector 102A and second thermal neutron detector 102B are disposed in a moderator region defined between the thermal neutron detectors having a limited gap between each thermal neutron detector and the moderator such that the moderator is at least substantially surrounded by the arrangement of detectors. It is noted that the exposed ends and/or sides (or even the entire peripheral edge configuration) of moderator 150B can be considered as gaps in an overall arrangement of thermal neutron detectors. These gaps, however, have a limited effect on detection performance at least due to their locations outward of the active material in the thermal neutron detectors and their limited extents as part of the periphery of the moderator region defined by the cooperation of thermal neutron detectors 102A and 102B.

Figure 10G:
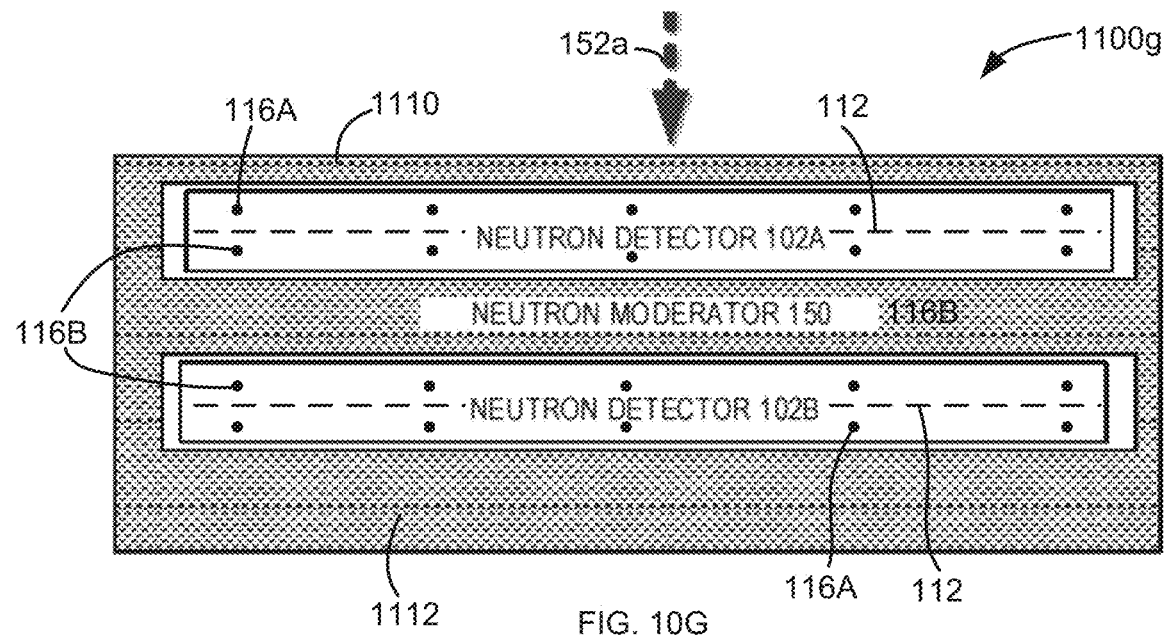

FIG. 10G is a diagrammatic, partially cutaway view, in elevation, of an embodiment of a fissile neutron detection system, generally indicated by the reference number 1100g, including thermal neutron detector 102 and neutron moderator 150. In the embodiment depicted, a unidirectional fissile neutron detector is formed wherein reception from the top side including, major receiving direction 152a, is enhanced with respect to an opposite set of receiving directions. The enhanced sensitivity is due to one thickness 1110 of moderator 150 above thermal neutron detector 102A, in the view of the figure, being less than another thickness 1112 of the moderator below thermal neutron detector 102B.

Figure 10H:
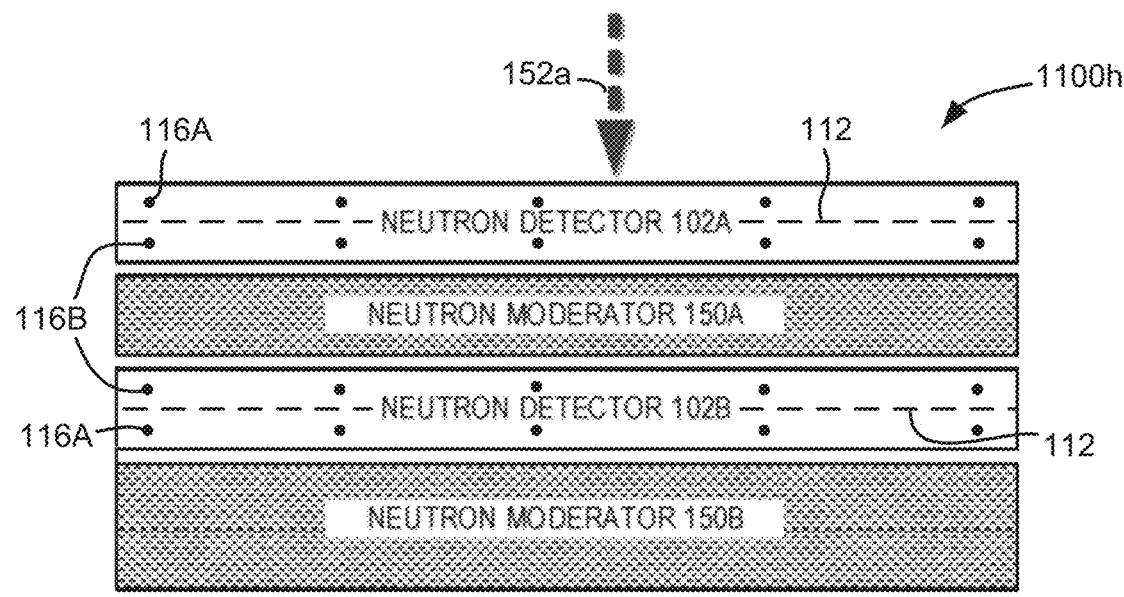

FIG. 10H is a diagrammatic, partially cut-away view, in elevation, of an embodiment of an illustrative fissile neutron detection system, generally indicated by the reference number 1100h, including neutron moderator 150 and thermal neutron detector 102. In the embodiment depicted in FIG. 10H, first thermal neutron detector 102A and second thermal neutron detector 102B are disposed in an alternating or "sandwich" arrangement with first neutron moderator 150A and second neutron moderator 150B. At least a portion of the surface of first neutron detector 102A is exposed. In this way, a unidirectional fissile neutron detection system is formed at least with a relatively higher detection sensitivity in receiving directions from the side of the detection arrangement on which first major receiving direction 152a is shown. In embodiments, moderator 150B can be up to 10 cm thick.

Figure 10I:
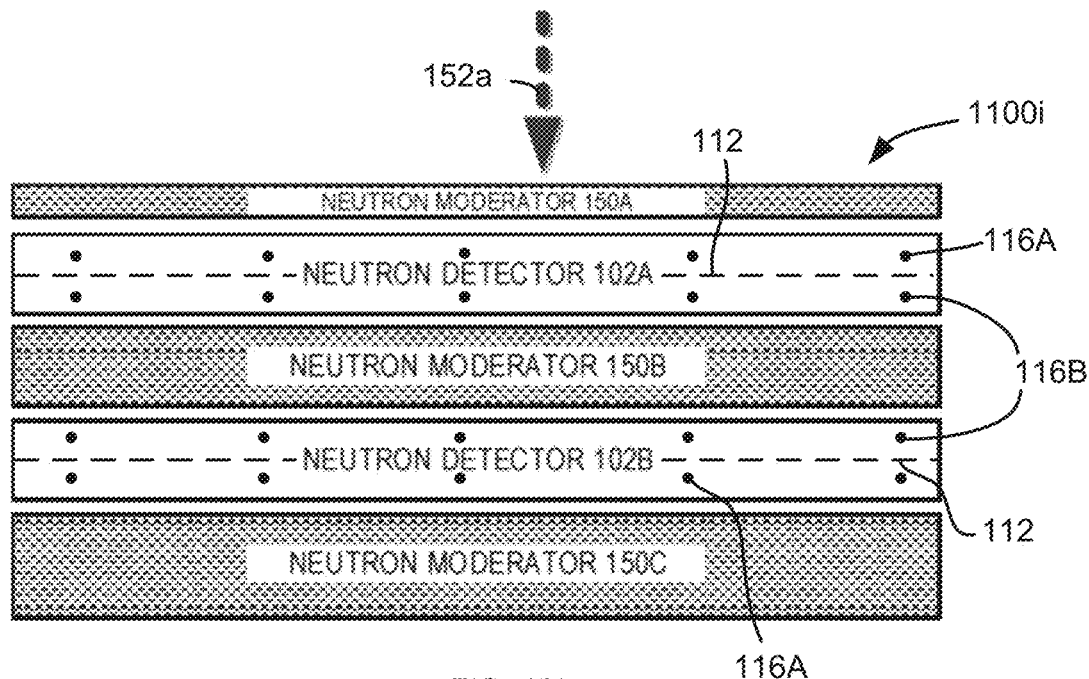

FIG. 10I is a diagrammatic, partially cut-away view, in elevation, of an embodiment of an illustrative fissile neutron detection system, generally indicated by the reference number 1100i, including neutron moderator 150 and thermal neutron detector 102. In the embodiment depicted in FIG. 10I, first thermal neutron detector 102A and second thermal neutron detector 102B are disposed in an alternating or "sandwich" arrangement with first neutron moderator 150A, second neutron moderator 150B and third neutron moderator 150C. Based on the foregoing discussions, it should be appreciated that a unidirectional fissile neutron detection system is formed at least with a relatively higher detection sensitivity in receiving directions from the side of the detection arrangement on which first major receiving direction 152a is shown, at least for the reason that moderator 150a is thinner than moderator 150C. In embodiments, first supplemental moderator 150A can have a thickness that is in a range from 0.1 cm to 1 cm, inclusively, and second supplemental moderator third supplemental moderator thickness 150C can be in a range from 1.1 cm to 10 cm, inclusively.

Figure 10J:
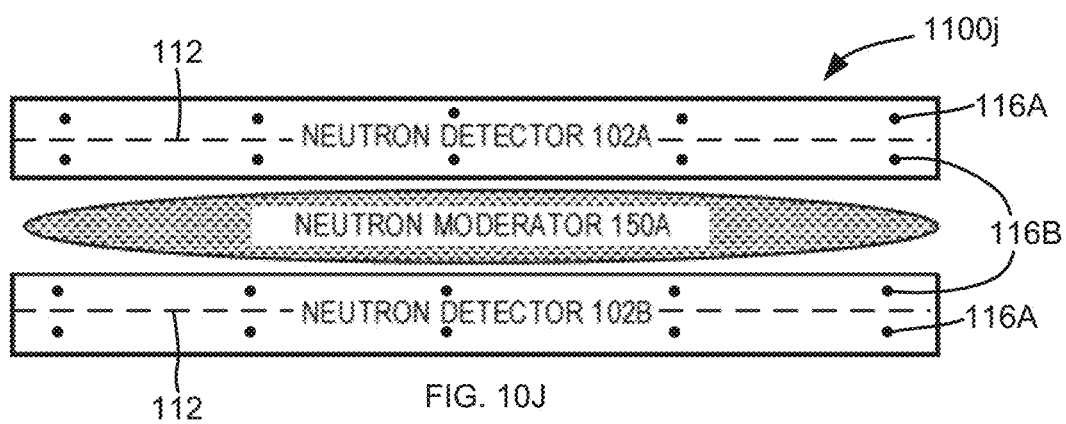

FIG. 10J is a diagrammatic, partially cut-away view, in elevation, of an embodiment of illustrative fissile neutron detection system, generally indicated by the reference number 1100j, including neutron detector 102 and neutron moderator 150. In the embodiment depicted in FIG. 10J, two neutron detectors 102A-102B are disposed to at least substantially surround an exterior peripheral outline of a non-planar neutron moderator 150A. In such an arrangement, some or all of neutron detectors 102 can have a planar body disposed about at least a portion of the exterior peripheral outline of non-planar neutron moderator 150, as will be further described.

Figure 10K:
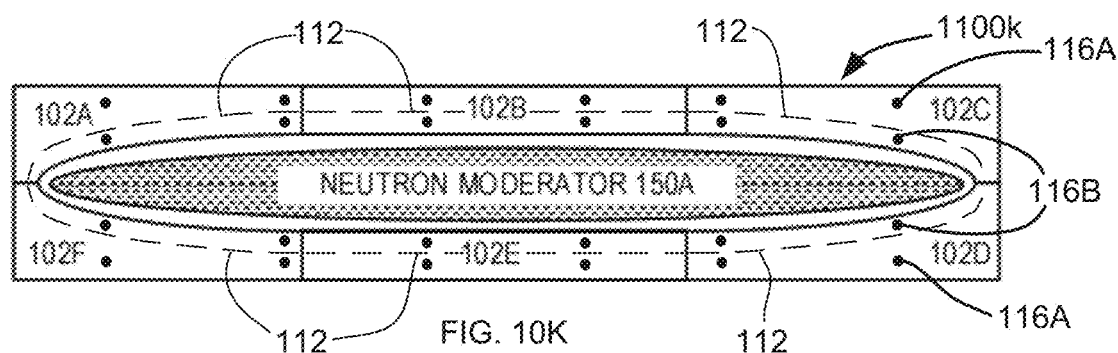

FIG. 10K is a diagrammatic, partially cut-away view, in cross elevation, of an embodiment of an illustrative fissile neutron detection system, generally indicated by the reference number 1100k, including thermal neutron detector 102 and neutron moderator 150, in accordance with at least one embodiment of the present disclosure. In the embodiment of FIG. 10K, six thermal neutron detectors 102A-102F are disposed to at least substantially surround an exterior peripheral outline of a non-planar neutron moderator 150. In such an arrangement, some or all of neutron detectors 102 can have a contoured body or shell configured to closely approximate a surface contour of at least a portion of the exterior periphery of non-planar neutron moderator 150. Stated in another way, the detector arrangement can define a moderator region that is at least generally complementary to the outer peripheral outline of moderator 150A. Based on this configuration, interstitial gaps or voids between the neutron moderator and the thermal neutron detectors can be reduced or even eliminated, even though the neutron moderator is essentially elliptical in configuration, as shown. It should be appreciated that any suitable number of thermal neutron detectors can be used such that the view of FIG. 10J will be obtained in any plane that bisects the detection system. In some embodiments, moderator can include a suitable closed shape such as circular or ovoid in a plan view and thermal neutron detectors 102 can be pie or wedge shaped.

Figure 10L:
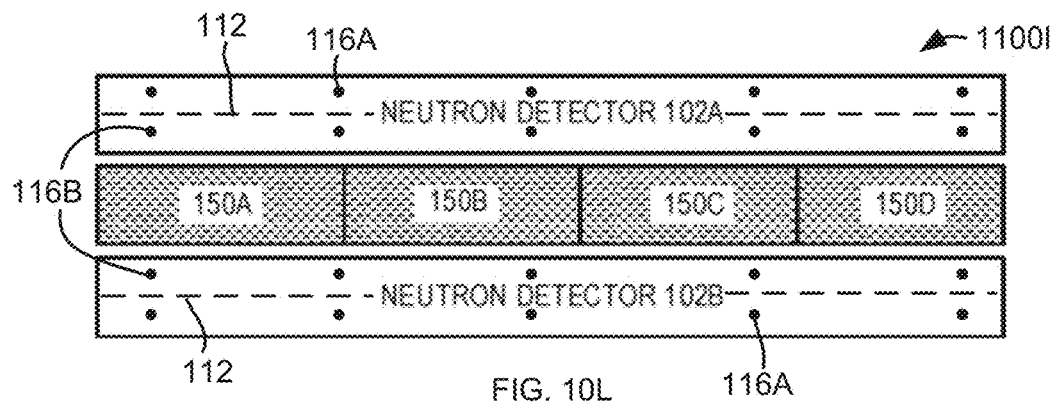

FIG. 10L is a diagrammatic, partially cut-away view, in elevation of an embodiment of a fissile neutron detection system, generally indicated by the reference number 1100l, including an arrangement of thermal neutron detectors 102 and an arrangement of neutron moderators 150, in accordance with at least one embodiment of the present disclosure. In the embodiment of FIG. 10L, thermal neutron detectors 102A and 102B at least partially surround an exterior peripheral outline of a plurality of neutron moderators 150A-150D. Although each thermal neutron detector is shown as a planar body, in such an arrangement, each of thermal neutron detectors 102 can include a planar body, a curved body, an angular body or some other suitable shape. Moderators 150A-150D are shown in a side-by-side relationship in physical contact with one another, although physical contact is not a requirement.

Figure 10M:
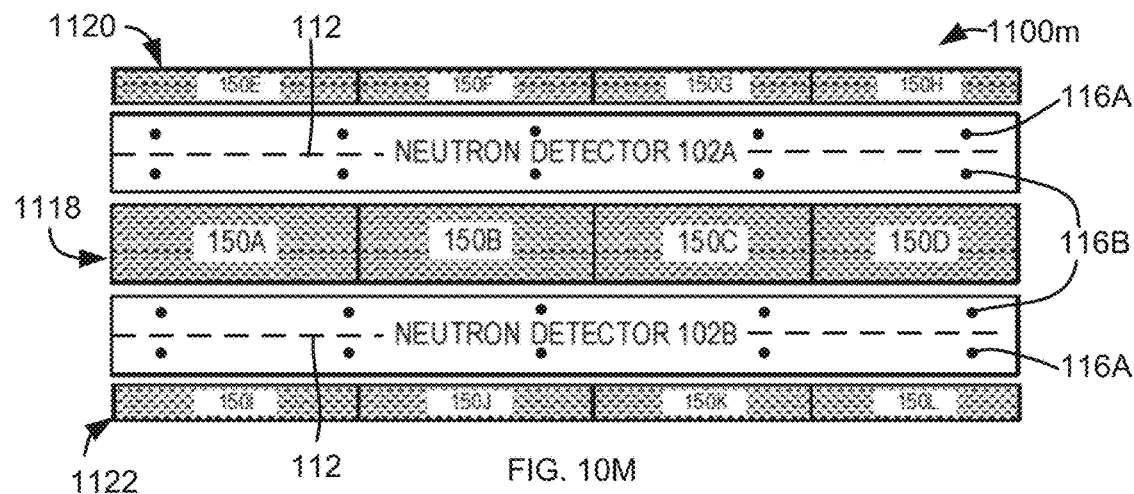

FIG. 10M is a diagrammatic, partially cut-away view, in elevation, of an embodiment of a fissile neutron detection system, generally indicated by the reference number 1100m, including an arrangement of thermal neutron detectors 102 and an arrangement of neutron moderators 150, in accordance with at least one embodiment of the present disclosure. In the embodiment depicted in FIG. 10M, a center moderator arrangement 1118, made of a plurality of individual moderators 150A-150D, is thicker than one either of a first supplemental moderator arrangement 1120 and a second supplemental moderator arrangement 1122. It is noted that any suitable number of one or more moderators can make up the center moderator arrangement. First supplemental moderator arrangement is made up of moderators 150E-150 H while second supplemental moderator arrangement 1122 is made up of moderators 150I-150L, although either supplemental moderator arrangement can be made up or any suitable number of one or more moderators. Moreover, the moderators of each supplemental moderator arrangement are shown in a side-by-side relationship in physical contact with one another, although physical contact is not a requirement. It should be appreciated that the structure of detection system 1100m provides for bidirectional reception based on two major opposing receiving directions.

Figure 10N:
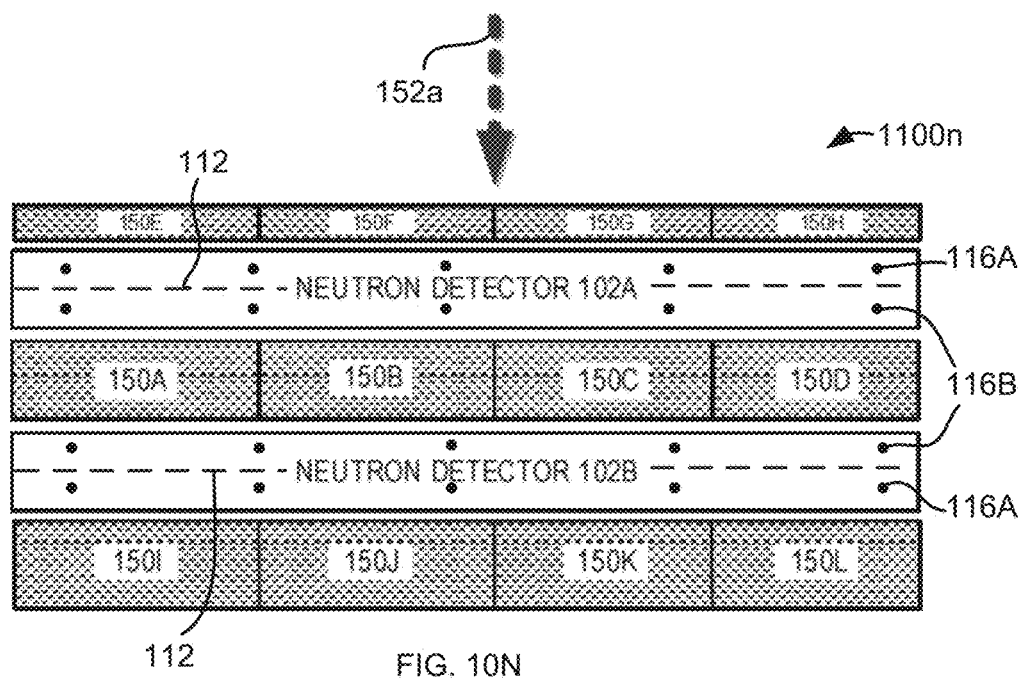

FIG. 10N is a diagrammatic, partially cut-away view, in elevation, of an embodiment of a fissile neutron detection system, generally indicated by the reference number 1100n. The structure of system 1100n reflects the structure of system 1100m of FIG. 10M with the exception that a first supplemental moderator arrangement 1120' is relatively thinner than a second supplemental moderator arrangement 1122' such that a unidirectional fissile neutron detection system is formed with a relatively higher detection sensitivity in receiving directions from the side of the detection arrangement on which first major receiving direction 152a is shown.

Figure 10P:
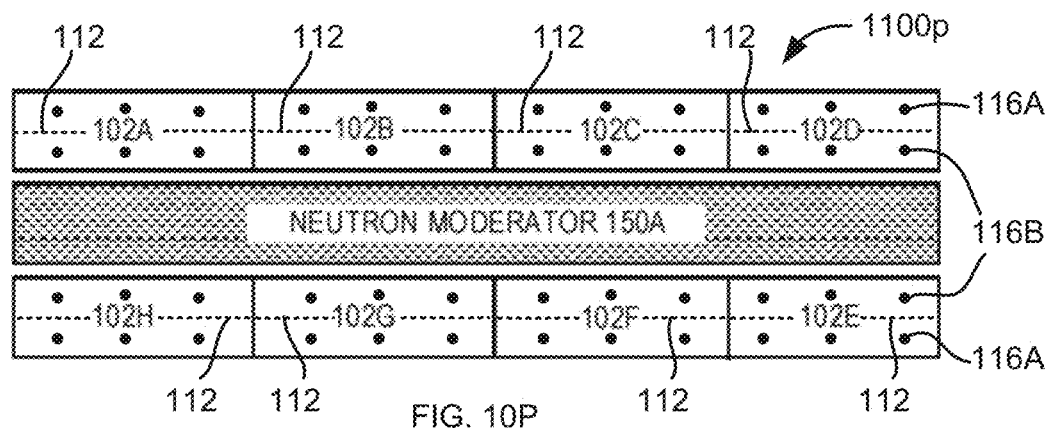

FIG. 10P is a diagrammatic, partially cut-away view, in elevation, of an embodiment of a fissile neutron detection system, generally indicated by the reference number 1100p. The structure of system 1100p reflects the structure of system 1100f of FIG. 10F with the exception that a first group of thermal neutron detectors 102A-102D replace thermal neutron detector 102A and a second group of thermal neutron detectors 102E-102H replace thermal neutron detector 102B of fissile neutron detection system 1100f. Applicants recognize that the use of a plurality of smaller surface area thermal neutron detectors to replace what would otherwise be a relatively large surface area thermal neutron detector provides benefits in terms of maintaining detection performance and avoiding damage that can result from a pressure differential between ambient pressure and the lower pressure within the sealed chamber that is defined by each detector. In this regard, any suitable number of side-by-side thermal neutron detectors can be used and there is no requirement that the same number must be used in each group of thermal neutron detectors, as is likewise the case with respect to the figures which follow. Moreover, a group of moderators can likewise be used in place of moderator 150A. Given that each thermal neutron detector 102 includes an active material layer 112, as is the case in this embodiment as well as all embodiments described herein that use multiple thermal neutron detectors, it should be appreciated that the active material layers of the thermal neutron detectors cooperate to substantially surround the moderator or moderator arrangement at least for the reason that the thermal neutron detectors themselves substantially surround the moderator or moderator arrangement. Thus, the active material layers of the thermal neutron detectors cooperate to span at least a majority of the lateral extents of the moderator arrangement. In this regard, the lateral extents of the active sheet material of each thermal neutron detector is nearly coextensive with the lateral extents of the thermal neutron detector itself, which limits escape avenues for thermal neutrons to evade detection.

Figure 10Q:
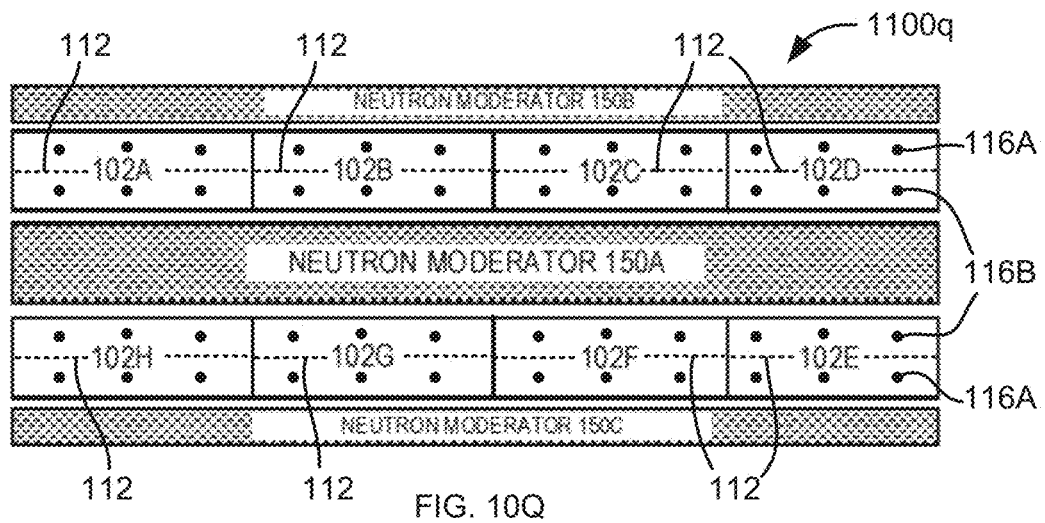

FIG. 10Q is a diagrammatic, partially cut-away view, in elevation, of an embodiment of a fissile neutron detection system, generally indicated by the reference number 1100$q$. The structure of system 1100$q$ reflects the structure of system 1100$e$ of FIG. 10E with the exception that a first group of thermal neutron detectors 102A-102D replace thermal neutron detector 102A and a second group of thermal neutron detectors 102E-102H replace thermal neutron detector 102B of fissile neutron detection system 1100$e$. Thus, the descriptions herein with respect to the use of a group of thermal neutron detectors in place of a single thermal neutron detector are equally applicable here.

Figure 10R:
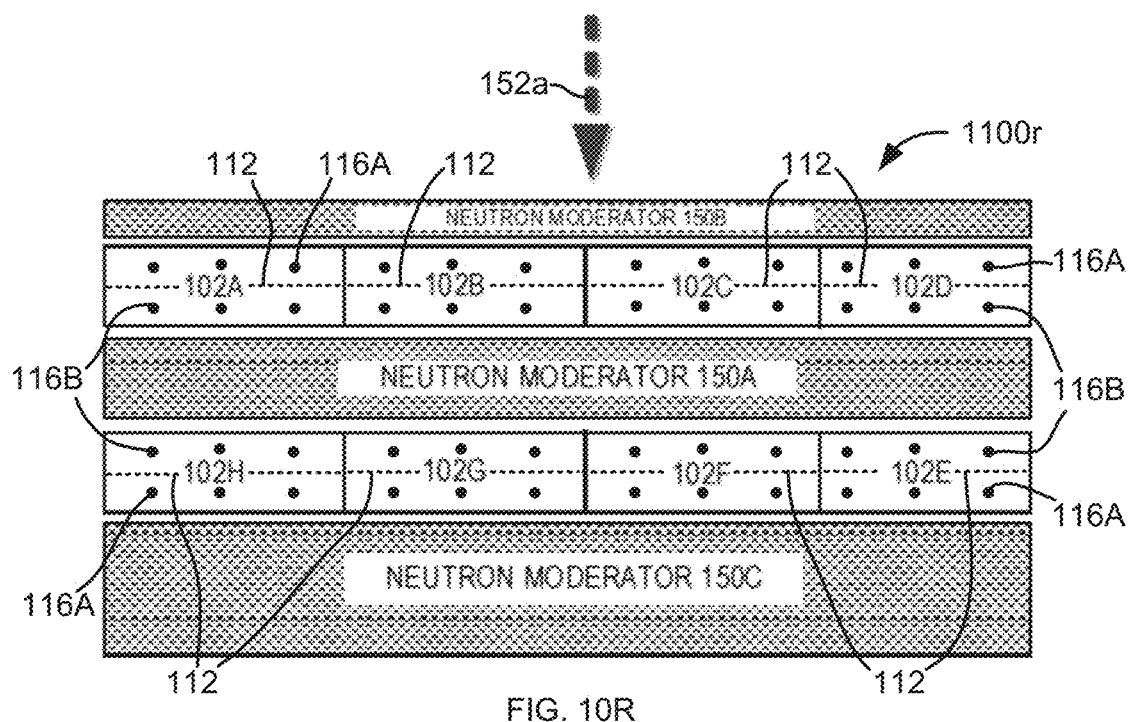

FIG. 10R is a diagrammatic, partially cut-away view, in elevation, of an embodiment of a fissile neutron detection system, generally indicated by the reference number 1100$r$. The structure of system 1100$r$ reflects the structure of system 1100$i$ of FIG. 10I with the exception that a first group of thermal neutron detectors 102A-102D replace thermal neutron detector 102A and a second group of thermal neutron detectors 102E-102H replace thermal neutron detector 102B of fissile neutron detection system 1100$i$. Thus, the descriptions herein with respect to the use of a group of thermal neutron detectors in place of a single thermal neutron detector are equally applicable here.

Figure 10S:
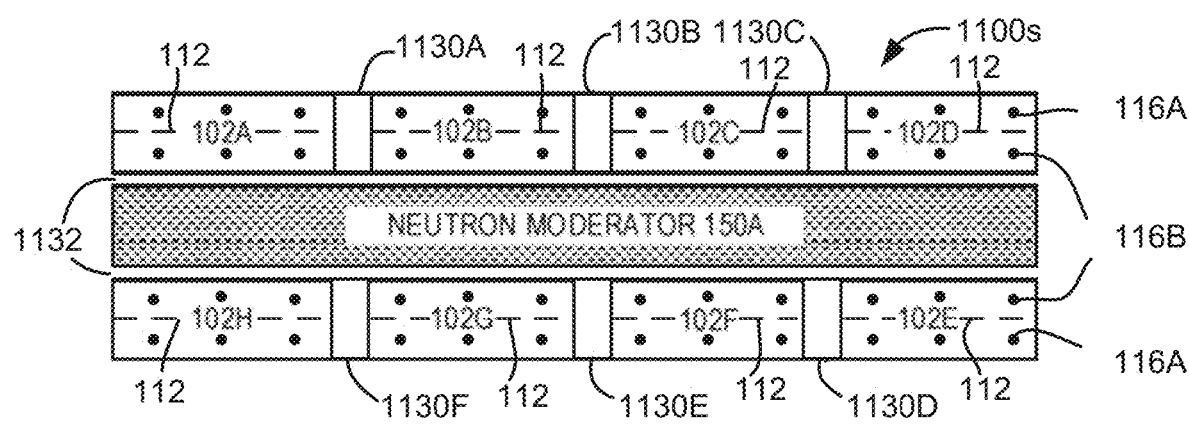

FIG. 10S is a diagrammatic, partially cut-away view, in elevation, of an embodiment of a fissile neutron detection system, generally indicated by the reference number 1100$s$. The structure of system 1100$s$ reflects the structure of system 1100$p$ of FIG. 10P with the exception that side moderators 1130A-1130F are positioned between adjacent ones of thermal neutron detectors 102A-102H. It should be appreciated that side moderators can be employed in any embodiment described herein that includes side-by-side thermal neutron detectors. The side moderators can be formed from the same material as center moderator 150A, although this is not a requirement. Further, the side moderators can be integrally formed with center moderator 150A or individually formed. While gaps 1132 are illustrated between center moderator 150A and the thermal neutron detectors and between center moderator 150A and side moderators 1130, it should be noted that such gaps may not have an appreciable effect on detection efficiency if the gaps are sufficiently narrow, but in any case are not required. Sufficiently narrow gaps can also be present between the side moderators and adjacent thermal neutron moderators depending on desired detection efficiency, but are not required. In embodiments, the side moderators are no more than 5 cm thick between adjacent ones of the thermal neutron detectors. In some embodiments, the thickness of side moderators can be in a range from 1 cm to 5 cm, inclusively.

As is illustrated in FIGS. 10C, 10D, 10E, 10F, 10G, 10H, 10I, 10J, 10K, 10L, 10M, 10N, 10P, 10Q, 10R and 10S, in accordance with the general teachings of this disclosure, each thermal neutron detector arrangement of these embodiments can be configured to include an active sheet layer arrangement that spans at least a majority of the lateral extents of that detector. As illustrated in FIGS. 10A-10N and 10P-10S, in accordance with descriptions above, the major, opposing sides of the moderator arrangements can be in direct physical contact with one of the major surfaces of each thermal neutron detectors. In some implementations, in a manner consistent with the subject illustrations, an air gap (or some other form of void space disposed between the moderator and the detector arrangement) can exist between the moderator arrangement and the neutron detectors. Applicants recognize that, in the context of the described embodiments, the distance between the moderator or moderator arrangement and the thermal neutron detectors can generally be minimized or at least reduced in order to ensure that thermal neutrons do not escape from the detection system after exiting the moderator. Stated in another way, reducing the gap between the moderator and detector arrangement can provide for a minimum or at least reduced number of thermal neutron detectors to minimize or at least reduce the probability of escape of thermal neutrons from the detection system after exiting the moderator. In a manner consistent with minimizing these gaps, embodiments that are within the scope of the present disclosure can at least substantially fill the volume of a moderator region (i.e., greater than 50 percent) that is defined between the thermal neutron detectors with moderating material, as is illustrated in the subject figures. In one embodiment, at least 60 percent of the volume of the moderator region is filled by moderating material. In this regard, a moderating arrangement can include a single member or multiple members of moderating material. Interstitial gaps between multiple members, for example those of FIG. 10S in which side moderators are disposed, do not contribute to the filled volume. As mentioned previously, with this disclosure in hand it should be clear that excessive thermal neutron detector-to-moderator spacing will generally reduce overall efficiency. While not intending to be bound by theory, Applicants submit that excessive spacing (i.e., an excessive moderator detector gap) can result in excess space, between detector arrangements, that is not filled by moderating material and that this provides what may be referred to as sideways or grazing escape paths for thermal neutrons to exit from moderating material without thereafter entering a thermal neutron detector to thereby evade detection. For at least this reason, a person of ordinary skill in the art, having this disclosure in hand, should appreciate that for the embodiments described herein detection efficiency is typically enhanced when the volume or region defined by the detector arrangement is at least substantially filled by the moderator, as opposed to cases where moderator-detector spacing results in significant void or otherwise unfilled space within the envelope defined by the inner periphery of the thermal neutron detector arrangement. It is noted that all of the embodiments of the subject figures are illustrated in a manner that is consistent with small moderator detector gaps for filling the majority of the envelope defined by the inner periphery of the thermal neutron detector arrangement.

In FIGS. 10A-10N and 10P-10S, the neutron moderator arrangement is substantially surrounded by the detector arrangement at least for the reason that a majority of the major opposing sides of neutron moderator 150 are in a direct confronting relationship with the surrounding thermal neutron detectors and, more particularly, in such a confronting relationship with surrounding active sheet arrangement 112. In this regard, it is submitted that a person of ordinary skill in the art, having this disclosure in hand, will appreciate that the active sheet layer of each thermal neutron detector tends to be a particularly consequential feature. While other thermal neutron detector features can provide for crucial functions, including but not limited to supporting the active sheet layer and sealing the detection gas, the active sheet layer serves a particularly noteworthy function of actively initiating the fundamental physical processes necessary for detection. It should be further appreciated that the detector arrangements described herein tend to be thin, at least somewhat planar and are laterally spanned by active sheet material. Therefore, much of the descriptive terminology directed herein towards thermal neutron detectors can at least generally be considered as applicable with respect to the active sheet layer(s), such that various aspects of the description, directed towards thermal neutron detector arrangements, are at least generally applicable with respect to the active sheet layer(s) when considered independent of the remaining physical structure of the thermal neutron detectors. As one example, the advantages associated with "surrounding" the moderator arrangement with the thermal detector arrangement can just as accurately be regarded as surrounding of the moderator with active sheet material. In other words, the active sheet material layer(s) surround the moderator arrangement. As another example, close spacing between the moderator and the thermal neutron detectors can be regarded as facilitating close spacing between the moderator and the active sheet layer(s) of the thermal neutron detector(s) at least for the reason that the active sheet layer(s) can be regarded as actively initiating physical processes necessary for detection.

While there is a benefit associated with the active sheet layer arrangement closely surrounding a moderator, in terms of detecting thermal neutrons that might otherwise evade detection, for example, based on grazing angles, Applicants recognize that it can be advantageous for the electrode arrangement to include first and second sets of electrodes in a spaced apart confronting relationship, with the active sheet layer arrangement disposed therebetween, such that both sets of electrodes are distributed across at least a majority of the active sheet arrangement.

Applicants submit that the detection efficiency experiences an overall enhancement despite the introduction of an additional set of electrodes between the active sheet material layer of each thermal neutron detector and the moderator. Without intending to be bound by theory, Applicants believe that the enhanced detection capability is a result of allowing for generating electrical current on both sides of the active sheet material responsive to ionization of the readout gas disposed within chamber 105. Moreover, the relative increase in spacing that is needed in the direction transverse to the major surfaces of the active sheet material layer to accommodate the second electrode set is small since the active sheet material already must be supported in a spaced apart relationship from the housing of the thermal neutron detector.

In some embodiments, for example FIGS. 10B-10J, 10L, and 10N the fissile neutron detection system includes first and second thermal neutron detectors that each support an active sheet layer that spans at least a majority of the lateral extents of the moderator arrangement, and each of the thermal neutron detectors includes first and second electrode arrangements in a spaced apart confronting relationship with the active sheet layer disposed therebetween such that the electrodes of the first electrode arrangement are laterally spaced apart proximate to one of a pair of opposing major surfaces of the active sheet layer and the electrodes of the second electrode arrangement are laterally spaced apart proximate to the other, opposite one of the opposing pair of major surfaces with a projection of each of the first and second arrangements of electrodes onto the active sheet material layer defining an area that substantially covers one of the major surfaces of the active sheet material layer.

In other embodiments, for example FIGS. 10K, 10P, 10Q, 10R, and 10S, the fissile neutron detection system can include at least one group of thermal neutron detectors with the thermal neutron detectors of each group in a side-by-side relationship. In these embodiments, each one of the thermal neutron detectors of the group can include first and second sets of electrodes in a spaced apart confronting relationship and an active sheet material layer disposed therebetween with the electrodes of the first electrode set laterally spaced apart proximate to one of a pair of opposing major surfaces of the active sheet layer and the electrodes of the second electrode set laterally spaced apart proximate to the other, opposite one of the opposing pair of major surfaces such that a projection of each of the first and second sets of electrodes onto the active sheet material layer defines an area that substantially covers one of the major surfaces of the active sheet material layer.

It is noted that the configurations depicted in FIGS. 10A-10N and 10P-10S employ a thermal neutron detector arrangement in which thermal neutron detector 102, 600, 700, 700' generally surrounds neutron moderator 150 can provide significant advantages over prior fissile neutron detector designs. Such prior fissile neutron detector designs can be classified as either TYPE I arrangements in which the moderator surrounds the thermal neutron detector and TYPE II arrangements in which the moderator is interspersed among an array of detectors that are separated from each other by substantial amounts along various directions.

With regard to TYPE I arrangements, back scattered neutrons that initially strike the moderator can be directed away from the inner detector such that the backscattered neutrons are lost to detection. With respect to the configurations disclosed herein, it is noted that the great majority of such backscattered neutrons can be collected by thermal neutron detectors 102, 600, 700, 700' as a consequence of the manner in which the detector arrangement can directly surround the moderator in almost all directions.

With regard to TYPE II arrangements, it is noted that the disclosed embodiments advantageously reduce the distance that backscattered neutrons travel prior to impacting a neutron detector. In contrast, even optimized TYPE II arrangements can be handicapped by the distances backscattered neutrons must travel prior to detection. While TYPE II systems can allow for an increasing number of neutron detectors as a way of increasing overall system efficiency, such additional detectors generally push the system as a whole toward a heavier, bulkier, and more expensive solution than the embodiments described herein. The system geometries disclosed herein offer significant improvements in space, weight and cost when compared to traditional TYPE II systems.

In reference to FIGS. 10A-10N and 10P-10S, for purposes of descriptive clarity, attention is directed to several aspects of performance as delineated from prior technical discussions. The fissile neutron detection systems of the present disclosure are arranged such that a neutron moderator 150 is surrounded by a thermal neutron detector 102, 600, 700, 700' arrangement such that incoming fissile neutrons 160 generally pass through neutron detector 102, 600, 700, 700' before striking the neutron moderator 150, and the vast majority (>60%) of all thermal neutrons 162 scattered by neutron moderator 150 (including back scattered as well as forward scattered thermal neutrons) will be collected by neutron detector 102, 600, 700, 700'. Furthermore, in any of the described embodiments, the moderator can, in some implementations, define a generally planar geometry (not necessarily a flat plane) having a large area (anywhere from 0.5 m$^2$ to 10 m$^2$) and a thickness that is small compared with any given lateral extent thereof, and the at least one neutron detector 102, 600, 700, 700' surrounds the neutron moderator 150 in close proximity especially over the major planar sides. Thus fissile neutron detection system 100 can be considered as a layered arrangement that provides for advantages over prior fissile neutron detection systems.

Both forward and backward scattered neutrons travel only short distances before impinging on thermal neutron detectors 102, 600, 700, 700' under the constraint that the moderator arrangement at least substantially fills the volume of the moderator region that is defined by the thermal neutron detector arrangement, for minimizing or at least reducing the moderator-to-thermal neutron detector spacing at least along the major receiving directions for which the thermal neutron detector is configured. This detector characteristic—that of short scattering to detection paths—helps insure that forward and backwards scattered thermal neutrons 162 tend not to be absorbed by intervening materials or evade detection on a grazing path and thus be entirely lost to detection. Furthermore, at least one further benefit of the short path is that it takes up less linear space than a long path would require. Applicants appreciate that at least in the cases of forward and backward scattering of detected fissile neutrons, the short path between scattering and detection provides for fissile neutron detection systems that have lower extent (at least in the direction of initial neutron trajectory) as compared to conventional detectors. It is to be noted that the terms forward and backward scattering as employed herein can be considered as any scattering event where the scattered neutron deviates from its initial incoming trajectory by more than approximately 60 degrees. While the benefits of the described approaches are clearly not limited to planar embodiment, Applicants are unaware of any conventional system that uses solid neutron conversion materials that achieves as comparably high efficiency (15% detection of fissile neutrons) within thickness ranges that are so short as compared to lateral extent, without increasing by 25% or more the amount of lithium or boron that is used in the system. In other words, conventional approaches require detector systems of significantly greater thickness or neutron conversion material (such as lithium or boron) as compared to those disclosed herein. In the context of commercial applications wherein size, weight and cost are paramount, this advantage represents a significant improvement.

Summarizing with respect to overall operation of various embodiment described above, a moderator arrangement, composed of a moderator material, can be surrounded by a detector arrangement such that at least 60% scattered neutrons that exit the moderator travel only a short distance before they strike an active area (for example lithium foil) of the detector arrangement.

In some embodiments, the moderator defines a generally planar shape having a thickness that is short compared with any lateral extent thereof. For irregularly shaped lateral extents, the thickness can be short compared to any dimension across the lateral extents that bisects the lateral extents to form two equal areas. It is noted that in the context of this disclosure there is no requirement that these planar geometries be flat, and it should be appreciated that the planar geometries described herein can be curved in a variety of ways just as any piece of sheet metal or paper can be curved and bent in a variety of ways and yet still regarded as being generally planar. At least in the case of generally planar moderator and detector geometries, the overall collection efficiency tends to exceed that which can be obtained in conventional systems such as the TYPE I and TYPE II systems for the same amount of conversion material used in the detector. In addition to higher absolute efficiencies, the relative efficiency, and reduction of weight, cost, and/or thickness tends to exceed that of conventional detector systems such as the TYPE I and TYPE II conventional systems described above. This aspect can be readily appreciated by comparing the described planar embodiment with conventional detectors constrained to occupy and be contained within the same or similar spatial envelope as Applicant's systems. For example a detector system such as that of FIG. 1 occupies a spatial area of 1 m$^2$ and a thickness of 0.15 meters. A conventional TYPE I detector of similar shape could readily lose between 25% and 40% of efficiency as compared to a similar sized unit that is constructed based on this disclosure. Similarly, a TYPE II system of similar area can require a thickness of 0.2 meters or more and need 200% or more lithium or boron material and would thus be at least 25% heavier and more expensive.

With continued focus on generally planar embodiments, Applicants note that certain ones of the above configurations can include an outer moderator (proximate to and not surrounded by the thermal neutron detector arrangement) and an inner moderator that is almost entirely surrounded by the detector arrangement. In this context, Applicants consider a distinguishing feature of some of the embodiments disclosed herein that only incoming fissile neutrons entering from extremely shallow sideways/grazing angles (for example in some embodiments only neutrons entering sideways with less than 20 degrees from plane defined by the planar modulator) can strike the inner moderator without first passing through a thermal neutron detector. (Since thermal neutron detectors are generally not intended to have high efficiency for sideways incident thermal neutrons, these thermal neutrons can be of little consequence at least in many intended applications.) While this feature by itself does not directly result in the dislodged efficiency improvements, it is to be noted that insofar as all or most impinging high energy neutrons cannot enter the inner moderator without passing through the detector, it is conversely the case that all or most scattered low energy neutrons cannot exit and pass away from the moderator without passing through the detectors. This latter consideration clearly results sweeping advantages compared to conventional systems, including but not limited to Type I and Type II systems, and to whatever extent the former consideration results in and/or is related to these benefits, it is considered by Applicants at the very least to be of general interest.

Of the many benefits of the disclosed systems, it is again of particular interest that scattered neutrons can be collected with a relatively small amount of intervening structure One implication of this unusual feature is that, in many embodiments, the designer is free to surround the moderator in very close proximity. For example, for a moderator of a given thickness, in many cases the disclosed embodiments allow for the detector to surround the moderator with gap spacings therebetween that are much smaller than the moderator thickness. This is of benefit at least for the reason that such close moderator detector spacing, over the great majority of the moderator sides, affords very little opportunity of escape for scattered neutrons. In other words the close moderator detector spacing, over almost the entirety of the moderator, prevents most scattered neutrons from escaping the detector system without impinging on some part of the detector. Stated in another way, the moderator arrangement at least substantially fills the moderator region or volume that is defined by the detector arrangement. Applicants are unaware of any conventional systems that can reasonably be regarded as sharing this important feature. Summarizing with respect to the foregoing paragraph, many of the described detector arrangements at least substantially surround their associated inner moderator with moderator-detector spacing that is small as compared to moderator thickness.

Figure 11A:
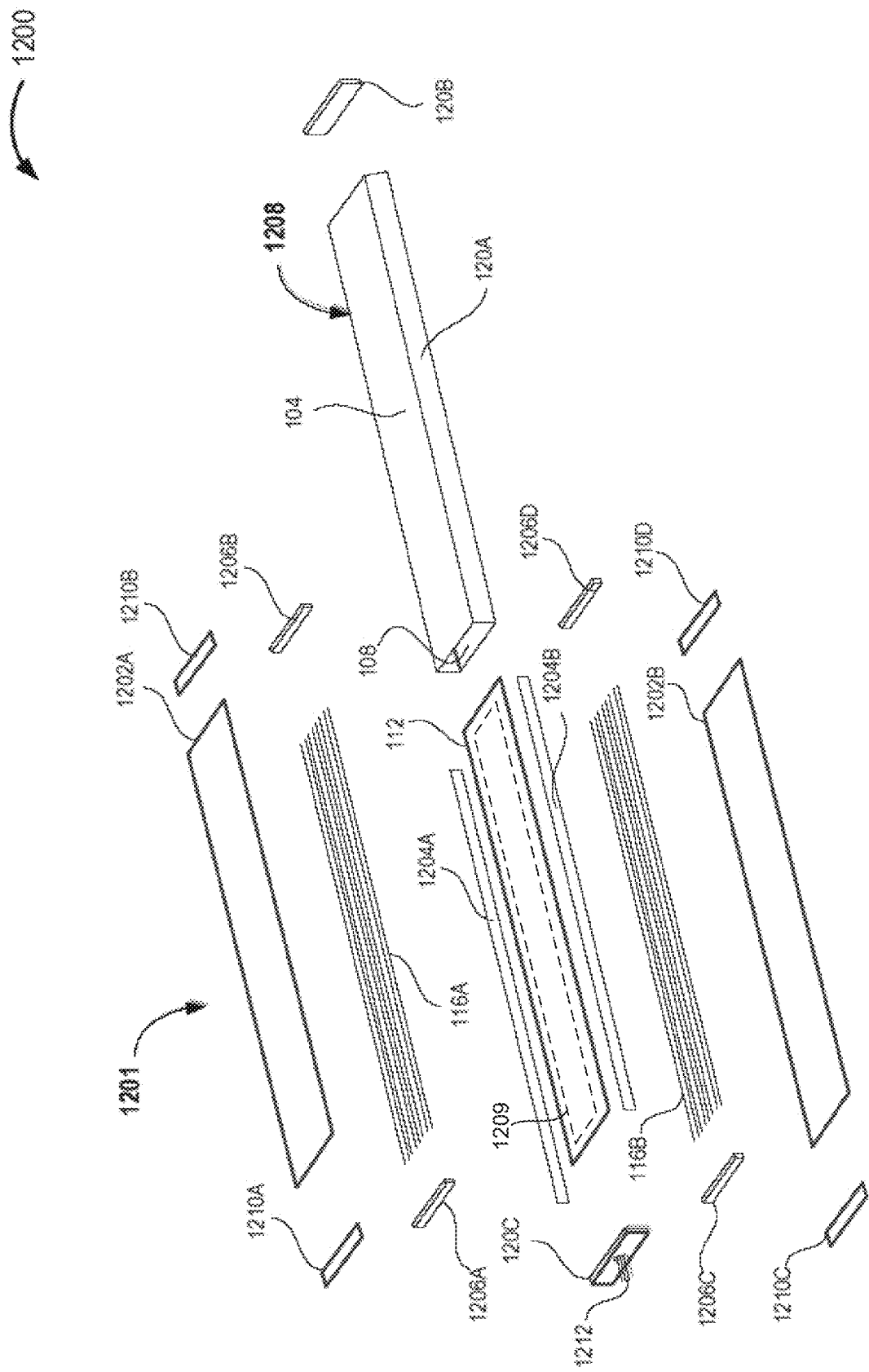
FIG. 11A is a diagrammatic, exploded view, in perspective, of an embodiment of an illustrative thermal neutron detector that can be used in one or more implementations of a fissile neutron detection system, in accordance with at least one embodiment of the present disclosure.

FIG. 11A is a diagrammatic illustration, in an exploded perspective view, of an embodiment of a thermal neutron detector, generally indicated by the reference number 1200, that can be used alone or in combination in fissile neutron detection systems 100, 600, 700, 700' in accordance with at least one embodiment described herein. FIG. 11B is a partially assembled view of thermal neutron detector 1200, in perspective. Thermal neutron detector 1200 uses a modular assembly 1201 in which components such as a first ground plate 1202A, a first set of electrodes 116A, active material 112 (and any support 106—see FIG. 1C) a second set of electrodes 116B, and a second ground plate 1202B can be preassembled prior to disposal in a housing 1208 that includes the top cover 104, the bottom cover 108 and at least a portion of the sidewalls 120.

In some embodiments, first ground plate 1202A, first set of electrodes 116A, active material 112, second set of electrodes 116B, and second ground plate 1202B can be preassembled using a number of internal spacers to provide clearance between electrodes 116, active material 112, and ground plates 1202. The internal spacers can include a number of side spacers 1204A-1204B (collectively, "side spacers 1204") and a number of end spacers 1206A-1206D (collectively, "end spacers 1206") that, when assembled, provide sufficient clearance and electrical isolation of the various components within the modular assembly.

As used herein, terms such as "side" and "end" denote locations relative to each other and do not represent absolute references. Thus, an "end object" can function as a "side object" when the object is rotated through an angle such as 90 degrees. Similarly, a "side object" can function as an "end object" when the object is rotated through an angle such as 90 degrees.

Ground plates 1202 can include one or more electrically conductive materials. Such materials can include one or more suitable metals such as aluminum, copper, or alloys containing various quantities of aluminum or copper. In some embodiments, ground plates 1202 can include a conductive mesh material to permit the passage of readout gas 170 through all or a portion of ground plates 1202. In some implementations, ground plates 1202 can include one or more electrically conductive materials disposed on all or a portion of the exterior surface of ground plate 1202 proximate a housing 1208.

Side spacers 1204 can include any number or combination of devices or components capable of maintaining a desired separation between active material 112 and ground plate 1202. Side spacers 1204 can have any suitable shape, and thus although shown as straight members in FIG. 11A, side spacers 1204 can be curved, arced, angular or any other shape needed to maintain the desired separation or distance between active material 112 and ground plate 1202.

Electrodes 116 are terminated on a number of ganging boards or buses 1210A-1210D (collectively, "buses 1210"). Buses 1210 advantageously provide distribution of electric power and collection of current signals via a limited number of penetrations through the neutron detector 1200. For example, as depicted in FIG. 11A, buses 1210 permit the ganging of electrode power and beneficially route all electrical connections through one or more couplers 1212. In some instances, couplers 1212 can include a modular plug or similar device that simplifies and speeds electrical connection of the respective thermal neutron detector 1200. In embodiments, couplers 1212 can include a number of conductors for powering electrodes 116 within the fissile neutron detection system 1200. In embodiments, the one or more couplers 1212 can include a number of signal conductors for communicating thermal neutron detection signals to one or more external devices, such as a count readout device and/or alarm device.

The use of one or more couplers 1212 can greatly reduce the number of penetrations through the housing 1208. Reducing the number of penetrations through the neutron detector housing reduces the likelihood of egress of the readout gas 170 from the chamber 105 and also reduces the likelihood of ingress of environmental contaminants into the chamber 105.

Housing 1208 can include all or a portion of top cover 104, bottom cover 108, and at least a portion of one or more sidewalls 120. Advantageously, housing 1208 can be cast, extruded or similarly formed using a single component, thereby limiting the number of joints in thermal neutron detector 1200. Minimizing the number of joints within thermal neutron detector 1200 beneficially reduces the likelihood of egress of readout gas 170 from chamber 105 and also reduces the likelihood of ingress of environmental contaminants into chamber 105. In some implementations, end plates 120B and 120C can be attached to the housing 1208 using one or more joints having a sealant 124 disposed therein. In some implementations, the end plates 120B and 120C may be attached to the housing 1208 via welding or brazing. In other embodiments, the end plates 120B and 120C may be attached to the housing 1208 via one or more fasteners, such as one or more screws or similar. It should be appreciated that a projection 1209 (shown as a dashed line) of each of the first and second sets of electrodes onto active sheet material layer 112 defines an area that substantially covers one of the major surfaces of the active sheet material layer. That is, projection 1209 covers more than 50 percent of the major surface area of active sheet material that each electrode set faces.

FIG. 11C is a detail drawing depicting, in a diagrammatic elevational cutaway view, an electrode connection device 1250 for use with thermal neutron detector 1200 depicted in FIGS. 11A and 11B, in accordance with at least one embodiment of the present disclosure. In at least some implementations, electrodes 116 can electrically conductively couple to a bus ganging structure or bus 1210. One or more conductors or pins 1256 can pass through a sealing plate 1258 that is affixed to housing 1208, for example to top cover 104 of housing 1208 and/or end plate 120C (FIG. 11B). One or more seals 1260, for example one or more polyisobutylene seals can be disposed between sealing plate 1258 and cover 104 or end plate 120C to provide hermetically sealed chamber 105. In some instances, a member or standoff 1252 and sealing plate 1258 can separate and, in some instances, electrically isolate bus 1210 from cover 104 or endplate 120C. In the embodiment depicted in FIG. 11C, a conductive bolt 1254 penetrates sealing plate 1258. A second polyisobutylene seal 1262 can be disposed between conductive bolt 1254 and sealing plate 1258.

FIG. 11D is a detail drawing, in a diagrammatic elevational cutaway view, depicting another electrode connection device 1250 for use with the illustrative neutron detector 1200 depicted in FIGS. 11A and 11B, in accordance with at least one embodiment of the present disclosure. In at least some implementations, some or all of electrodes 116 can electrically conductively couple to bus ganging structure or bus 1210. One or more conductors or pins 1256 pass through sealing plate 1258 that is affixed to housing 1208, for example to top cover 104 of housing 1208 or end plate 120C (FIG. 11B). One or more seals 1260, for example one or more polyisobutylene seals 1260 can be disposed between sealing plate 1258 and cover 104 or end plate 120C to provide hermetically sealed chamber 105. In some instances, a member or standoff 1252 and sealing plate 1258 can separate and, in some instances, electrically isolate bus 1210 from cover 104 and/or endplate 120C. In the embodiment depicted in FIG. 11D, a sealing member 1270, such as an epoxy sealing member, penetrates sealing plate 1258 and at least partially surrounds pin 1256.

FIG. 11E is a detail drawing depicting, in a diagrammatic elevational cutaway view, another electrode connection device 1250 for use with thermal neutron detector 1200 depicted in FIGS. 11A and 11B, in accordance with at least one embodiment of the present disclosure. In at least some implementations, some or all of electrodes 116 can electrically conductively couple to bus ganging structure or bus 1210. One or more conductors or pins 1256 pass through an aperture in housing 1208, for example in top cover 104 and/or endplate 120C of housing 1208. One or more weld or O-ring seals can be disposed to seal at least a portion of the aperture in housing 1208. In some instances, a plug 1286 such as a metal or polymeric plug can be disposed proximate the aperture in housing 1208. A glass or epoxy seal 1284 can at least partially surround pins 1256 extending from bus 1210. A member or standoff 1252 and glass or epoxy seal 1284 can separate and, in some instances, electrically isolate bus 1210 and pin 1256 from cover 104. In the embodiment depicted in FIG. 11E, the combination of weld or O-ring seal 1280, metal or polymeric plug 1286, and glass or epoxy seal 1284 at least partially surrounds pin 1256 and provides a hermetic seal for chamber 105.

FIG. 11F is a close up diagrammatic perspective view of electrode connection device 1250 depicted in FIG. 11C, in accordance with at least one embodiment of the present disclosure. FIG. 11G is a close up diagrammatic plan view of electrode connection device 1250 depicted in FIG. 11C, in accordance with at least one embodiment of the present disclosure.

Figure 11H:
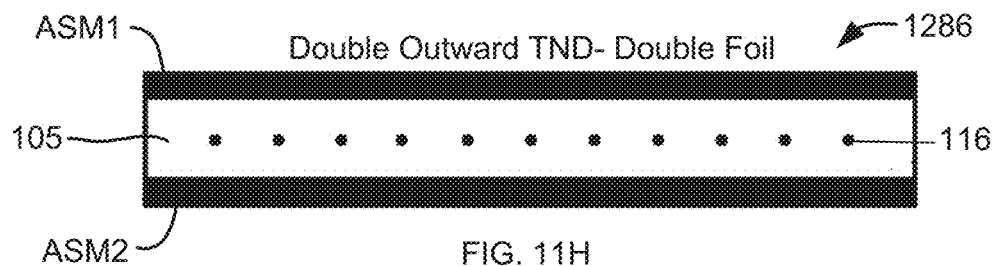
FIG. 11H is a diagrammatic view, in elevation, of an embodiment of a fissile neutron detection system that is referred to as a double outward, double foil configuration.

FIGS. 11H-11K are diagrammatic views, in elevation, showing various thermal neutron detector (TND) embodiments that Applicants employed for purposes of simulations to determine the efficiency of each TND embodiment. FIG. 11H illustrates what is referred to as a Double Outward TND—Double Foil embodiment, generally indicated by the reference number 1286, and including a detection chamber 105 defined between first and second active sheet material layers ASM1 and ASM2, respectively, such as $^6$Li with one set of electrodes 116 in chamber 105. In the present figures, it is to be understood that chambers 105 sealingly contain readout gas in a manner that is consistent with the descriptions above.

Figure 11I:
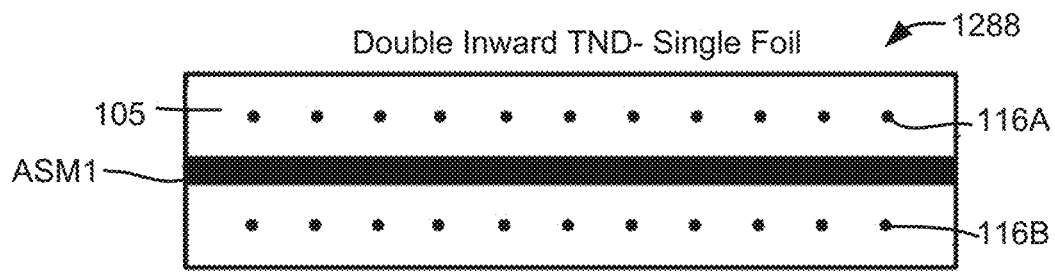
FIG. 11I is a diagrammatic view, in elevation, of an embodiment of a fissile neutron detection system that is referred to as a double inward, single foil configuration.

FIG. 11I illustrates what is referred to as a Double Inward TND—Single Foil embodiment, generally indicated by the reference number 1288, and including detection chamber 105 with a single active sheet material layer ASM1 centered in the detection chamber between first and second sets of electrodes 116A and 116B.

Figure 11J:
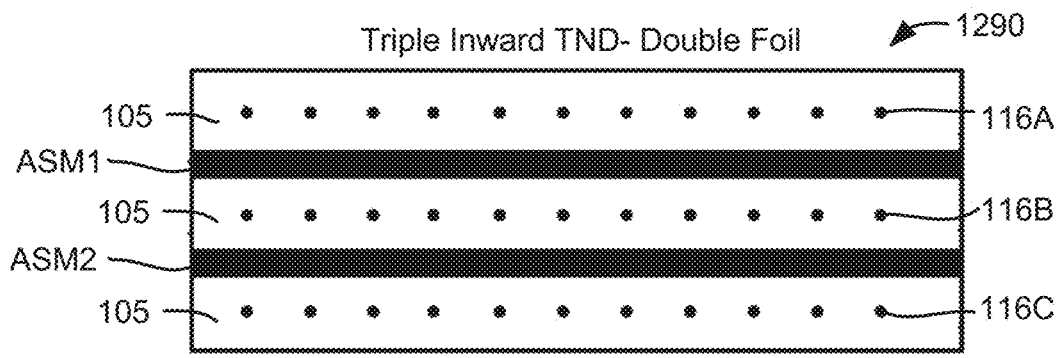
FIG. 11J is a diagrammatic view, in elevation, of an embodiment of a fissile neutron detection system that is referred to as a triple inward, double foil configuration.

FIG. 11J illustrates what is referred to as a Triple Inward TND—Double Foil embodiment, generally indicated by the reference number 1290, and including detection chamber 105 with active sheet material layers ASM1 and ASM2 supported in the detection chamber between first, second and third sets of electrodes 116A-116C.

Figure 11K:
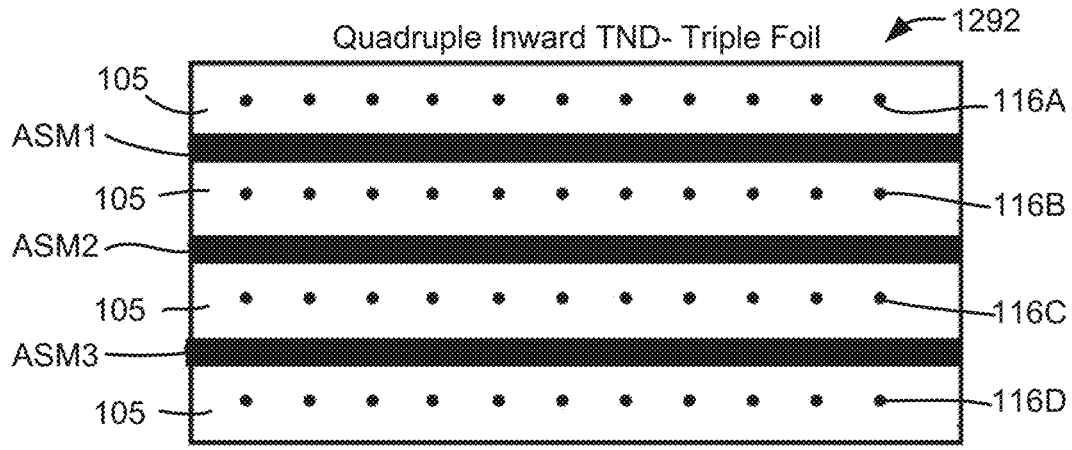
FIG. 11K is a diagrammatic view, in elevation, of an embodiment of a fissile neutron detection system that is referred to as a quadruple inward, triple configuration.

FIG. 11K illustrates what is referred to as a Quadruple Inward TND—Triple Foil embodiment, generally indicated by the reference number 1292, and including detection chamber 105 with active sheet material layers ASM1-ASM3 supported in the detection chamber between four sets of electrodes 116A-116D, as shown.

FIG. 11L is a plot of thermal neutron detection efficiency per lithium foil 1296 versus Lithium foil thickness 1298 in microns wherein the legend in the figure illustrates the simulation efficiency for a corresponding embodiment 1286, 1288, 1290 and 1292 of FIGS. 11H-11K, respectively. In this regard, the horizontal plot of lithium foil thickness shows the thickness of one layer. In this regard, the horizontal plot of lithium foil thickness shows the thickness of one layer. It is clear from these plots that the double inward configuration of embodiment 1288 of FIG. 11I presents the greatest efficiency per foil layer. Given that the double inward embodiment requires only a single layer of foil, Applicants recognize that adding foil layers produces diminishing returns at increased cost.

A person of ordinary skill in the art, having this disclosure in hand, should readily appreciate that one way to increase thermal neutron detector efficiency is to simply add detection (i.e., active) layers, for example by stacking thermal neutron detectors on top of one another along a given receiving direction. However, Applicants appreciate that such stacking is not necessarily appropriate especially in cases where the designer seeks to optimize performance with respect to one or more of cost, size and weight of an overall detector system. In other words, Applicants respectfully submit that diminishing benefits are likely just through the practice of blindly stacking thermal neutron detectors. It should be appreciated by a person of ordinary skill in the art, having this disclosure in hand, that an aspect of these descriptions is to teach techniques for enhancing efficiency of devices that utilize as few layers as possible given a particular set of performance goals. Indeed, one aspect of this disclosure is to teach techniques for maximizing the efficiency per unit cost of a given detector by utilizing only two layers of lithium foil, each one in a TND, on opposite sides of one moderator layer.

Figure 12A:
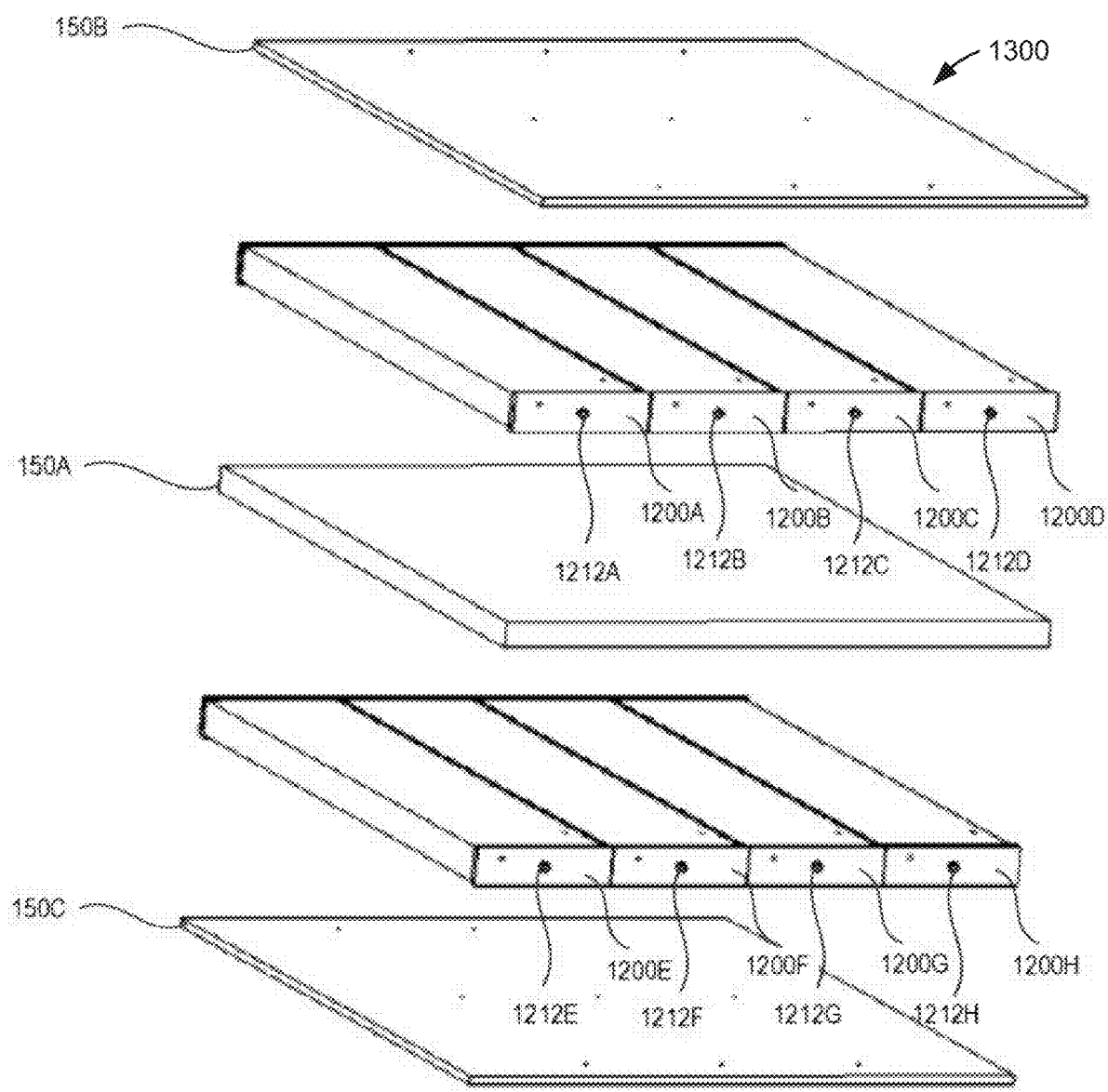
FIG. 12A is a diagrammatic, exploded view, in perspective, of an embodiment of a fissile neutron detection system that uses three neutron moderators and eight thermal neutron detectors, in accordance with at least one embodiment of the present disclosure.
Figure 12B:
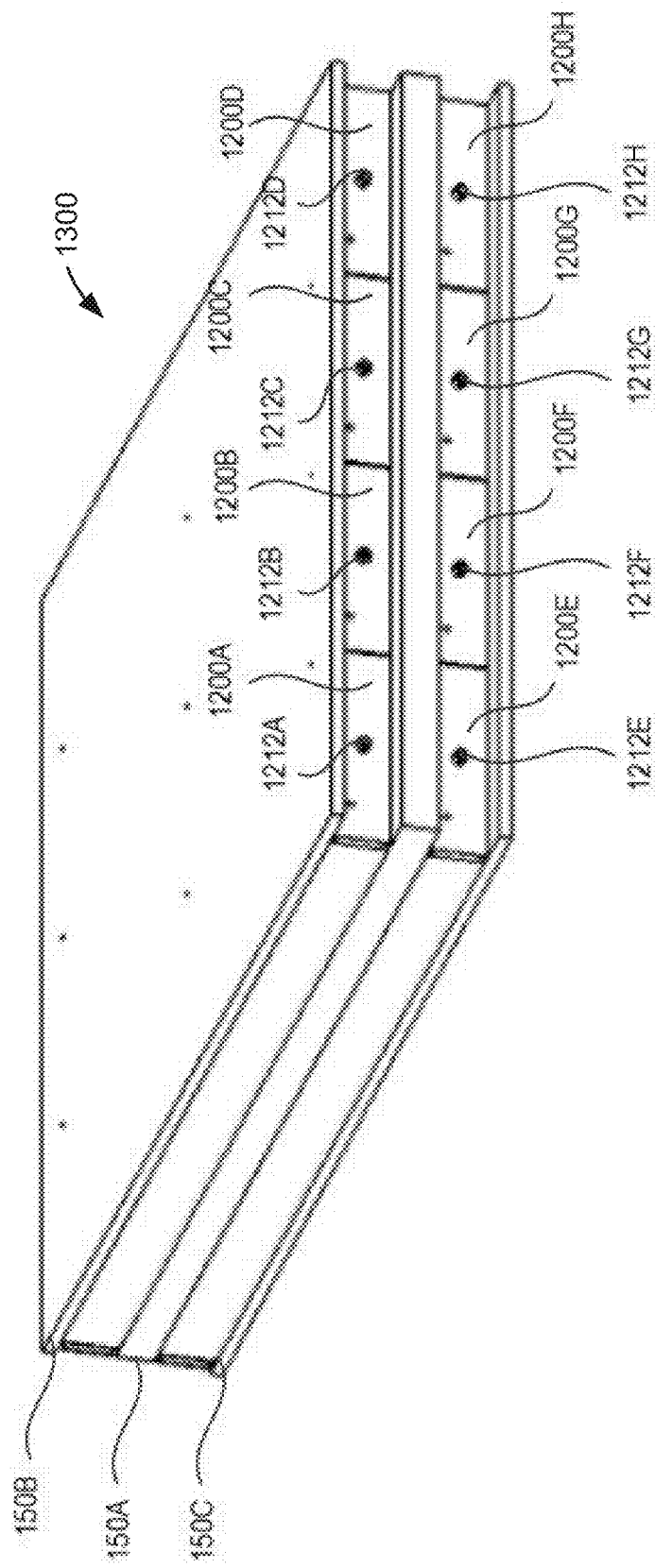
FIG. 12B is a diagrammatic, assembled view, in perspective, of the illustrative fissile neutron detection system depicted in FIG. 12A, in accordance with at least one embodiment of the present disclosure.

FIG. 12A is a diagrammatic exploded view, in perspective of an embodiment of a fissile neutron detection system, generally indicated by the reference number 1300, that uses three neutron moderators 150A-150C and eight thermal neutron detectors 1200 such as depicted, for example, in FIGS. 11A and 11B, in accordance with at least one embodiment of the present disclosure. FIG. 12B is a diagrammatic, assembled view, in perspective, of fissile neutron detection system 1300 of FIG. 12A. The modular construction of the thermal neutron detector 1200 beneficially permits positioning of any number of thermal neutron detectors 1200 in a variety of configurations. Such can, for example, facilitate the use of a single thermal neutron detector 1200 within a relatively compact, portable, handheld device and the combination of a number of thermal neutron detectors 1200 into a stationary roadside monitoring array. As depicted in FIGS. 12A and 12B, neutron moderator 150A is disposed between eight thermal neutron detectors 1200A-1200H arranged in two rows of four detectors. The majority of the surface area of neutron moderator 150A is therefore disposed proximate one or more thermal neutron detectors 1200. External neutron moderators 150B and 150C can be disposed proximate the surfaces of the thermal neutron detectors 1200A-1200H that are opposite neutron moderator 150A. It is noted that the external moderators are not a requirement. As depicted in FIGS. 12A and 12B thermal neutron detection systems 1200 can be arranged such that one or more couplers 1212A-1212H for each of thermal neutron detectors 1200A-1200H, respectively, exits the assembly from a single end. Such an arrangement can facilitate the connection of each of thermal neutron detector 1200 to a communications bus, a power distribution bus, or any combination thereof.

In embodiments, chamber 105 of thermal neutron detector 1200 can have a length, measured along a first axis, of approximately 100 centimeters (cm). In embodiments, chamber 105 can have a thickness, measured along a second axis orthogonal to the first axis, of approximately 3.5 centimeters (cm). In embodiments, chamber 105 can have a width, measured along a third axis orthogonal to the first axis and the second axis, of approximately 20 centimeters (cm).

Although not depicted in FIGS. 12A and 12B, fissile neutron detection system 1300 can be disposed partially or completely within an external housing. Such can facilitate the installation of system in an outdoor environment such as a checkpoint, port-of-entry, or similar locations where screening for fissile nuclear material can be beneficial.

Attention is now directed to FIGS. 13A-13C, each of which diagrammatically illustrates the lateral extents of a moderator arrangement as part of a fissile neutron detection system in a plan view. It is noted that the moderator arrangement in each of these figures can be made up of one or more individual parts or pieces of moderating material such as, for example, HDPE. In a manner that is consistent with the descriptions above, interstitial gaps can be present within the moderator arrangement without significant adverse effect on its moderating properties, although such gaps are not required. Any suitable shape can be used with the shapes used in the present figures serving as examples that are not intended as limiting. FIG. 13A illustrates an embodiment of lateral extents generally indicated by the reference number 1320. The lateral extents of any moderator arrangement disclosed herein can form opposing major sides that can be planar although curved and other suitable shapes can be used. Lateral extents 1320 form a rectangular peripheral outline or edge configuration in the present figure and can be bisected or divided into two areas of equal size, for example, by an arbitrary dimension 1322 to form equal areas A1 and A2. An unlimited number of such bisecting dimensions can be defined. In moderator embodiments described within the scope of the present application, any given dimension that bisects the lateral extents is greater than any thickness of the moderator arrangement normal to the plane of the figure. Lateral extents 1320, of the present example, further define a widthwise major dimension 1324 and a lengthwise major dimension 1326. In this instance, the lengthwise and widthwise major dimensions are each greater than any thickness of the moderator arrangement, FIG. 13B illustrates another embodiment of lateral extents, generally indicated by the reference number 1330, forming an elliptical peripheral outline that is shown as bisected by an arbitrary given dimension 1332 by way of example. Further, a major widthwise dimension 1334 as well as a major lengthwise dimension 1336 are shown, each of which is greater than any thickness of the moderator arrangement in a direction normal to the plane of the figure.

While is recognized that multiple embodiments described herein employ a rectangular peripheral outline or edge configuration, the disclosure is not to be construed as being limited in this regard. On one hand, Applicants appreciate that rectangular outlines can often facilitate ease of manufacturing based on a variety of practical considerations. For example, detectors with rectangular peripheral outlines can often be readily assembled using combinations of rectilinear components and/or subsystems. Structural members composed of metal or other materials are often widely and inexpensively available as bar stock, which, in many cases, can lend to the ease of construction of rectangular geometries. Oftentimes rectangular plates can be produced with relative ease and minimal waste as compared with more complex shapes. Applicants further appreciate that rectangular shapes can facilitate design and construction of robust and easily assembled thermal neutron detectors for a variety of practical reasons that should be apparent to a person of ordinary skill in the art having this disclosure in hand. For example, techniques and/or assemblies intended to facilitate high precision positioning of complex structures including but not limited to electrode wires and lithium foil, can in some cases be more straightforward to implement as compared to systems with complex non-rectangular peripheral outlines. Applicants recognize, however, that in some applications, end-use specifications may include requirements for more complex shapes. For example, a fissile neutron detector system could be specified in such a way that it is required to cover a large fraction of surface area of some external encasement that itself defines an irregular non-rectangular shape. In such instances, the teachings and descriptions herein can be readily applied by one having overall skill in the art in such a way as to capture the sweeping benefits brought to bear thereby.

FIG. 13C illustrates still another embodiment of lateral extents, generally indicated by the reference number 1340, having an irregular peripheral outline or edge configuration. In particular, a major rectangular portion 1342 can be the same dimensionally as the rectangular shape of lateral extents 1320 in FIG. 13A, however, a thin rectangular shape 1344 has been appended to rectangular portion 1342 to form the overall irregular lateral extents. It is noted that thin rectangle 1344 can have a width 1346 that is less than any thickness of the moderator arrangement. Nevertheless, any given dimension that bisects lateral extents 1340 such as, for example, dimension 1322' includes a length that is greater than any thickness of the moderator arrangement. In this case, area A2' includes a contribution from thin rectangular region such that A2' is greater than A2 of FIG. 13C causing dimension 1322' to shift by an amount that causes A1' to increase in area by an amount that is equal to the area of thin rectangle 1344 such that A1' is equal to A2'. Thus, irregular shapes such as shown in FIG. 13C are submitted to be within the scope of the present disclosure. With this disclosure in hand, one of ordinary skill in the art will appreciate that virtually an unlimited number of irregular shapes fall within the purview of FIG. 13C and the teachings that have been brought to light herein.

Figure 14:
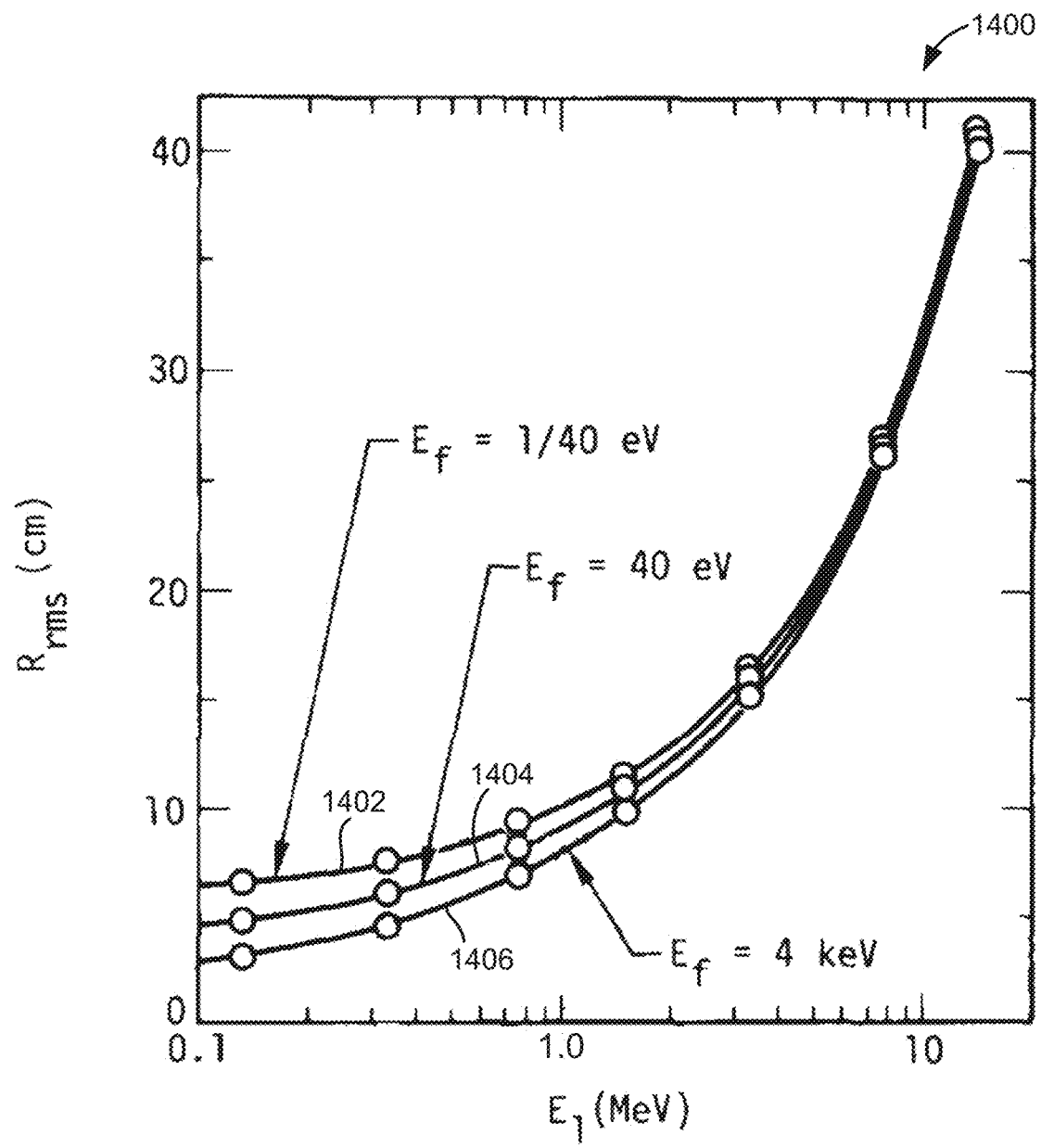
FIG. 14 is graphic that illustrates neutron slowing in a moderating material versus initial neutron energy.

Reference is now made to the graph of FIG. 14, generally indicated by the reference number 1400 and which is taken from the prior art, which illustrates distance traveled by a neutron ($R_{rms}$ in cm) in a hydrogenous (i.e., moderating) material versus incident energy of the neutron ($E_1$ in MeV). Four plots 1402, 1404 and 1406 correspond to resultant energies $E_f$ of 1/40 eV, 40 eV and 4 keV, respectively. Plot 1402 clearly represents a thermal neutron with a resultant energy of 0.025 eV. Applicants recognize in view of FIG. 14 that fissile neutrons around 1 MeV will thermalized after traveling somewhat less than 10 cm in the moderating material, and thus an effective thickness for a layer of moderating material is less than 10 cm. In this regard, a moderating layer that is too thin will fail to moderate incident fissile neutrons to detectable thermal neutrons.

Figure 15:
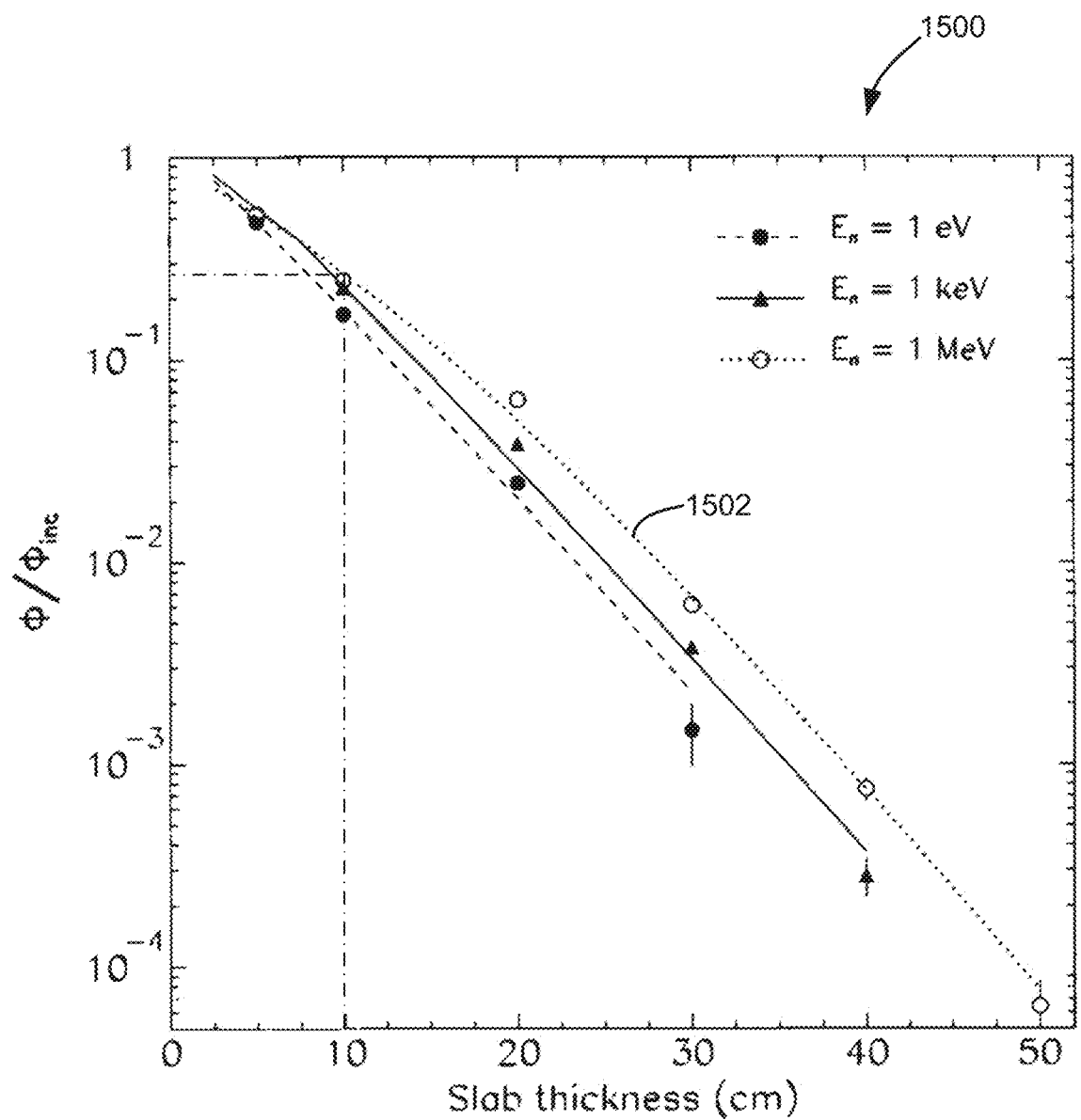
FIG. 15 is another graphic that illustrates neutron transport versus slab thickness of a moderating material.

Attention is now directed to the graph of FIG. 15, generally indicated by the reference number 1500, taken from the prior art, illustrating normalized neutron flux $\phi/\phi_{inc}$ on the vertical axis against the thickness of a moderating slab that is formed from a hydrogen rich material. This particular study used ordinary concrete, which is approximately 10 percent atoms per $cm^3$ of hydrogen, but the result will be similar with other hydrogen rich materials such as water or HDPE, which are approximately 75 percent atoms per $cm^3$ of hydrogen. Applicants recognize that, at least to a reasonable approximation, neutron loss increases rapidly as slab thickness increases. In this regard, at a thickness of 10 cm more than 70% of incident 1 MeV fissile neutrons are lost based on plot 1502. For a more hydrogen rich material such as water or HDPE, at a thickness of 10 cm more than 90% of incident 1 MeV fissile neutrons are lost. Applicants recognize that this level of neutron loss is problematic such that a moderator of 10 cm is too thick.

In light of the two results shown in FIG. 14 and FIG. 15, a moderating layer 150 that is too thin will fail to moderate incident fissile neutrons to detectable thermal neutrons while a moderating layer that is too thick will result in the loss of an excessive number of incident neutrons in the moderating material such that these lost neutrons are likewise undetectable.

In order to maintain, neutron loss in a range that is acceptable such as, for example, 20 percent to 40 percent, moderator thickness can be in the range of at least approximately 1 cm to 5 cm. With this disclosure in hand and the familiarity of one of ordinary skill in the art with simulation techniques that are applicable to fissile neutron detection such as, for example, Monte Carlo simulations, it is submitted that one of ordinary skill in the art can identify an optimal moderator thickness within the subject thickness range. The following examples pertain to embodiments that employ some or all of the described fissile neutron detection apparatuses, systems, and methods described herein. The enclosed examples should not be considered exhaustive, nor should the enclosed examples be construed to exclude other combinations of the systems, methods, and apparatuses disclosed herein and which are not specifically enumerated herein.

a. According to Example 1 there is provided a fissile neutron detection system. The fissile neutron detection system can include at least one neutron detector. Each neutron detector can further include a body having a length, a width, and an extent defining a closed chamber, the length and the width of the chamber greater than the thickness of the chamber. Each neutron detector can further include at least one active material that emits at least one ionizing particle upon exposure to thermal neutrons, the active material disposed within the chamber; and at least one electrode. The fissile neutron detection system also includes at least one neutron moderator disposed proximate the at least one thermal neutron detector, the at least one neutron moderator including a material that transitions at least a portion of high-energy incident fissile neutrons to low-energy thermal neutrons, wherein at least 60% of the low-energy thermal neutrons exiting the moderator enter the thermal neutron detector(s).

Example 2 can include elements of example 1 where the chamber formed by the body of each thermal neutron detector can include a single, continuous, chamber.

Example 3 can include elements of example 2 where the chamber formed by the body of each thermal neutron detector can include a hermetically sealed chamber.

Example 4 can include elements of example 1 where the at least one thermal neutron detector can include a plurality of thermal neutron detectors.

Example 5 can include elements of example 1 where the at least one neutron moderator can include a plurality of neutron moderators.

Example 6 can include elements of example 1 where the at least one neutron moderator can include a material that includes a minimum of 40 weight percent hydrogen.

Example 7 can include elements of example 6 where the at least one neutron moderator can include high-density polyethylene (HDPE) member.

Example 8 can include elements of example 7 where the at least one neutron moderator can include a HDPE member having a uniform thickness of from approximately 1 centimeter (cm) to approximately 5 cm.

Example 9 can include elements of example 1 where the at least one neutron moderator comprises a number of members, each of the members having a uniform thickness.

Example 10 can include elements of example 1 and can additionally include a voltage source conductively coupled to the at least one electrode in the at least one thermal neutron detector.

Example 11 can include elements of example 1 and can additionally include a number of support members disposed at intervals along at least a portion of a length of the at least one electrode.

Example 12 can include elements of example 1 where the at least one thermal neutron detector can include an exterior surface having a top cover and a bottom cover separated by a sidewall having an extent or height.

Example 13 can include elements of example 12 where the sidewall comprises a multi-piece sidewall.

Example 14 can include elements of example 12 where the at least one thermal neutron detector can include a first thermal neutron detector and a second thermal neutron detector; where the at least one neutron moderator can be disposed proximate at least a portion of the exterior surface of the first thermal neutron detector and at least a portion of the exterior surface of the second thermal neutron detector; and where at least a portion of the at least one neutron moderator can be disposed in a space bordered by the portion of the exterior surface of the first thermal neutron detector and the portion of the exterior surface of the second thermal neutron detector.

Example 15 can include elements of example 14 where the first thermal neutron detector can include a planar body having a planar top cover and a planar bottom cover; where the second thermal neutron detector can include a planar body having a planar top cover and a planar bottom cover; and where the neutron moderator can include a planar member disposed proximate the top cover of the first thermal neutron detector and the top cover of the second thermal neutron detector.

Example 16 can include elements of example 15 where the planar top cover of the first thermal neutron detector can have a length of approximately 100 centimeters (cm) and a width of from approximately 20 cm; where the planar bottom cover of the first thermal neutron detector can have length of from approximately 100 and a width of approximately 20 cm; where the sidewall of the first thermal neutron detector can have a thickness of from approximately 0.5 cm to approximately 5 cm; where the planar top cover of the second thermal neutron detector can have a length of approximately 100 centimeters (cm) and a width of approximately 20 cm; where the planar bottom cover of the second thermal neutron detector can have length of from approximately 100 cm and a width of from approximately 20 cm; and where the sidewall of the second thermal neutron detector can have a thickness of approximately 3.5 cm.

Example 17 can include elements of example 14 where the first thermal neutron detector can include an arcuate body having an arcuate top cover and an arcuate bottom cover; where the second thermal neutron detector can include an arcuate body having an arcuate top cover and an arcuate bottom cover; and where the neutron moderator can include a constant thickness planar member disposed proximate the top cover of the first thermal neutron detector and the top cover of the second thermal neutron detector.

Example 18 can include elements of example 14 where the first thermal neutron detector can include an angular body having an angular top cover and an angular bottom cover; where the second thermal neutron detector can include an angular body having an angular top cover and an angular bottom cover; and where the neutron moderator can include a constant thickness planar member disposed proximate the top cover of the first thermal neutron detector and the top cover of the second thermal neutron detector.

Example 19 can include elements of example 1 where the at least one neutron moderator can include at least one member having an exterior surface; and where the at least one thermal neutron detector can be disposed proximate at least a portion of the exterior surface of the member of the at least one neutron moderator.

Example 20 can include elements of example 1 where the at least one thermal neutron detector body can include a body having an exterior surface; and where the at least one neutron moderator can include at least one external neutron moderator disposed proximate at least a portion of the exterior surface of the body of the at least one thermal neutron detector.

Example 21 can include elements of example 3 where the at least one thermal neutron detector can include an ionizable readout gas disposed within the hermetically sealed chamber.

Example 22 can include elements of example 21 where the ionizable readout gas can include at least one noble gas.

Example 23 can include elements of example 22 where the at least one noble gas can include argon (Ar).

Example 24 can include elements of any of examples 1 through 23 where the at least one active material can include at least one sheet of solid active material.

Example 25 can include elements of example 24 where the at least one sheet of active material can include at least one lithium 6 ($^6$Li) sheet.

Example 26 can include elements of example 25 where each $^6$Li sheet can include a $^6$Li sheet having a thickness of from approximately 50 micrometers (µm) to approximately 120 µm.

Example 27 can include elements of example 26 where each $^6$Li sheet can include a $^6$Li sheet having a length and a width that exceed the thickness of the $^6$Li sheet.

Example 28 can include elements of example 27 and can additionally include a support structure disposed proximate each $^6$Li sheet, the support structure disposed at an intermediate location within the chamber.

Example 29 can include elements of example 27 where the at least one $^6$Li sheet can be disposed proximate at least a portion of at least one surface forming an interior of the chamber.

Example 30 can include elements of any of examples 1 through 23 where the at least one active material can include at least one layer of active material.

Example 31 can include elements of example 30 where the at least one layer of active material can include at least one layer containing boron 10 ($^{10}$B).

Example 32 can include elements of example 31 where the at least one layer containing $^{10}$B can include at least one layer of $^{10}$B disposed on at least a portion of at least one interior surface of the chamber in the respective neutron detector.

Example 33 can include elements of any of examples 1 through 20 where the at least one active material comprises an active gas disposed within the chamber.

Example 34 can include elements of example 33 where the active gas disposed within the chamber can include at least one gas containing helium 3 ($^3$He).

According to example 35, there is provided a fissile neutron detection method. The fissile neutron detection method can include transitioning at least some incident fissile neutrons to thermal neutrons by passing the incident fissile neutrons through at least one neutron moderator disposed proximate at least one thermal neutron detector. The at least one thermal neutron detector can include: a body having a length, a width, and a thickness defining a closed chamber; the length and the width of the chamber greater than the thickness of the chamber; at least one active material that emits at least one ionizing particle upon exposure to thermal neutrons, the active material disposed within the chamber; and at least one electrode. The method can also include impinging at least 60% of the thermal neutrons exiting the neutron moderator on the at least one active material disposed in the chamber of the at least one thermal neutron detector. The method can further include generating, by the at least one thermal neutron detector, a current at the at least one electrode, the current proportional to the number of thermal neutrons impinging on the at least one active material in the at least one thermal neutron detector.

Example 36 can include elements of example 35 where transitioning at least some incident fissile neutrons to thermal neutrons by passing the incident fissile neutrons through at least one neutron moderator disposed proximate at least one thermal neutron detector can include transitioning at least some incident fissile neutrons to thermal neutrons by passing the incident fissile neutrons through at least one neutron moderator proximate a plurality of thermal neutron detectors disposed proximate at least a portion on an exterior side of the at least one neutron moderator.

Example 37 can include elements of example 35 where transitioning at least some incident fissile neutrons to thermal neutrons by passing the incident fissile neutrons through at least one neutron moderator disposed proximate at least one thermal neutron detector can include transitioning at least some incident fissile neutrons to thermal neutrons by passing the incident fissile neutrons through at least one of a plurality of thermal neutron moderators disposed proximate at least a portion on an exterior surface of the at least one thermal neutron detector.

Example 38 can include elements of example 35 where impinging at least 60% of the thermal neutrons exiting the neutron moderator on the at least one active material disposed in the chamber of the at least one thermal neutron detector can include impinging at least 60% of the thermal neutrons exiting the at least one neutron moderator on at least one active material disposed in a hermetically sealed chamber of the at least one thermal neutron detector.

Example 39 can include elements of example 35 and can additionally include generating, at least one signal proportional to at least one of: the ionization created by the interaction of the neutron and active material in the at least one thermal neutron detector, or the number of thermal neutrons impinging on the at least one active material in the at least one thermal neutron detector or the rate of thermal neutron impingements on the at least one active material in the at least one thermal neutron detector.

Example 40 can include elements of example 35 where transitioning at least some incident fissile neutrons to thermal neutrons by passing the incident fissile neutrons through at least one neutron moderator disposed proximate at least one thermal neutron detector can include transitioning at least some incident fissile neutrons to thermal neutrons by passing the incident fissile neutrons through at least one neutron moderator that includes a minimum of 40 weight percent hydrogen.

Example 41 can include elements of example 40 where transitioning at least some incident fissile neutrons to thermal neutrons by passing the incident fissile neutrons through at least one neutron moderator that includes a minimum of 10 percent atoms per $cm^3$ of hydrogen can include transitioning at least some incident fissile neutrons to thermal neutrons by passing the incident fissile neutrons through at least one neutron moderator that includes a material containing a high density polyethylene (HDPE).

Example 42 can include elements of example 41 where transitioning at least some incident fissile neutrons to thermal neutrons by passing the incident fissile neutrons through at least one neutron moderator that includes a material containing a high density polyethylene (HDPE) can include transitioning at least some incident fissile neutrons to thermal neutrons by passing the incident fissile neutrons through at least one neutron moderator that includes HDPE having a thickness of from approximately 1 centimeter (cm) to approximately 5 cm.

Example 43 can include elements of example 35 and can additionally include at least partially encapsulating at least a portion of the at least one thermal neutron detector and at least a portion of the at least one neutron moderator in an external neutron moderator.

Example 44 can include elements of example 43 where at least partially encapsulating at least a portion of the at least one thermal neutron detector and at least a portion of the at least one neutron moderator in an external neutron moderator can include at least partially encapsulating at least a portion of the at least one thermal neutron detector and at least a portion of the at least one neutron moderator in a material that includes a minimum of 10 percent atoms per $cm^3$ of hydrogen.

Example 45 can include elements of example 44 where at least partially encapsulating at least a portion of the at least one thermal neutron detector and at least a portion of the at least one neutron moderator in a material that includes a minimum of 10 percent atoms per $cm^3$ of hydrogen can include at least partially encapsulating at least a portion of the at least one thermal neutron detector and at least a portion of the at least one neutron moderator in a material that includes high-density polyethylene (HDPE).

Example 46 can include elements of any of examples 35 through 45, where generating, by the at least one thermal neutron detector, a current at the at least one electrode, the current correlated to the number of thermal neutrons impinging on the at least one active material in the at least one thermal neutron detector can include, for each thermal neutron impinging on the at least one active material in the at least one thermal neutron detector, generating at least one ionizing particle by at least one sheet of active material; ionizing, by the at least one ionizing particle, a readout gas disposed within the chamber of the at least one thermal neutron detector; maintaining the at least one electrode disposed in the chamber of the at least one thermal neutron detector at a voltage that differs from a voltage of the at least one sheet of active material; causing, by the ionized readout gas, a flow of charged particles away from the at least one electrode; and causing a current at the electrode by the flow of charged particles, the current correlated to the number of thermal neutrons impinging on the at least one sheet of active material disposed in the chamber of the at least one thermal neutron detector.

Example 47 can include elements of example 46 where ionizing a readout gas disposed within the chamber of the at least one thermal neutron detector can include ionizing, by the at least one ionizing particle, a readout gas disposed within the chamber of the at least one thermal neutron detector.

Example 48 can include elements of example 46 where maintaining the at least one electrode disposed in the chamber of the at least one neutron detector at a voltage that differs from a voltage of the at least one sheet of active material can include biasing the at least one electrode to a potential of at least +1100 volts (V) measured with respect to the potential of the at least one sheet of active material.

Example 49 can include elements of example 46 where generating at least one ionizing particle by at least one sheet of active material can include generating the at least one ionizing particle by at least one solid sheet of active material disposed within the chamber of the at least one thermal neutron detector.

Example 50 can include elements of example 49 where generating the at least one ionizing particle by at least one solid sheet of active material disposed within the chamber of the at least one neutron detector can include generating at least one ionizing particle by at least one solid sheet of active material comprising at least one lithium 6 ($^6$Li) sheet disposed within the chamber of the at least one neutron detector.

Example 51 can include elements of example 50 where generating at least one ionizing particle by at least one solid sheet of active material comprising at least one lithium 6 ($^6$Li) sheet disposed within the chamber of the at least one thermal neutron detector can include generating at least one ionizing particle by at least one solid sheet of active material comprising at least one $^6$Li sheet having a thickness of from approximately 50 micrometers to approximately 120 micrometers disposed within the chamber of the at least one thermal neutron detector.

Example 52 can include elements of example 51 where generating at least one ionizing particle by at least one solid sheet of active material comprising at least one 6Li sheet having a thickness of from approximately 50 micrometers to approximately 120 micrometers disposed within the chamber of the at least one thermal neutron detector can include generating at least one ionizing particle by at least one solid sheet of active material comprising at least one $^6$Li sheet disposed within the chamber of the at least one thermal neutron detector, the at least one sheet of $^6$Li comprising at least one of: a single $^6$Li sheet proximate a support structure and positioned at an intermediate point within the chamber of the at least one thermal neutron detector; at least one $^6$Li sheet disposed proximate at least a portion of at least one wall forming at least a portion of the chamber of the at least one thermal neutron detector; or a number of spaced $^6$Li sheets proximate a support structure and positioned at an intermediate point within the chamber of the at least one thermal neutron detector.

Example 53 can include elements of any of examples 35 through 45 where generating, by the at least one thermal neutron detector, a current at the at least one electrode, the current correlated to the number of thermal neutrons impinging on the at least one active material in the at least one thermal neutron detector can include, for each thermal neutron impinging on the at least one active material in the at least one thermal neutron detector, generating at least one ionizing particle by at least one layer of active material disposed within the chamber of the at least one thermal neutron detector; ionizing, by the at least one ionizing particle, a readout gas disposed within the chamber of the at least one thermal neutron detector; maintaining the at least one electrode disposed in the chamber of the at least one thermal neutron detector at a voltage that differs from a voltage of the at least one layer of active material; causing, by the ionized readout gas, a flow of charged particles away from the at least one electrode; and causing a current at the electrode by the flow of charged particles, the current correlated to the number of thermal neutrons impinging on the at least one layer of active material disposed in the chamber of the at least one thermal neutron detector.

Example 54 can include elements of example 53 where generating at least one ionizing particle by at least one layer of active material disposed within the chamber of the at least one thermal neutron detector can include generating at least one ionizing particle by at least one layer of active material comprising at least one layer containing $^{10}$B disposed within the chamber of the at least one thermal neutron detector.

Example 55 can include elements of example 54 where generating at least one ionizing particle by at least one layer of active material comprising at least one layer containing $^{10}$B disposed within the chamber of the at least one thermal neutron detector can include generating at least one ionizing particle by at least one layer of active material comprising at least one layer containing $^{10}$B disposed proximate at least a portion of at least one wall forming at least a portion of the chamber of the at least one thermal neutron detector.

Example 56 can include elements of example 53 where ionizing a readout gas disposed within the chamber of the at least one thermal neutron detector can include ionizing, by the at least one ionizing particle, a noble readout gas disposed within the chamber of the at least one thermal neutron detector.

Example 57 can include elements of examples 35 through 45 where generating, by the at least one neutron detector, a current at the at least one electrode, the current correlated to the number of thermal neutrons impinging on the at least one active material in the at least one thermal neutron detector can include, for each thermal neutron impinging on the at least one active material in the at least one thermal neutron detector, generating at least one ionizing particle by at least one active gas disposed within the chamber of the at least one thermal neutron detector; maintaining the at least one electrode disposed in the chamber of the at least one thermal neutron detector at a potential greater than the at least one active gas; causing, by the ionized readout gas, a flow of charged particles away from the at least one electrode; and causing a current at the electrode by the flow of charged particles, the current correlated to the number of thermal neutrons impinging on the at least one layer of active material disposed in the chamber of the at least one thermal neutron detector.

Example 58 can include elements of example 57 where generating at least one ionizing particle by at least one active gas disposed within the chamber of the at least one thermal neutron detector can include generating the at least one ionizing particle by at least one active gas that includes helium 3 ($^3$He), the at least one active gas disposed within the chamber of the at least one thermal neutron detector.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A fissile neutron detection system for detecting incident fissile neutrons, said fissile neutron detection system, comprising:
    an ionizing thermal neutron detector arrangement including an inner peripheral shape that at least substantially surrounds a moderator region for detecting thermal neutrons that exit the moderator region but is at least generally transparent to the incident fissile neutrons, the thermal neutron detector arrangement further including at least one group of thermal neutron detectors with the thermal neutron detectors of each group in a side-by-side relationship and spaced apart in the side-by-side relationship to form a gap between adjacent ones of the thermal neutron detectors;
    a moderator arrangement disposed within the moderator region for converting the incident fissile neutrons in the moderator region to thermal neutrons which exit the moderator region to then enter the thermal neutron detector arrangement for detection of at least some of the thermal neutrons to produce an electrical current as a detector output with the moderator arrangement having an outer peripheral shape that is at least generally complementary to said inner peripheral shape and the moderator arrangement includes lateral extents such that any given dimension that bisects the lateral extents includes a length that is greater than any thickness of the moderator arrangement transverse to the lateral extents; and
    at least one side moderator disposed in one of the gaps outside of the moderator region.

2. The fissile neutron detection system of claim 1 further comprising:
    a group of said side moderators with one of the side moderators positioned in the gap between each adjacent pair of the thermal neutron detectors outside of the moderator region.

3. The fissile neutron detection system of claim 1 wherein the side moderator includes a thickness dimension between the side-by-side adjacent ones of the thermal neutron detectors that is no more than 5 cm.

4. The fissile neutron detection system of claim 3 wherein the thickness dimension of the side moderator is in a range from 1 cm to 5 cm, inclusively.

5. The fissile neutron detection system of claim 1 wherein each thermal neutron detector sealingly contains a readout gas and each thermal neutron detector supports an active sheet material layer in gaseous communication with the readout gas for detecting thermal neutrons that are incident on the active sheet material layer and the active sheet material layers of the group of thermal neutron detectors cooperate to form an arrangement of active sheet material layers that spans at least a majority of said lateral extents of the moderator arrangement such that a majority of the thermal neutrons that exit the moderator arrangement thereafter impinge on the arrangement of active sheet material layers to cause the active sheet material layer arrangement to emit ionizing particles responsive to the thermal neutrons that initiates an avalanche of ions in the readout gas to produce said electrical current.

6. A fissile neutron detection system for detecting incident fissile neutrons, said fissile neutron detection system, comprising:
an ionizing thermal neutron detector arrangement including an inner peripheral shape that at least substantially surrounds a moderator region for detecting thermal neutrons that exit the moderator region but is at least generally transparent to the incident fissile neutrons, the thermal neutron detector arrangement further including at least one group of thermal neutron detectors with the thermal neutron detectors of each group in a side-by-side relationship and spaced apart in the side-by-side relationship to form a gap between adjacent ones of the thermal neutron detectors;
a moderator arrangement disposed within the moderator region for converting the incident fissile neutrons in the moderator region to thermal neutrons which exit the moderator region to then enter the thermal neutron detector arrangement for detection of at least some of the thermal neutrons to produce an electrical current as a detector output with the moderator arrangement having an outer peripheral shape that is at least generally complementary to said inner peripheral shape and the moderator arrangement includes lateral extents such that any given dimension that bisects the lateral extents includes a length that is greater than any thickness of the moderator arrangement transverse to the lateral extents; and
at least one external moderator disposed outside the moderator region proximate to the ionizing thermal neutron detector arrangement.

7. The fissile neutron detection system of claim 6 wherein the external moderator extends at least partially transverse to said lateral extents.

8. The fissile neutron detection system of claim 6 wherein the ionizing thermal neutron detector arrangement is at least partially enclosed by the external moderator.

9. The fissile neutron detection system of claim 6 wherein the external moderator at least partially encapsulates at least a portion of the thermal neutron detector arrangement.

* * * * *